United States Patent [19]
Mouradian

[11] Patent Number: 5,943,663
[45] Date of Patent: Aug. 24, 1999

[54] DATA PROCESSING METHOD AND SYSTEM UTILIZING PARALLEL PROCESSING

[76] Inventor: Gary C. Mouradian, 40481 N. Sunset Dr., Antioch, Ill. 60002

[21] Appl. No.: 08/990,207

[22] Filed: Dec. 13, 1997

Related U.S. Application Data

[63] Continuation-in-part of application No. 08/345,621, Nov. 28, 1994.
[51] Int. Cl.$^6$ ........................................................ G06F 17/00
[52] U.S. Cl. ............................... 706/45; 706/10; 706/12; 706/14
[58] Field of Search ............................ 395/10; 706/45, 706/10, 12, 14

[56] References Cited

U.S. PATENT DOCUMENTS

| | | | |
|---|---|---|---|
| 4,060,713 | 11/1977 | Golay | 382/205 |
| 5,140,670 | 8/1992 | Chua et al. | 706/29 |
| 5,239,596 | 8/1993 | Mahoney | 382/180 |
| 5,272,638 | 12/1993 | Martin et al. | 455/456 |
| 5,305,395 | 4/1994 | Mahoney et al. | 382/205 |
| 5,548,773 | 8/1996 | Kemeny et al. | 395/800.11 |

*Primary Examiner*—Tariq R. Hafiz
*Assistant Examiner*—Jason W. Rhodes
*Attorney, Agent, or Firm*—Meroni & Meroni

[57] ABSTRACT

An inherently, and massively parallel data processing system and methodology is disclosed for evolving relative awareness, and related response states in a computerized environment. Any number of disparate data types can be configured with the goal of evolving complex data patterns involving these data forms across relative time and space. New data processing principles and a methodology are provided based on a new default logic that emulates the logic of the force of gravity as applied to proximity in time, space and form. Data form standards are provided that require time, place, and form factors at every convergent processing step. This system is capable of evolving complex awareness states as represented by ever larger associations of the original data samples without the need for knowledge bases, conditional rules or the like. Patterns are discerned in an emergent manner. Memory resources can pertain and will likewise self organize in association with distributed database memory sites where awareness states, and the data forms that represent those states first evolved. The manner by which memory resources self organize due to this gravity logic represent a new kind of universal relational database methodology.

9 Claims, 23 Drawing Sheets

Sensory Addresses

| 1.1 | 1.2 | 1.3 | 1.4 |
|-----|-----|-----|-----|
| 2.1 | 2.2 | 2.3 | 2.4 |
| 3.1 | 3.2 | 3.3 | 3.4 |
| 4.1 | 4.2 | 4.3 | 4.4 |

System registers the color data form #'s

| 110 | 128 | 130 | 140 |
|-----|-----|-----|-----|
| 110 | 110 | 75  | 77  |
| 200 | 200 | 201 | 79  |
| 199 | 199 | 198 | 80  |

Visual Grid sees shades/colors:

| 110 | 128 | 130 | 140 |
|-----|-----|-----|-----|
| 110 | 110 | 75  | 77  |
| 200 | 200 | 201 | 79  |
| 199 | 199 | 198 | 80  |

Adjacent Horizontal and Vertical Neighbor Evolution

| 1 | 2 | 3 | 4 | 5 | 6 | 7 |
|---|---|---|---|---|---|---|
| Item # | Address | Address | Color | Color | Avg Color | Std Dev |
| 1  | 1.1 | 1.2 | 110 | 128 | 119   | 9.0  |
| 2  | 1.1 | 2.1 | 110 | 110 | 110   | 0.0  |
| 3  | 1.2 | 1.3 | 128 | 130 | 129   | 1.0  |
| 4  | 1.2 | 2.2 | 128 | 110 | 119   | 9.0  |
| 5  | 1.3 | 1.4 | 130 | 140 | 135   | 5.0  |
| 6  | 1.3 | 2.3 | 130 | 75  | 102.5 | 27.5 |
| 7  | 1.4 | 2.4 | 140 | 77  | 108.5 | 31.5 |
| 8  | 2.1 | 2.2 | 110 | 110 | 110   | 0.0  |
| 9  | 2.1 | 3.1 | 110 | 200 | 155   | 45.0 |
| 10 | 2.2 | 2.3 | 110 | 75  | 92.5  | 17.5 |
| 11 | 2.2 | 3.2 | 110 | 200 | 155   | 45.0 |
| 12 | 2.3 | 2.4 | 75  | 77  | 76    | 1.0  |
| 13 | 2.3 | 3.3 | 75  | 201 | 138   | 63.0 |
| 14 | 2.4 | 3.4 | 77  | 79  | 78    | 1.0  |
| 15 | 3.1 | 3.2 | 200 | 200 | 200   | 0.0  |
| 16 | 3.1 | 4.1 | 200 | 199 | 199.5 | 0.5  |
| 17 | 3.2 | 3.3 | 200 | 201 | 200.5 | 0.5  |
| 18 | 3.2 | 4.2 | 200 | 199 | 199.5 | 0.5  |
| 19 | 3.3 | 3.4 | 201 | 79  | 140   | 61.0 |
| 20 | 3.3 | 4.3 | 201 | 198 | 199.5 | 1.5  |
| 21 | 3.4 | 4.4 | 79  | 80  | 79.5  | 0.5  |
| 22 | 4.1 | 4.2 | 199 | 199 | 199   | 0.0  |
| 23 | 4.2 | 4.3 | 199 | 198 | 198.5 | 0.5  |
| 24 | 4.3 | 4.4 | 198 | 80  | 139   | 59.0 |

Sorted by Std Dev Evolved Pairs according to Color Fit

| 1 | 2 | 3 | 4 | 5 | 6 | 7 |
|---|---|---|---|---|---|---|
| Item # | Address | Address | Color | Color | Avg Color | Std Dev |
| 2  | 1.1 | 2.1 | 110 | 110 | 110   | 0.0  |
| 8  | 2.1 | 2.2 | 110 | 110 | 110   | 0.0  |
| 22 | 4.1 | 4.2 | 199 | 199 | 199   | 0.0  |
| 15 | 3.1 | 3.2 | 200 | 200 | 200   | 0.0  |
| 21 | 3.4 | 4.4 | 79  | 80  | 79.5  | 0.5  |
| 23 | 4.2 | 4.3 | 199 | 198 | 198.5 | 0.5  |
| 18 | 3.2 | 4.2 | 200 | 199 | 199.5 | 0.5  |
| 16 | 3.1 | 4.1 | 200 | 199 | 199.5 | 0.5  |
| 17 | 3.2 | 3.3 | 200 | 201 | 200.5 | 1.0  |
| 12 | 2.3 | 2.4 | 75  | 77  | 76    | 1.0  |
| 14 | 2.4 | 3.4 | 77  | 79  | 78    | 1.0  |
| 3  | 1.2 | 1.3 | 128 | 130 | 129   | 1.0  |
| 20 | 3.3 | 4.3 | 201 | 198 | 199.5 | 1.5  |
| 5  | 1.3 | 1.4 | 130 | 140 | 135   | 5.0  |
| 1  | 1.1 | 1.2 | 110 | 128 | 119   | 9.0  |
| 4  | 1.2 | 2.2 | 128 | 110 | 119   | 9.0  |
| 10 | 2.2 | 2.3 | 110 | 75  | 92.5  | 17.5 |
| 6  | 1.3 | 2.3 | 130 | 75  | 102.5 | 27.5 |
| 7  | 1.4 | 2.4 | 140 | 77  | 108.5 | 31.5 |
| 11 | 2.2 | 3.2 | 110 | 200 | 155   | 45.0 |
| 9  | 2.1 | 3.1 | 110 | 200 | 155   | 45.0 |
| 24 | 4.3 | 4.4 | 198 | 80  | 139   | 59.0 |
| 19 | 3.3 | 3.4 | 201 | 79  | 140   | 61.0 |
| 13 | 2.3 | 3.3 | 75  | 201 | 138   | 63.0 |

Visual Grid sees following shades/colors:

| 110 | | | |
|---|---|---|---|
| 110 | 110 | 75 | 77 |
| | | | 79 |
| | | | 80 |

Sensor Addresses

| 1.1 | 1.2 | 1.3 | 1.4 |
|---|---|---|---|
| 2.1 | 2.2 | 2.3 | 2.4 |
| 3.1 | 3.2 | 3.3 | 3.4 |
| 4.1 | 4.2 | 4.3 | 4.4 |

System registers the color data forms

| 110 | 128 | 130 | 140 |
|---|---|---|---|
| 110 | 110 | 75 | 77 |
| 200 | 200 | 201 | 79 |
| 199 | 199 | 198 | 80 |

Adjacent Horizontal and Vertical Neighbor Evolution
In vector order from top left, check adjacent right neighbor, proceed to next row, find adjacent neighbor below, proceed to bottom right corner.

| Item # | Addresses | | | Colors | | | Average Color | Standard Deviation |
|---|---|---|---|---|---|---|---|---|
| 1 | 1.1 | 1.2 | 1.3 | 110 | 128 | 130 | 122.7 | 9.0 |
| 2 | 1.1 | 1.2 | 2.1 | 110 | 128 | 110 | 116.0 | 8.5 |
| 3 | 1.1 | 1.2 | 2.2 | 110 | 128 | 110 | 116.0 | 8.5 |
| 4 | 1.1 | 2.1 | 2.2 | 110 | 110 | 110 | 110.0 | 0.0 |
| 5 | 1.1 | 2.1 | 3.1 | 110 | 110 | 200 | 140.0 | 42.4 |
| 6 | 1.2 | 1.3 | 1.4 | 128 | 130 | 140 | 132.7 | 5.2 |
| 7 | 1.2 | 1.3 | 2.3 | 128 | 130 | 75 | 111.0 | 25.5 |
| 8 | 1.2 | 2.1 | 2.2 | 128 | 110 | 110 | 116.0 | 8.5 |
| 9 | 1.2 | 2.2 | 2.3 | 128 | 110 | 75 | 104.3 | 22.0 |
| 10 | 1.2 | 2.2 | 3.2 | 128 | 110 | 200 | 146.0 | 38.9 |
| 11 | 1.3 | 1.4 | 2.3 | 130 | 140 | 75 | 115.0 | 28.6 |
| 12 | 1.3 | 1.4 | 2.4 | 130 | 140 | 77 | 115.7 | 27.6 |
| 13 | 1.3 | 2.2 | 2.3 | 130 | 110 | 75 | 105.0 | 22.7 |
| 14 | 1.3 | 2.3 | 3.3 | 130 | 75 | 201 | 135.3 | 51.6 |
| 15 | 1.4 | 2.3 | 2.4 | 140 | 75 | 77 | 97.3 | 30.2 |
| 16 | 1.4 | 2.4 | 3.4 | 140 | 77 | 79 | 98.7 | 29.2 |
| 17 | 2.1 | 2.2 | 2.3 | 110 | 110 | 75 | 98.3 | 16.5 |
| 18 | 2.1 | 2.2 | 3.1 | 110 | 110 | 200 | 140.0 | 42.4 |
| 19 | 2.1 | 2.2 | 3.2 | 110 | 110 | 200 | 140.0 | 42.4 |
| 20 | 2.1 | 3.1 | 3.2 | 110 | 110 | 200 | 140.0 | 42.4 |
| 21 | 2.1 | 3.1 | 4.1 | 110 | 200 | 199 | 169.7 | 42.2 |
| 22 | 2.2 | 2.3 | 2.4 | 110 | 75 | 77 | 87.3 | 16.0 |
| 23 | 2.2 | 2.3 | 3.2 | 110 | 75 | 200 | 128.3 | 52.7 |
| 24 | 2.2 | 2.3 | 3.3 | 110 | 75 | 201 | 128.7 | 53.1 |
| 25 | 2.2 | 3.1 | 3.2 | 110 | 200 | 200 | 170.0 | 42.4 |
| 26 | 2.2 | 3.2 | 3.3 | 110 | 200 | 201 | 170.3 | 42.7 |
| 27 | 2.2 | 3.2 | 4.2 | 110 | 200 | 199 | 169.7 | 42.2 |
| 28 | 2.3 | 2.4 | 3.3 | 75 | 77 | 201 | 117.7 | 58.9 |
| 29 | 2.3 | 2.4 | 3.4 | 75 | 77 | 79 | 77.0 | 1.6 |
| 30 | 2.3 | 3.2 | 3.3 | 75 | 200 | 201 | 158.7 | 59.2 |
| 31 | 2.3 | 3.3 | 3.4 | 75 | 201 | 79 | 118.3 | 58.5 |
| 32 | 2.3 | 3.3 | 4.3 | 75 | 201 | 198 | 158.0 | 58.7 |
| 33 | 2.4 | 3.3 | 3.4 | 77 | 201 | 79 | 119.0 | 58.0 |
| 34 | 2.4 | 3.4 | 4.4 | 77 | 79 | 80 | 78.7 | 1.2 |
| 35 | 3.1 | 3.2 | 3.3 | 200 | 200 | 201 | 200.3 | 0.5 |
| 36 | 3.1 | 3.2 | 4.1 | 200 | 200 | 199 | 199.7 | 0.5 |
| 37 | 3.1 | 3.2 | 4.2 | 200 | 200 | 199 | 199.7 | 0.5 |
| 38 | 3.1 | 4.1 | 4.2 | 200 | 199 | 199 | 199.3 | 0.5 |
| 39 | 3.2 | 3.3 | 3.4 | 200 | 201 | 79 | 160.0 | 57.3 |
| 40 | 3.2 | 3.3 | 4.2 | 200 | 201 | 199 | 200.0 | 0.8 |
| 41 | 3.2 | 3.3 | 4.3 | 200 | 201 | 198 | 199.7 | 1.2 |
| 42 | 3.2 | 4.1 | 4.2 | 200 | 199 | 199 | 199.3 | 0.5 |
| 43 | 3.2 | 4.2 | 4.3 | 200 | 199 | 198 | 199.0 | 0.8 |
| 44 | 3.3 | 3.4 | 4.3 | 201 | 79 | 198 | 159.3 | 56.8 |
| 45 | 3.3 | 3.4 | 4.4 | 201 | 79 | 80 | 120.0 | 57.3 |
| 46 | 3.3 | 4.2 | 4.3 | 201 | 199 | 198 | 199.3 | 1.2 |
| 47 | 3.3 | 4.3 | 4.4 | 201 | 198 | 80 | 159.7 | 56.3 |
| 48 | 3.4 | 4.3 | 4.4 | 79 | 198 | 80 | 119.0 | 55.9 |
| 49 | 4.1 | 4.2 | 4.3 | 199 | 199 | 198 | 198.7 | 0.5 |
| 50 | 4.2 | 4.3 | 4.4 | 199 | 198 | 80 | 159.0 | 55.9 |

Sorted Evolved Pairs according to Standard Deviation of color.

| Item # | Addresses | | | Colors | | | Average Color | Standard Deviation |
|---|---|---|---|---|---|---|---|---|
| 4 | 1.1 | 2.1 | 2.2 | 110 | 110 | 110 | 110.0 | 0.0 |
| 35 | 3.1 | 3.2 | 3.3 | 200 | 200 | 201 | 200.3 | 0.5 |
| 36 | 3.1 | 3.2 | 4.1 | 200 | 200 | 199 | 199.7 | 0.5 |
| 37 | 3.1 | 3.2 | 4.2 | 200 | 200 | 199 | 199.7 | 0.5 |
| 38 | 3.1 | 4.1 | 4.2 | 200 | 199 | 199 | 199.3 | 0.5 |
| 42 | 3.2 | 4.1 | 4.2 | 200 | 199 | 199 | 199.3 | 0.5 |
| 49 | 4.1 | 4.2 | 4.3 | 199 | 199 | 198 | 198.7 | 0.5 |
| 40 | 3.2 | 3.3 | 4.2 | 200 | 201 | 199 | 200.0 | 0.8 |
| 43 | 3.2 | 4.2 | 4.3 | 200 | 199 | 198 | 199.0 | 0.8 |
| 34 | 2.4 | 3.4 | 4.4 | 77 | 79 | 80 | 78.7 | 1.2 |
| 41 | 3.2 | 3.3 | 4.3 | 200 | 201 | 198 | 199.7 | 1.2 |
| 46 | 3.3 | 4.2 | 4.3 | 201 | 199 | 198 | 199.3 | 1.2 |
| 29 | 2.3 | 2.4 | 3.4 | 75 | 77 | 79 | 77.0 | 1.6 |
| 6 | 1.2 | 1.3 | 1.4 | 128 | 130 | 140 | 132.7 | 5.2 |
| 2 | 1.1 | 1.2 | 2.1 | 110 | 128 | 110 | 116.0 | 8.5 |
| 3 | 1.1 | 1.2 | 2.2 | 110 | 128 | 110 | 116.0 | 8.5 |
| 8 | 1.2 | 2.1 | 2.2 | 128 | 110 | 110 | 116.0 | 8.5 |
| 1 | 1.1 | 1.2 | 1.3 | 110 | 128 | 130 | 122.7 | 9.0 |
| 22 | 2.2 | 2.3 | 2.4 | 110 | 75 | 77 | 87.3 | 16.0 |
| 17 | 2.1 | 2.2 | 2.3 | 110 | 110 | 75 | 98.3 | 16.5 |
| 9 | 1.2 | 2.2 | 2.3 | 128 | 110 | 75 | 104.3 | 22.0 |
| 13 | 1.3 | 2.2 | 2.3 | 130 | 110 | 75 | 105.0 | 22.7 |
| 7 | 1.2 | 1.3 | 2.3 | 128 | 130 | 75 | 111.0 | 25.5 |
| 12 | 1.3 | 1.4 | 2.4 | 130 | 140 | 77 | 115.7 | 27.6 |
| 11 | 1.3 | 1.4 | 2.3 | 130 | 140 | 75 | 115.0 | 28.6 |
| 16 | 1.4 | 2.4 | 3.4 | 140 | 77 | 79 | 98.7 | 29.2 |
| 15 | 1.4 | 2.3 | 2.4 | 140 | 75 | 77 | 97.3 | 30.2 |
| 10 | 1.2 | 2.2 | 3.2 | 128 | 110 | 200 | 146.0 | 38.9 |
| 21 | 2.1 | 3.1 | 4.1 | 110 | 200 | 199 | 169.7 | 42.2 |
| 27 | 2.2 | 3.2 | 4.2 | 110 | 200 | 199 | 169.7 | 42.2 |
| 5 | 1.1 | 2.1 | 3.1 | 110 | 110 | 200 | 140.0 | 42.4 |
| 18 | 2.1 | 2.2 | 3.1 | 110 | 110 | 200 | 140.0 | 42.4 |
| 19 | 2.1 | 2.2 | 3.2 | 110 | 110 | 200 | 140.0 | 42.4 |
| 20 | 2.1 | 3.1 | 3.2 | 110 | 110 | 200 | 140.0 | 42.4 |
| 25 | 2.2 | 3.1 | 3.2 | 110 | 200 | 200 | 170.0 | 42.4 |
| 26 | 2.2 | 3.2 | 3.3 | 110 | 200 | 201 | 170.3 | 42.7 |
| 14 | 1.3 | 2.3 | 3.3 | 130 | 75 | 201 | 135.3 | 51.6 |
| 23 | 2.2 | 2.3 | 3.2 | 110 | 75 | 200 | 128.3 | 52.7 |
| 24 | 2.2 | 2.3 | 3.3 | 110 | 75 | 201 | 128.7 | 53.1 |
| 48 | 3.4 | 4.3 | 4.4 | 79 | 198 | 80 | 119.0 | 55.9 |
| 50 | 4.2 | 4.3 | 4.4 | 199 | 198 | 80 | 159.0 | 55.9 |
| 47 | 3.3 | 4.3 | 4.4 | 201 | 198 | 80 | 159.7 | 56.3 |
| 44 | 3.3 | 3.4 | 4.3 | 201 | 79 | 198 | 159.3 | 56.8 |
| 39 | 3.2 | 3.3 | 3.4 | 200 | 201 | 79 | 160.0 | 57.3 |
| 45 | 3.3 | 3.4 | 4.4 | 201 | 79 | 80 | 120.0 | 57.3 |
| 33 | 2.4 | 3.3 | 3.4 | 77 | 201 | 79 | 119.0 | 58.0 |
| 31 | 2.3 | 3.3 | 3.4 | 75 | 201 | 79 | 118.3 | 58.5 |
| 32 | 2.3 | 3.3 | 4.3 | 75 | 201 | 198 | 158.0 | 58.7 |
| 28 | 2.3 | 2.4 | 3.3 | 75 | 77 | 201 | 117.7 | 58.9 |
| 30 | 2.3 | 3.2 | 3.3 | 75 | 200 | 201 | 158.7 | 59.2 |

Figure 6

LEVEL THREE LOW STANDARD DEVIATION GROUPS EVOLVED TO LEVEL FOUR

Sorted according to column 12 - Level 3 Standard Deviation

| 1 | 2 | 3 | 4 | 5 | 6 | 7 | 8 | 9 | 10 | 11 | 12 | 13 |
|---|---|---|---|---|---|---|---|---|---|---|---|---|
| Item Number From Figure 5 | | Addresses | | | | Colors | | | Average Level 3 Pixels | Average Level 4 Pixels | Level 3 Standard Deviation | Level 4 Standard Deviation |
| 3 | 1.1 | 2.1 | 2.2 | 2.3 | 110 | 110 | 110 | 75 | 110.0 | 101.3 | 0.0 | 15.2 |
| 3 | 1.1 | 2.1 | 2.2 | 3.1 | 110 | 110 | 110 | 200 | 110.0 | 132.5 | 0.0 | 39.0 |
| 3 | 1.1 | 2.1 | 2.2 | 3.2 | 110 | 110 | 110 | 200 | 110.0 | 132.5 | 0.0 | 39.0 |
| 48 | 4.1 | 4.2 | 4.3 | 4.4 | 199 | 199 | 198 | 80 | 198.7 | 169.0 | 0.5 | 51.4 |
| 37 | 3.1 | 4.1 | 4.2 | 4.3 | 200 | 199 | 199 | 198 | 199.3 | 199.0 | 0.5 | 0.7 |
| 41 | 3.2 | 4.1 | 4.1 | 4.3 | 200 | 199 | 199 | 198 | 199.3 | 199.0 | 0.5 | 0.7 |
| 35 | 3.1 | 3.2 | 4.1 | 4.2 | 200 | 200 | 199 | 199 | 199.7 | 199.5 | 0.5 | 0.5 |
| 36 | 3.1 | 3.2 | 4.2 | 4.3 | 200 | 200 | 199 | 198 | 199.3 | 199.3 | 0.5 | 0.8 |
| 34 | 3.1 | 3.2 | 3.3 | 3.4 | 200 | 200 | 201 | 79 | 199.7 | 170.0 | 0.5 | 52.5 |
| 34 | 3.1 | 3.2 | 3.3 | 4.1 | 200 | 200 | 201 | 199 | 200.3 | 200.0 | 0.5 | 0.7 |
| 34 | 3.1 | 3.2 | 3.3 | 4.2 | 200 | 200 | 201 | 198 | 200.3 | 199.8 | 0.5 | 0.7 |
| 34 | 3.1 | 3.2 | 3.3 | 4.3 | 200 | 200 | 201 | 198 | 200.3 | 199.8 | 0.5 | 1.1 |
| 42 | 3.2 | 3.2 | 4.3 | 4.4 | 200 | 199 | 198 | 80 | 199.0 | 169.3 | 0.8 | 51.5 |
| 39 | 3.2 | 3.3 | 4.2 | 4.3 | 200 | 200 | 199 | 198 | 200.0 | 199.5 | 0.8 | 1.1 |
| 45 | 3.3 | 4.2 | 4.3 | 4.4 | 201 | 199 | 198 | 80 | 199.3 | 169.5 | 0.8 | 51.7 |
| 40 | 3.2 | 3.3 | 4.3 | 4.4 | 200 | 201 | 201 | 80 | 199.7 | 169.8 | 1.2 | 51.8 |
| 33 | 2.4 | 2.4 | 3.4 | 4.4 | 77 | 79 | 80 | 80 | 78.7 | 78.7 | 1.2 | 1.2 |
| 28 | 2.3 | 2.4 | 3.4 | 4.4 | 75 | 77 | 79 | 80 | 77.0 | 77.8 | 1.6 | 1.9 |

Sorted according to column 13 - Level 4 Standard Deviation

| 1 | 2 | 3 | 4 | 5 | 6 | 7 | 8 | 9 | 10 | 11 | 12 | 13 |
|---|---|---|---|---|---|---|---|---|---|---|---|---|
| Item Number From Figure 5 | | Addresses | | | | Colors | | | Average Level 3 Pixels | Average Level 4 Pixels | Level 3 Standard Deviation | Level 4 Standard Deviation |
| 35 | 3.1 | 3.2 | 4.1 | 4.2 | 200 | 200 | 199 | 199 | 199.7 | 199.5 | 0.5 | 0.5 |
| 37 | 3.1 | 4.1 | 4.2 | 4.3 | 200 | 199 | 199 | 198 | 199.3 | 199.0 | 0.5 | 0.7 |
| 41 | 3.2 | 4.1 | 4.1 | 4.3 | 200 | 199 | 199 | 198 | 199.3 | 199.0 | 0.5 | 0.7 |
| 34 | 3.1 | 3.2 | 3.3 | 4.1 | 200 | 200 | 201 | 199 | 200.3 | 200.0 | 0.5 | 0.7 |
| 34 | 3.1 | 3.2 | 3.3 | 4.2 | 200 | 200 | 201 | 198 | 200.3 | 199.3 | 0.5 | 0.7 |
| 36 | 3.1 | 3.2 | 4.2 | 4.3 | 200 | 200 | 199 | 198 | 199.7 | 199.3 | 0.5 | 0.8 |
| 36 | 3.1 | 3.2 | 4.2 | 4.3 | 200 | 200 | 201 | 198 | 200.3 | 199.8 | 0.5 | 0.8 |
| 39 | 3.2 | 3.3 | 4.2 | 4.3 | 200 | 201 | 199 | 198 | 200.0 | 199.5 | 0.8 | 1.1 |
| 33 | 2.4 | 2.4 | 3.4 | 4.4 | 77 | 77 | 80 | 80 | 78.7 | 78.7 | 1.2 | 1.2 |
| 28 | 2.3 | 2.4 | 3.4 | 2.3 | 75 | 110 | 110 | 75 | 77.0 | 77.8 | 1.6 | 1.9 |
| 3 | 1.1 | 2.1 | 2.2 | 3.1 | 110 | 110 | 110 | 200 | 110.0 | 101.3 | 0.0 | 15.2 |
| 3 | 1.1 | 2.1 | 2.2 | 3.2 | 110 | 110 | 110 | 200 | 110.0 | 132.5 | 0.0 | 39.0 |
| 3 | 1.1 | 2.1 | 2.2 | 3.2 | 110 | 110 | 110 | 200 | 110.0 | 132.5 | 0.0 | 39.0 |
| 48 | 4.1 | 4.2 | 4.3 | 4.4 | 199 | 199 | 198 | 80 | 198.7 | 169.0 | 0.5 | 51.4 |
| 42 | 3.2 | 4.2 | 4.3 | 4.4 | 200 | 199 | 198 | 80 | 199.0 | 169.3 | 0.8 | 51.5 |
| 45 | 3.3 | 4.2 | 4.3 | 4.4 | 201 | 199 | 198 | 80 | 199.3 | 169.5 | 0.8 | 51.7 |
| 40 | 3.2 | 3.3 | 4.3 | 4.4 | 200 | 201 | 198 | 80 | 199.7 | 169.8 | 1.2 | 51.8 |
| 34 | 3.1 | 3.2 | 3.3 | 3.4 | 200 | 200 | 201 | 79 | 200.3 | 170.0 | 0.5 | 52.5 |

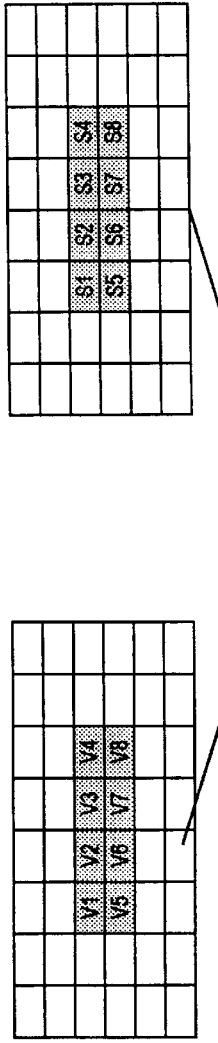
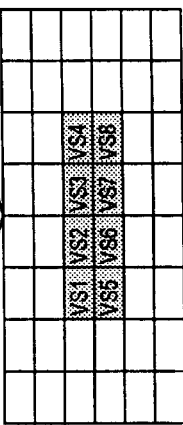
Figure 12

| 10.063 | 10.064 | 10.065 | 10.066 | 10.067 | 10.068 | 10.069 | 10.070 | 10.071 | 10.000 | 10.001 | 10.002 | 10.003 | 10.004 | 10.005 | 10.006 | 10.007 | 10.008 | 10.009 |
|---|---|---|---|---|---|---|---|---|---|---|---|---|---|---|---|---|---|---|
| 10.062 | 9.056 | 9.057 | 9.058 | 9.059 | 9.060 | 9.061 | 9.062 | 9.063 | 9.000 | 9.001 | 9.002 | 9.003 | 9.004 | 9.005 | 9.006 | 9.007 | 9.008 | 10.010 |
| 10.061 | 9.055 | 8.049 | 8.050 | 8.051 | 8.052 | 8.053 | 8.054 | 8.055 | 8.000 | 8.001 | 8.002 | 8.003 | 8.004 | 8.005 | 8.006 | 8.007 | 9.009 | 10.011 |
| 10.060 | 9.054 | 8.048 | 7.042 | 7.043 | 7.044 | 7.045 | 7.046 | 7.047 | 7.000 | 7.001 | 7.002 | 7.003 | 7.004 | 7.005 | 7.006 | 8.008 | 9.010 | 10.012 |
| 10.059 | 9.053 | 8.047 | 7.041 | 6.035 | 6.036 | 6.037 | 6.038 | 6.039 | 6.000 | 6.001 | 6.002 | 6.003 | 6.004 | 6.005 | 7.007 | 8.009 | 9.011 | 10.013 |
| 10.058 | 9.052 | 8.046 | 7.040 | 6.034 | 5.028 | 5.029 | 5.030 | 5.031 | 5.000 | 5.001 | 5.002 | 5.003 | 5.004 | 6.006 | 7.008 | 8.010 | 9.012 | 10.014 |
| 10.057 | 9.051 | 8.045 | 7.039 | 6.033 | 5.027 | 4.021 | 4.022 | 4.023 | 4.000 | 4.001 | 4.002 | 4.003 | 5.005 | 6.007 | 7.009 | 8.011 | 9.013 | 10.015 |
| 10.056 | 9.050 | 8.044 | 7.038 | 6.032 | 5.026 | 4.020 | 3.014 | 3.015 | 3.000 | 3.001 | 3.002 | 4.004 | 5.006 | 6.008 | 7.010 | 8.012 | 9.014 | 10.016 |
| 10.055 | 9.049 | 8.043 | 7.037 | 6.031 | 5.025 | 4.019 | 3.013 | 2.007 | 2.000 | 2.001 | 3.003 | 4.005 | 5.007 | 6.009 | 7.011 | 8.013 | 9.015 | 10.017 |
| 10.054 | 9.048 | 8.042 | 7.036 | 6.030 | 5.024 | 4.018 | 3.012 | 2.006 | 1.000 | 2.002 | 3.004 | 4.006 | 5.008 | 6.010 | 7.012 | 8.014 | 9.016 | 10.018 |
| 10.053 | 9.047 | 8.041 | 7.035 | 6.029 | 5.023 | 4.017 | 3.011 | 2.005 | 2.004 | 2.003 | 3.005 | 4.007 | 5.009 | 6.011 | 7.013 | 8.015 | 9.017 | 10.019 |
| 10.052 | 9.046 | 8.040 | 7.034 | 6.028 | 5.022 | 4.016 | 3.010 | 3.009 | 3.008 | 3.007 | 3.006 | 4.008 | 5.010 | 6.012 | 7.014 | 8.016 | 9.018 | 10.020 |
| 10.051 | 9.045 | 8.039 | 7.033 | 6.027 | 5.021 | 4.015 | 4.014 | 4.013 | 4.012 | 4.011 | 4.010 | 4.009 | 5.011 | 6.013 | 7.015 | 8.017 | 9.019 | 10.021 |
| 10.050 | 9.044 | 8.038 | 7.032 | 6.026 | 5.020 | 5.019 | 5.018 | 5.017 | 5.016 | 5.015 | 5.014 | 5.013 | 5.012 | 6.014 | 7.016 | 8.018 | 9.020 | 10.022 |
| 10.049 | 9.043 | 8.037 | 7.031 | 6.025 | 6.024 | 6.023 | 6.022 | 6.021 | 6.020 | 6.019 | 6.018 | 6.017 | 6.016 | 6.015 | 7.017 | 8.019 | 9.021 | 10.023 |
| 10.048 | 9.042 | 8.036 | 7.030 | 7.029 | 7.028 | 7.027 | 7.026 | 7.025 | 7.024 | 7.023 | 7.022 | 7.021 | 7.020 | 7.019 | 7.018 | 8.020 | 9.022 | 10.024 |
| 10.047 | 9.041 | 8.035 | 8.034 | 8.033 | 8.032 | 8.031 | 8.030 | 8.029 | 8.028 | 8.027 | 8.026 | 8.025 | 8.024 | 8.023 | 8.022 | 8.021 | 9.023 | 10.025 |
| 10.046 | 9.040 | 9.039 | 9.038 | 9.037 | 9.036 | 9.035 | 9.034 | 9.033 | 9.032 | 9.031 | 9.030 | 9.029 | 9.028 | 9.027 | 9.026 | 9.025 | 9.024 | 10.026 |
| 10.045 | 10.044 | 10.043 | 10.042 | 10.041 | 10.040 | 10.039 | 10.038 | 10.037 | 10.036 | 10.035 | 10.034 | 10.033 | 10.032 | 10.031 | 10.030 | 10.029 | 10.028 | 10.027 |

Figure 20

| Focus Cell | Top Neighbor | NE Neighbor | Right | SE Neighbor | Bottom | SW Neighbor | Left Neighbor | NW Neighbor |
|---|---|---|---|---|---|---|---|---|
| 1.000 | 2.000 | 2.001 | 2.002 | 2.003 | 2.004 | 2.005 | 2.006 | 2.007 |
| 2.000 | 3.000 | 3.001 | 2.001 | 2.002 | 1.000 | 2.006 | 2.007 | 3.015 |
| 2.001 | 3.001 | 3.002 | 3.003 | 3.004 | 2.002 | 1.000 | 2.000 | 3.000 |
| 2.002 | 2.001 | 3.003 | 3.004 | 3.005 | 2.003 | 2.004 | 1.000 | 2.000 |
| 2.003 | 2.002 | 3.004 | 3.005 | 3.006 | 3.007 | 3.008 | 2.004 | 1.000 |
| 2.004 | 1.000 | 2.002 | 2.003 | 3.007 | 3.008 | 3.009 | 2.005 | 2.006 |
| 2.005 | 2.006 | 1.000 | 2.004 | 3.008 | 3.009 | 3.010 | 3.011 | 3.012 |
| 2.006 | 2.007 | 2.000 | 1.000 | 2.004 | 2.005 | 3.011 | 3.012 | 3.013 |
| 2.007 | 3.015 | 3.000 | 2.000 | 1.000 | 2.006 | 3.012 | 3.013 | 3.014 |
| 3.000 | 4.000 | 4.001 | 3.001 | 2.001 | 2.000 | 2.007 | 3.015 | 4.023 |
| 3.001 | 4.001 | 4.002 | 3.002 | 3.003 | 2.001 | 2.000 | 3.000 | 4.000 |
| 3.002 | 4.002 | 4.003 | 4.004 | 4.005 | 3.003 | 2.001 | 3.001 | 4.001 |
| 3.003 | 3.002 | 4.004 | 4.005 | 4.006 | 3.004 | 2.002 | 2.001 | 3.001 |
| 3.004 | 3.003 | 4.005 | 4.006 | 4.007 | 3.005 | 2.003 | 2.002 | 2.001 |
| 3.005 | 3.004 | 4.006 | 4.007 | 4.008 | 3.006 | 3.007 | 2.003 | 2.002 |
| 3.006 | 3.005 | 4.007 | 4.008 | 4.009 | 4.010 | 4.011 | 3.007 | 2.003 |
| 3.007 | 2.003 | 3.005 | 3.006 | 4.010 | 4.011 | 4.012 | 3.008 | 2.004 |
| 3.008 | 2.004 | 2.003 | 3.007 | 4.011 | 4.012 | 4.013 | 3.009 | 2.005 |
| 3.009 | 2.005 | 2.004 | 3.008 | 4.012 | 4.013 | 4.014 | 3.010 | 3.011 |
| 3.010 | 3.011 | 2.005 | 3.009 | 4.013 | 4.014 | 4.015 | 4.016 | 4.017 |
| 3.011 | 3.012 | 2.006 | 2.005 | 3.009 | 3.010 | 4.016 | 4.017 | 4.018 |
| 3.012 | 3.013 | 2.007 | 2.006 | 2.005 | 3.011 | 4.017 | 4.018 | 4.019 |
| 3.013 | 3.014 | 3.015 | 2.007 | 2.006 | 3.012 | 4.018 | 4.019 | 4.020 |
| 3.014 | 4.022 | 4.023 | 3.015 | 2.007 | 3.013 | 4.019 | 4.020 | 4.021 |
| 3.015 | 4.023 | 4.000 | 3.000 | 2.000 | 2.007 | 3.013 | 3.014 | 4.022 |
| 4.000 | 5.000 | 5.001 | 4.001 | 3.001 | 3.000 | 3.015 | 4.023 | 5.031 |
| 4.001 | 5.001 | 5.002 | 4.002 | 3.002 | 3.001 | 3.000 | 4.000 | 5.000 |
| 4.002 | 5.002 | 5.003 | 4.003 | 4.004 | 3.002 | 3.001 | 4.001 | 5.001 |
| 4.003 | 5.003 | 5.004 | 5.005 | 5.006 | 4.004 | 3.002 | 4.002 | 5.002 |
| 4.004 | 4.003 | 5.005 | 5.006 | 5.007 | 4.005 | 3.003 | 3.002 | 4.002 |
| 4.005 | 4.004 | 5.006 | 5.007 | 5.008 | 4.006 | 3.004 | 3.003 | 3.002 |
| 4.006 | 4.005 | 5.007 | 5.008 | 5.009 | 4.007 | 3.005 | 3.004 | 3.003 |
| 4.007 | 4.006 | 5.008 | 5.009 | 5.010 | 4.008 | 3.006 | 3.005 | 3.004 |
| 4.008 | 4.007 | 5.009 | 5.010 | 5.011 | 4.009 | 4.010 | 3.006 | 3.005 |
| 4.009 | 4.008 | 5.010 | 5.011 | 5.012 | 5.013 | 5.014 | 4.010 | 3.006 |
| 4.010 | 3.006 | 4.008 | 4.009 | 5.013 | 5.014 | 5.015 | 4.011 | 3.007 |
| 4.011 | 3.007 | 3.006 | 4.010 | 5.014 | 5.015 | 5.016 | 4.012 | 3.008 |
| 4.012 | 3.008 | 3.007 | 4.011 | 5.015 | 5.016 | 5.017 | 4.013 | 3.009 |
| 4.013 | 3.009 | 3.008 | 4.012 | 5.016 | 5.017 | 5.018 | 4.014 | 3.010 |
| 4.014 | 3.010 | 3.009 | 4.013 | 5.017 | 5.018 | 5.019 | 4.015 | 4.016 |
| 4.015 | 4.016 | 3.010 | 4.014 | 5.018 | 5.019 | 5.020 | 5.021 | 5.022 |
| 4.016 | 4.017 | 3.011 | 3.010 | 4.014 | 4.015 | 5.021 | 5.022 | 5.023 |
| 4.017 | 4.018 | 3.012 | 3.011 | 3.010 | 4.016 | 5.022 | 5.023 | 5.024 |
| 4.018 | 4.019 | 3.013 | 3.012 | 3.011 | 4.017 | 5.023 | 5.024 | 5.025 |
| 4.019 | 4.020 | 3.014 | 3.013 | 3.012 | 4.018 | 5.024 | 5.025 | 5.026 |
| 4.020 | 4.021 | 4.022 | 3.014 | 3.013 | 4.019 | 5.025 | 5.026 | 5.027 |
| 4.021 | 5.029 | 5.030 | 4.022 | 3.014 | 4.020 | 5.026 | 5.027 | 5.028 |
| 4.022 | 5.030 | 5.031 | 4.023 | 3.015 | 3.014 | 4.020 | 4.021 | 5.029 |
| 4.023 | 5.031 | 5.000 | 4.000 | 3.000 | 3.015 | 3.014 | 4.022 | 5.030 |
| 5.000 | 6.000 | 6.001 | 5.001 | 4.001 | 4.000 | 4.023 | 5.031 | 6.039 |
| 5.001 | 6.001 | 6.002 | 5.002 | 4.002 | 4.001 | 4.000 | 5.000 | 6.000 |

Figure 21

DATA PROCESSING METHOD AND SYSTEM UTILIZING PARALLEL PROCESSING

This appln is a cont-in-part of Ser. No. 08/345,621, filed Nov. 28, 1994.

BACKGROUND OF THE INVENTION

1. Field of the Invention

This invention pertains to an improved data processing system capable of evolving relative awareness states to drive response functions. In particular, this is a generally and massively parallel processing methodology and system applicable to any type of data without knowledge bases or specific conditional processing rules.

2. Description of the Prior Art

A process called the Nearest Neighbor logic is known in the prior art. One could describe this process as a "top down" manner where conditional human logic (the "top") and specifically proscribed algorithms with limited, yet specific application (also the "top"), are employed against those factors deemed to qualify as nearest neighbors (the "down" or raw data portion) according to some means for assessing proximity, usually physical distance.

However, the prior Nearest Neighbor art does not take a comprehensive approach that would then be universally applicable to all kinds of data types and processing objectives. That is, the prior art would take, for instance, a given processing cell, such as a visual pixel cell from anywhere in some visual sensing grid, and would identify the surrounding pixel cells identifying which are closer or further to a cell in question. All such cells in these systems would then identify their nearest neighbors as well and compile them or be able to determine them as needed to guide processing. It should be noted that the prior art treats each focus cell as equally relevant as any other focus cell to start. They all have neighbors and the nearest neighbor logic is not universally applied as a center of gravity, in a logical sense. That is, any cell could be a focus cell in varying situations. In the present invention, the same applies only in a relative sense in first figuring out which cells surround each other. But then the present invention goes further in assigning but one ultimate focus cell in terms of always having the highest default relevance during processing. Each cell in the present invention has a default relevance due to its position.

The present invention looks to the force of gravity, as later described, to derive a new process to configuration and processing methodologies. While aspects of nearest neighbor methodology are involved, the present invention provides new methods and applications. Each cell in a visual embodiment of the present invention, for instance, would not treat each visual cell as equal to any other. Instead, the current invention holds to a new comprehensive notion of what Nearest Neighbor logic actually represents in terms of a far broader and universally applicable logic that applies in a bottom up approach (where the data drives how the system responds) and is inherently, and massively parallel by nature. That is, the present invention does not just apply a proximity test to various cells or other factors. The present invention treats Nearest Neighbor logic as a subset of a new comprehensive logic that emulates the logic of the force of gravity. Thus, instead of a localized piece of top down logic that measures relative nearness, what is herein called "Gravity Logic" has a universal range independent of what anything in any data stream may mean in a higher sense of awareness. That is, like the force of gravity, the logic of gravity when implemented as prescribed herein, acts independently on the data forms that encounter the embedded default logic and configurations that are designed with Gravity Logic as their guide.

The present invention embodies this logic first in the way the invention and its resources are configured. That is, Gravity Logic offers guidance in how resources need to be configured. Then Gravity Logic provides guidance in the very processing logic that is embodied in that configuration as well as how memory resources function if configured. Gravity logic is implemented within the resources configured and functions within the level configured. That means, if no memory retention resources are configured (not to be confused with random access memory), then no gravity driven memory dynamic will be present either.

This establishes a system with automatic filtering capabilities, herein called gravitational relevance filters, that act by default (automatically without conditional databases or specifically applicable algorithms required) on any data forms flowing through it so that the data forms self organize into associations that represent the default mandates of the Gravity Logic that is present in such systems. For example, these associations are complex arrays of the original data pixels linking from whatever data types an embodiment is configured to process. The associations link the original data samples in terms of time, space, and form factors (the actual data values of that data type) that pass the tests of Gravity Logic at the various convergent nodes configured.

There are many Nearest Neighbor related inventions one could reference to gain a broader understanding of that logic and to then understand how and where the present invention differs, and where the present invention ultimately extends into entirely new kinds of functionalities and performance capabilities. In U.S. Pat. No. 5,305,393, "Exhaustive Hierarchical Near Neighbor Operations On An Image", Mahoney offers a parallel processing opportunity for analyzing images and only images. Mahoney states, "A near neighbor is a pixel that meets an appropriate criterion, such as the nearest black pixel in a binary image." Note how the specific reference to conditional logic such as searching for a specific color, unlike the present invention. Mahoney claims to be a more efficient "exhaustive near neighbor technique" and produces what he calls a "hierarchy of data items." His meaning of hierarchy is different from the present invention's notion of what will be discussed herein called the "Hierarchy of Awareness". In the present invention, every new convergent node encountered is another step up this "Hierarchy of Awareness". Each convergent node increases the size of the data items associated. That means, the larger the association of data forms in the present invention, the higher the relative awareness, generally speaking, and the further up the "Hierarchy of Awareness" that data form is. By default, in the present invention the larger the data form, the more highly evolved it is. Specific, relevant awareness akin to conditional or context based human awareness is an emergent property of the present invention pertaining to robust embodiments and is a relative awareness state. Awareness states in the present invention are specifically defined as any data association ranging from but one pixel of one data type to perhaps billions of multivariate pixels across many time and space cross sections of data encounters involving many response potentials, with human level awareness representing the highest known such states. Potential awareness is seen as a function of resources configured according to Gravity Logic.

Mahoney describes his hierarchy as, "For a given pixel the hierarchy indicates an approximate near neighbor." His hierarchy is thus a table or data list which could identify all the relative proximities each cell has to every other. But this is impractical as he notes, and instead he resorts to processing that relies on smaller regions of the visual image he calls zones. The present invention does not function in this way. The present invention focuses on the center of the visual time frame with standardized visual data samples with each pixel's relevance determined by where it is in relation to the center, if one were comparing a visual embodiment of the present invention. These discussion and comparative points in no way limit the ultimate scope of the present invention. That is, in the present invention the center of the visual grid is always, by default, the most important pixel site for any image processed, until some higher awareness state emerges to dictate otherwise, as will be explained later. These basic default states that are universally applicable to any data type truly distinguish the present invention from all others in that regard. For now, the present invention relies on basic universal defaults to get started but once started and assuming memory and learning resources are configured (they need not be, but that limits the potential awareness as, for example, a lack of memory in a human would limit their potential awareness), then experience begins to converge with new data streams and memories and feedback begins to influence what the defaults initially converged on as choices. The present invention assumes memories are relevant until proved otherwise. Memories are higher awareness states that override the basic defaults. Memories become the basic defaults that apply. No other nearest neighbor invention has such initial default states that are universally applicable to all data types which is one major advantage of the present invention over the prior art. Gravity Logic alone allows the present invention to converge on the memories that are most relevant so that the present invention can rely on those memories in deciding what to do. Then, Gravity Logic defaults focus on apparent change as will be described to isolate those aspects of memory that failed to meet default expectations. This allows the present invention to focus only on those aspects that differ and to iterate towards ever more perfected response states.

Parallel processing is a major aspect of the present invention. Many nearest neighbor inventions offer parallel processing opportunities but none like the present invention. Mahoney's parallel methodology differs because he has to deal with parallel communications between what he calls owner cells and near neighbors that results in "communication collisions". He resorts to collision resolution logic such as "by accepting only the first value to arrive, by allowing later values to overwrite previous values, or by combining the colliding values using a function such as the maximum or minimum." The present invention's parallel processing logic functions without concern for collisions or which data gets where first. Unlike all other parallel inventions, the present invention is parallel by nature, which is a major advantage because it makes possible real time resolution of enormously complex data streams. Also, unlike any other invention, each data item, from individual pixels to complex associations thereof way up the Hierarchy of Awareness, are all unique form in terms of time, space and form.

The present invention may seem like a neural network because it claims to be able to evolve relative awareness states and response states that allow for a learning dynamic. However, the closest analogy seems to be more like a domino strategy where you configure the invention as prescribed by Gravity Logic and the dominoes are the various data types that have been configured for processing. These trigger all sorts of defaults as they flow through the system and these defaults are self directed outcomes based on the original pattern of the dominoes themselves. When memory resources are configured, these provide the system with the ability to adapt the basic defaults around the memory resources so that these resources become the defaults that apply as the system experiences things.

In pattern recognition and other neural network like inventions the concept of Relevance has always been problematical as no one until now has had a base theory for defining what relevance is in any situation nor has the field found any common ground for even defining what relevance really is. Mahoney mentions the notion of what is relevant in a given image and this notion deviates greatly from the present invention's revolutionary approach which is characterized as relevance by default according to Gravity Logic, i.e., gravitational relevance, as will be explained more later. Mahoney states that he does not deal with all pixels and particularly those that are not relevant. He then backs into what is meant by relevant by stating that "an attention mechanism" is needed to conditionally determine what is relevant in any given image. This approach requires human context and some kind of existing reference point to specify relevance. That means, designers have to anticipate what may be encountered and set up relevance filters specified in advance, which of course cannot possibly deal with the contextual potentials in just one image let alone multivariate perspectives on reality as the present invention can.

In the present invention, relevance is universal, independent of context to start (which is how the default processing functions) and always consistently converged upon. Relevance is defined herein as a function of Gravity Logic where, for now, things that are found to be relatively most central (not just in a visual time frame, but in any type of data's time frame) are by default most relevant, and only those data forms that survive competitive convergent node processing in the present invention are deemed relevant by default (where applied Gravity Logic in program and processing logic automatically sorts out what forms are relatively more fit than others). Relevance and awareness are relative states in the present invention that are a function of experience and current encounters. There are no conditional or specifically applicable algorithms in the present invention. This approach works on all data types. The only algorithm of any kind in the present invention is Gravity Logic, but it is not conditional or specific to certain situations as are all other algorithms. Gravity Logic is a universal default logic only roughly related to nearest neighbor logic but independent of the actual data. Once implemented, data filters through the convergent node process and emerges as relatively gravitationally relevant data patterns.

As will be detailed, the present invention relies on what one might characterize as nearest neighbor defaults that apply first to time factors, then spatial address factors and then data form factors independent of what values are contained in any data stream being processed. So one contrasting point are these standardized time, space, and form factors that are not required in any prior art involving nearest neighbor logic but which are required in the present invention (although implicit relative time and space factors based on sequence or relative position rather than explicit time stamps and space address factors may be utilized to prioritize data forms and define their relative relevance to each other).

Gravity Logic specifically operates on proximity in time. We first determine which data items pertain to a given time frame. Each data type comes in separate time frames at some specified sampling rate.

Then Gravity Logic applies to the relative cross sections of space. Spatial addressing factors (binary addresses typically) are utilized at whatever spatial resolution an embodiment has specified. Spatial addresses provide the reference by which to converge on which data forms within a given time frame are proximate to each other. This is where the similarity to nearest neighbor methodology begins and ends. Such neighbors are spatially relative to the center of the time frame. (Think of time frames in terms of visual pictures. Unlike pictures, many kinds of data will not line up in grid like manner. That's where Gravity Logic extended to data forms then provides a way to emulate the logic of mass to establish relative center of gravity based on relative size).

So lastly the new Gravity Logic then compares the data forms' values within a time frame to each other and ends up converging on those sites which have the closest fitting data values. Like values that are neighbors attract.

As such, one important advantage of the present invention is that an embodiment of the present invention is not concerned with any specific pixel to pixel values per se as all other nearest neighbor inventions are. Here, just any pixel to pixel results that have high degrees of fit (such as two matching neighboring red pixels or blue pixels or any color, or if we were dealing with stock market data, two 100 share trades of some common stock at $110.50 per share versus two 100 share trades where one trade was at $110.50 per share and another trade was at $109.75 per share within the same time frame. If the number of shares differ, then the total value of the trade would differ as well). The present invention defaults into assuming these like valued samples within a time frame that are spatially proximate are by default related to each other. This does not mean a red pixel in the middle is assumed related to one that is not surrounding it as with some other nearest neighbor inventions. Instead, Gravity Logic requires some resolution be specified as in horizontal and vertical neighbors or horizontal, vertical and diagonal neighbors, or actual physical coordinates and distances discernible due to such higher resolution coordinates. This is one of the ways Gravity Logic is imbedded into the configuration before processing actually starts. Once gravity resolution is specified, spatial resolution is effectively specified for that data type as well because gravity is treated as a function of space itself in the present invention. Thereafter, the set of nearest neighbors relevant to each cell is fixed and always pertains regardless of what image is processed. But note, that even though each cell in a visual grid has a fixed set of nearest neighbors as other nearest neighbor inventions, the present invention distinguishes among these in terms of proximity to the center of the time frame. This means each cell's relevance in terms of every other cell is always consistently determined regardless of what is processed. While many inventions may have processes that focus on the center of things, none apply to data forms with time, space and form values and none process their data forms as herein prescribed.

As mentioned, in the present invention patterns emerge that are first based on overall time, then space and then form proximity. Each data type processes in terms of its own time frames so that patterns within each time frame first emerge for each data type. Nothing like that exists in other inventions. This offers parallel processing advantages because each different data type resolves concurrently and does so in relation to cross sections of time and space and form.

Then, the present invention continues to converge on still higher awareness patterns based on apparent change across time frames for each data type individually. We now have the advantage of concurrently converging on relative change in terms of each data type configured. The ability to automatically discern relative change is a function of applied Gravity Logic. This is so because once Gravity Logic converges on specific patterns within time frames (herein called potential objects of a single data type), that same logic then allows an embodiment to rely on what it experienced in the initial time frame. As such, and by default, any differences in space and form stand out and they do so in an inherently parallel manner making for a great processing advantage. In the present invention, change is thus a function of Gravity Logic as well.

Once change is discerned in an embodiment with the requisite resources for each data type, then even more complex patterns (awareness states are defined herein as any data pixel or higher association thereof in the present invention uniquely defined in terms of time, space and form factors) are discerned across data types when the present invention relies on time and space factors to compare disparate data types.

U.S. Pat. No. 5,140,670 Cellular Neural Network (CNN) issued to Leon Chua, Nearest Neighbor logic is relied upon for building the neural network. His invention relies on the physical proximity of neighboring circuits and the speed with which it takes signals to get from any circuit site to any other to guide the system in deciding what data to process. His invention is essentially a processing device that can be employed by any neural network. His invention relies completely on the neural network application to conditionally dictate how the CNN will be utilized. He mentions templates and dynamic rules. Once the neural application is modified to the requirements of the CNN it then relies on the CNN's tendency to settle into equilibrium states based on the proximity of cells (circuits) to other cells and the time it takes for information to flow back and forth within such a system.

Of critical distinction and as with Mahoney, the CNN invention does not make a distinction between the very center of a visual grid, for instance, or the center of any other data type time frame. Instead, the CNN again takes each cell and sees layers of cells around each cell (in two or three dimensions) as if all the cells were equally relevant to start. The present invention specifically starts with the central region of each data time frame as most relevant by default. In the present invention, relevance is a function of the center just as gravity as a real force (rather than a logic) is a function of proximity to the center (gravity's attraction decreases with the inverse square of the distance from the center of a given body, but the general notion of decreasing importance with distance in general is applied herein, meaning distance in time, space, or form or collectively).

Further, the CNN invention makes no mention of standardized data forms with time, space, and form factors. The present invention specifically processes each data type configured for processing independent of every other data type and it does so by processing in terms of time frames and spatial proximities within each time frame with relevance emanating from the center of the time frame or from what one would call the center of gravity when data form values are processed (the larger the association, the larger the assumed data mass, the more relevant by default).

For example, other inventions designed for image processing might be able to apply conditional logic and specialized algorithms or rules to discern object outlines, or certain kinds of shading, and so on in a given image. These findings might be anywhere in the image and no priority is necessarily assigned unless the designer specifically defines what will gain a processing priority. The present invention works in a completely different manner.

First, the above approach where specific things are looked for in an image is an example of what one might call an existing higher awareness state also known as a top down search. One could employ huge manmade databases with templates of form that could be searched and matched sequentially or in parallel to a new image stream to perhaps find something that is similar to what is in the database. The designer's goals are imposed on the CNN or other nearest neighbor inventions to control and dictate how those types of inventions will function. While such impositions can be applied to the present invention, they need not be. The universal base approach operates without such impositions to evolve relative pattern awareness levels automatically and independent of such conditional logic from the pixel level upward. The present invention assumes for initial encounters, by default, that whatever it converges upon in the center of the data time frame is most relevant. As such, a base awareness is attained automatically by an embodiment on its own from the start. From this base level, vastly more complex, contextual awareness states can ultimately emerge as one applies the present invention's methodology to greater and greater amounts of resources configured as prescribed. Context is a function of memory resources. The more resources the more resolved memory can be in relation to current encounters. That is, relative awareness and response potentials configured to be driven by such states in the present invention are essentially a function of the resources and response states configured and the number of different data types and resolutions configured. Just as image resolution is a function of how many and how refined the pixels are, memories are like contextual pixels in the present invention.

Some prior art related to this invention's bottom up approach would be cellular automata which are pieces of logic with certain prescribed response states which automatically cause the cellular automata in a given logical environment to evolve on their own with various emergent outcomes that seem to mimic basic biological processes. The present invention does not assign specific response states to each cell. The present invention relies on gravitational default logic with generic response states to drive response potentials initially. Then those initial default responses, which would be at the center of the response range, serve as baseline responses against which a new kind of learning dynamic can begin to iterate towards ever more perfected responses in relation to data streams that are encountered and captured in memory. This learning dynamic is again based on the present invention's ability to discern relative differences between one time frame and another and the potential objects therein. Thus any change or differences discerned between a memory and a new data stream, however complex, emerges automatically and the invention focuses resources on those most proximate aspects of change so discerned. This capability is unique to this invention.

One can look at the CNN invention and see in its FIG. 3 and FIG. 4 diagrams that show how circuits can be configured in relation to each other. The present invention would take the CNN approach and specify that the black cell in the center of its FIG. 4 is not just the way each cell in the grid views the circuits around it, but that the cell/circuit in the center is by default most relevant. This is accomplished by using an addressing logic that imbeds the ability to discern relative distance from the center. His FIG. 4 shows one cell/circuit's view of the circuits around it. Each of his cells shares this view but none of them holds the default priority over all others. Thus, the present invention would migrate the CNN invention to an entirely new processing opportunity by specifying addresses that captured the logic of gravity where the very center cell's data samples always stand out as the most relevant site and samples regardless of what the system actually processes. This is a great distinction and only begins to illustrate the significant differences between the present invention and those mentioned and all other nearest neighbor inventions as well as any neural network or system of that ilk.

The present invention is universally applicable to all data types and all data processing objectives. Many nearest neighbor inventions apply only to visual processing inventions or to finding a route from a map database, or to specific neural network applications. The present invention applies to all data types as long as those forms adhere to the requirements that they follow standardized time, space, and form requirements. No other invention requires time and space factors be associated with all data types from the moment an embodiment encounters a data stream all the way through the convergent node processing steps where new data associations emerge, where each emerges with their own time and space factors along with composite form factors from the converging forms.

The present invention holds that solutions to any kind of problem are really nothing more than relative awareness states, where a certain pattern that is either the very best (exhaustive) solution, or a relatively optimal one (where relative can mean very nearly the best or quite crude), are converged upon. Once a solution (a result, a pattern) is arrived upon, that pattern can then be configured to interface with the system so that various response states can be influenced by such solutions. In the present invention, these solutions or patterns would trigger default responses based upon Gravity Logic once again, where a system, devoid of memories and experiences from which to draw upon initially, would nevertheless have a default response that would trigger within the center of the response range because Gravity Logic defaults again pertain to the center of a range and in the case of responses is the center of the response range. Such initial reactions then provide the basis for memories relating response potentials and the range of response potentials with newly encountered patterns and to then have open a new kind of learning dynamic. The learning dynamic of the present invention is unlike any other. It relies on Gravity Logic yet again and does so in the following regard. It assumes that all solutions or patterns are only relevant if they survive change. As such, all discerned patterns that survive within the present invention's competitive parallel environment are assumed by default to be relevant and that all aspects of those patterns pertain. Thus, any differences that are discerned (by Gravity Logic defaults), as detailed later, stand out and obtain a processing priority which means the embodiment devotes resources to first focus on discerned change. Further, due to Gravity Logic, embodiments will, by default, focus on patterns (data associations) that are most proximate to the embodiment itself because the embodiment is the most central location. And most importantly, an embodiment configured to deal with time series data encounters will automatically focus on change and change that involves itself. This leads to the emergence of what is herein characterized as a relative sense of self in relation to experience and whatever the embodiment's resources allow it to attain in terms of relative awareness states. The sense of self awareness emerges in the present invention because all learning focuses resources on change that involves self first The learning dynamic thus emanates outward in the same logical manner that the force of gravity does, from the center outward.

Nearest neighbor inventions exist that pertain to non visual kinds of data streams. In particular is U.S. Pat. No. 5,272,638 Systems and Methods for Planning the Scheduling Travel Routes issued to Cynthia Martin et al. The one key distinction between this invention and the present one is "An array of randomly ordered sequences is created with each sequence representing a unique ordering of the destinations to be visited." The key word being randomly ordered. The present invention acts consistently according to the logic of gravity. There are no random processes in the present invention unless such processes are desired to influence the basic gravitational defaults or for other possible reasons. That is, the present invention works on gravity defaults alone, however it has the flexibility to be influenced by any outside logic or random processes if designers wish to employ such means. This is possible because all such outside factors are treated as if they were existing memory states or as if they were part of the configuration (capable of changing or fixed), such as a resource constraint or a range or resolution constraint. This will be explained later, but it illustrates another advantage of the present invention in its enormous flexibility.

U.S. Pat. No. 5,272,638 also relies on genetic cellular automation to determine near optimal sequence of destinations. The methodology in U.S. Pat. No. 5,272,638 is limited to travel route applications and does not indicate how the method can be extended to accomplish generalized pattern recognition by data type in terms of time frames, spatial proximity within time frames or proximity amongst data forms within those time frames as the present invention teaches. The travel invention makes no mention of time frames as the base organizing theme of the data forms being processed. It does rely on spatial proximity as do all nearest neighbor inventions, but again there is no ultimate center of logic. Instead that invention relies on random generation of possible paths and then relies on sorting those according to proximity or other nearness criteria (such as the user choosing only highways versus wanting just any possible route).

All of the system factors indicated in the various nearest neighbor inventions could pertain to the present invention with the requirement they be reconfigured according to Gravity Logic. In applying the present invention to a traveling salesman type embodiment, the various data forms sampled would be similar to those in U.S. Pat. No. 5,272,638 with the addition of time stamps (in explicitly rendered embodiments) and spatial addresses that would be similar in form to what is in U.S. Pat. No. 5,272,638 (where actual latitude and longitude values are used to ascertain distance). The present invention would not begin processing with random associations, but would instead iterate from each possible site that is proximate to the starting point and destination point and do so in parallel. That is, if there are 200 possible sites defined that are proximate to the start and destination in the database (the present invention would treat these database values as samples), then there are some $n \times (n-1)$ or $200 \times 199$ unique associations among those points to begin with. The present invention would leverage this fact and apply Gravity Logic to discern which of these associations are most proximate in space and form within the time frame. If the application were enormously data intensive where instead of 200 perhaps 2 billion possible sites existed in some huge network where near optimal paths were sought quickly, then the present invention would automatically ration its resources to focus on the most gravitationally relevant sites first, i.e., those that are most proximate as well as the largest sites if data form values are of any importance. That is, if we had some number of salespeople and we wanted them to travel to the largest 40 US cities because population is a proxy for sales potential, then population size (the value of New York City as a pixel point) would become a gravitationally more significant site then Houston up to a point. That point would be the relative distance. That is, if you started in Dallas, then Houston is much closer than New York and might overcome the much larger population size just as the moon is almost as gravitationally significant to tides on earth as the sun is even though the sun is a million times larger than the moon, it is 93 million miles away versus 240,000 miles. The same kind of resolution potentials pertain in the present invention in regards to data values. Note, in the above commentary we are imposing external factors on the otherwise gravity default driven process because the embodiment cannot know what we want unless we specify our objective. Thus, the flexibility of the present invention to allow us to interface external factors into the default awareness process offers enormous advantages for situations where people can interface with an embodiment to explore alternative outcomes the human partner is in a position to evaluate. In these situations the embodiment is a pattern generation unit .The awareness is limited in that regard. We've just discussed an embodiment without a learning dynamic.

But again, no random logic is applied in the present invention, but it could be to provide ways for modest embodiments to be made interactive with users who wish to control and directly influence the pattern generation potentials, but that fact in no way makes the present invention remotely akin to these others.

U.S. Pat. No. 5,272,638 also says "to avoid redundant storage of latitude and longitude pairs, a list of unique intersection data structures is created." A similar outcome occurs in the present invention but it occurs automatically and consistently within the present invention and occurs in any data type by time frame according to spatial proximity of each data type and form proximity. Thus, U.S. Pat. No. 5,272,638's unique list is a human effort at starting out with a non redundant data list, not a dynamic process that operates on disparate data types. The reader must note the distinction between a table of humanly compiled data options and one dynamically evolved and an invention that is limited to one very conditionalized travel application versus the present invention which is universally applicable to all data types without conditional human logic without the need for random process logic.

U.S. Pat. No. 5,272,638 also states, "A node may be evaluated multiple times because there may be more than one unique path that leads to it, but only the node values with the lowest time remains on the final path list." In the present invention, the objective of a traveling salesman embodiment would of course seek the same result, albeit accomplished in quite a different manner. Again, if one eliminated the random operation specified in U.S. Pat. No. 5,272,638, the invention does not work. The present invention does work and that fact alone completely distinguishes the two inventions. U.S. Pat. No. 5,272,638 would have to apply exhaustive comparisons or settle for some number of alternatives obtained in order they appear in the database and sort those out and settle for what that approach might provide as a near optimal solution within these clearly less than optimal choices. The present invention's gravitational approach always converges upon the most optimal "pixel pairs" within resource constraints thereby assuring at least a relative level of near optimal choices regardless of how constrained the embodiment may be. This fact distinguishes the present invention not only from U.S. Pat. No. 5,272,638 but all others. That is, the present invention's approach always converges on the relatively best alternatives within the resource or other processing constraints (such as time) that may pertain when any situation is contemplated. Even in the extreme case where only 1 choice may be possible, the present invention's approach still defaults to a choice that adheres to Gravity Logic and is therefore better on average than a random choice which could of course happen to be the very best choice possible, but which will average out at a middle mediocrity over many applications.

As will be described in greater detail hereinafter, the method and system of the present invention differs from those previously proposed and employs a number of novel features that render it highly advantageous over the prior art.

SUMMARY OF THE INVENTION

Overview of each Object

The first object is to take the data stream of any data type which has been rendered in the form of a data time frame and discern potential objects of like data values that are spatially proximate to each other within the time frame that range in size from one to all N items that may exist in any such time frame.

The second object is related directly to the first. This object is to establish an inherently parallel processing method to resolve all potential objects of like value in any possible data time frame using what is herein called Gravity Logic. Each data type would evolve potential object patterns concurrently with all other data type configured because each would be an independent processing opportunity.

The third object is to rely on the potential objects discerned in the first object and using essentially the same methodology that established the inherently parallel processing methodology in the second object to then discern what are herein referred to as parallax object awareness whenever parallax sensory or input devices are configured. Typically one finds parallax patterns when two visual sensors or sonic sensors are configured to focus on the same cross section of time and space albeit from somewhat separated perspectives.

The fourth object pertains to change awareness in any possible data type once potential objects are discerned in object one or parallax objects are discerned in object three. Again the object here is to leverage the methodology that established the inherently parallel processing opportunity in object two using Gravity Logic to now discern what are herein referred to as potential changing objects. Such awareness spans two or more time frames of each data type configured. Again, each data type would have the ability to concurrently resolve its own potential changing object awareness with any other data types configured. This notion of multiple inherently parallel processing opportunities is herein called massively parallel processing. Massively parallel refers to the notion of more than one parallel processing opportunity. The more data types configured in the manner specified, the more massively and inherently massively parallel the embodiment.

The fifth object is to leverage yet again the previous objects to now discern potential changing data forms that incorporate patterns of two or more data types. This object intends to utilize the same Gravity Logic approach in object two to now allow convergence processing that pertains throughout the invention to converge disparate data types so that their separate cross sectional awareness in time, space and data form can overlay. This object leverages the fact that the data forms in the present invention carry a time stamp, a spatial factor and a data form component as part of the way all data is initially standardized in the present invention. At each convergent step the object is to affix a new time and space component to the data forms that associate at convergent nodes. In this way it is possible for converging data forms to establish how close in time, space, and form the various forms converging happen to be.

The sixth object is to take the patterns discerned in the previous objects and again leveraging the parallel processing object in object two, to again utilize Gravity Logic to now allow these data patterns to converge with configured response triggering sites so that an association between a converging pattern and a response sequence can then be associated. This object treats any response state as another kind of data type and applies the same logic that allows disparate data types to converge and relate as in object five. Here the difference is now some kind of response state is triggered. A response state can have from one to X number of triggering factors that can control that device. Further each of the triggers could have a range of responses ranging from one to Y. The more triggers and the more response grades per trigger the more robust the potential response. In this object, all of these possible triggering values, when they actually trigger, are rendered like any other independent data type. The entire response is broken into time frames containing anywhere from one to X "response pixels", if you will. In this regard, response states will be processed in the same way as specified in Object two.

The seventh object is to apply a memory potential so that it is possible to configure a memory resource ranging from one to any number of memory slots. Further, the object is configure these memory resources at anywhere from none (no memory potential) to any number up to all convergent nodes configured in any given embodiment. The object is to have all memories that evolve along the same convergent pathways to encounter memories that evolved before them and were associated and retained in relation to that particular node. The actual resource could be physically anywhere so long as the resource retains the link back to the node it formed. This object then makes it possible to again apply Object two and gravity logic in another inherently and massively parallel manner to concurrently recall the most relevant memories that exist at any particular node immediately after any new data association emerges at any such configured node. Again, like any kind of resolution, the more memory slots configured the deeper and more resolvable new patterns will be in relation to previous patterns. The parallel processing opportunity is present because each new data pattern that evolves at a memory node site will confront N memory items. By replicating the current pattern N times an embodiment can then concurrently compare at still other convergent node resources dedicated to memory processing so that all N comparisons resolve at the same time. Again, gravity logic will be utilized and all the results will organize in what is herein called gravitational relevance order. This pertains in all the objects above. There is an emergent learning dynamic that now pertains once memory resources are configured. Data forms that evolve at convergent nodes are data associations in time, space and form. They compete for processing resources when the methodology is applied. Only the most gravitationally relevant associations survive. There are a number of logical factors that pertain to gravity logic which are universally applicable to any data type that make the above objects possible.

Other objects, features and advantages of the invention will become more readily apparent upon reference to the following description when taken in conjunction with the accompanying drawings, which drawings illustrate several embodiments of the invention.

BRIEF DESCRIPTION OF THE DRAWINGS

In the drawings:

FIG. 4 is a block diagram illustrating specific parallel gravitational processing steps needed to begin to evolve potential visual object awareness at the two pixel level.

FIG. 5 is a block diagram illustrating the steps following the two pixel level of gravitational awareness shown in FIG. 4.

FIG. 6 is a block diagram illustrating the process steps where FIG. 5 is taken to the four pixel level of gravitational awareness.

FIG. 12 is a block diagram illustrating how two disparate data types, namely visual data and audio data can converge in a common cross section of time and space and how the present invention accomplishes this in parallel to discern relative change that involves any number of such senses that may be configured to converge in this manner.

FIG. 20 illustrates a 10 layer visual grid with 361 pixels generated in gravitational relevance order where the center of such grids are by default the most gravitationally relevant cell and that fact is captured in the way the cells are addressed in relation to the center.

FIG. 21 is a partial table of convergence processing steps related to FIG. 20 and shows only a portion of the 361 cells from that figure out to cell addressed 5.000 out of cells addressed up to 10.071. The table is generated in gravitational relevance order at the resolution of space that has been specified. In this example horizontal, vertical and diagonal neighbors are specified as gravitationally equivalent, a slight bias as diagonals are physically somewhat further if one were to use actual spatial coordinates. Also the numerical sequences are biased slightly as well and the cell we chose to start with in each layer is another slight bias. The table shows the most gravitationally relevant cells in order along with the gravitational neighbors. The method actually establishes pointers from the neighbors to the rows where those neighbors are themselves the focus cells.

DETAILED DESCRIPTION OF THE PREFERRED EMBODIMENT

The first object is to take the data stream of any data type which has been rendered in the form of a data time frame and discern potential objects of like data values that are spatially proximate to each other within the time frame that may range in size from one to all N items that may exist in any such time frame.

Figure 22:
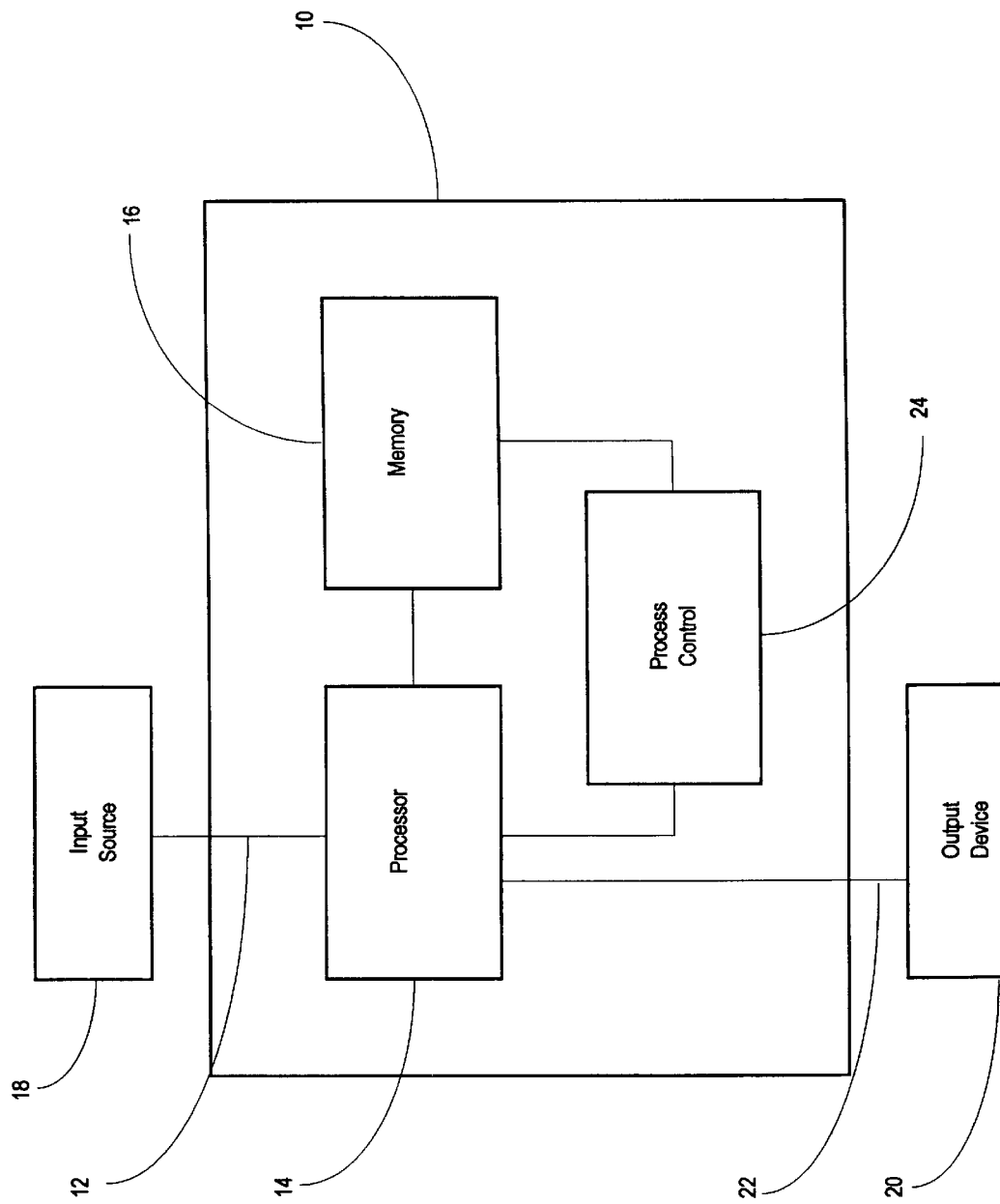
FIG. 22 is a block diagram showing a system for data processing that includes an input device conveying electronic signals at the predetermined data resolution rate via an input connection into a computer system having a memory, a processor connected to that memory, a process control connected to the memory and processor, with an output device connected to the computer system.

An embodiment will be configured to process anywhere from one to N data types all of which would follow this methodology. A data type refers to any individual variable pertaining to any kind of data. It could be a typical kind of data item found in computers, such as perhaps some company's Common Stock or some accounting information. Any common type of data qualifies. Any commonly used means for obtaining such data and getting it to feed into a computer system is the essential way this data would begin to be processed as in FIG. 22. This figure illustrates the basic processing elements including Item 18 representing an input device linked via Input Port Item 12 into the Computer System Item 10. The data flows into a Processor Element at Item 14 which interfaces with Memory Element Item 16 and Processor Control Element Item 24. Results flow through output channel Item 22 to drive an Output Element device at Item 20. The invention does require a time and space aspect be attached to each data type however as detailed below. This would be an aspect handled at the input device and interface into the computer.

Figure 7:
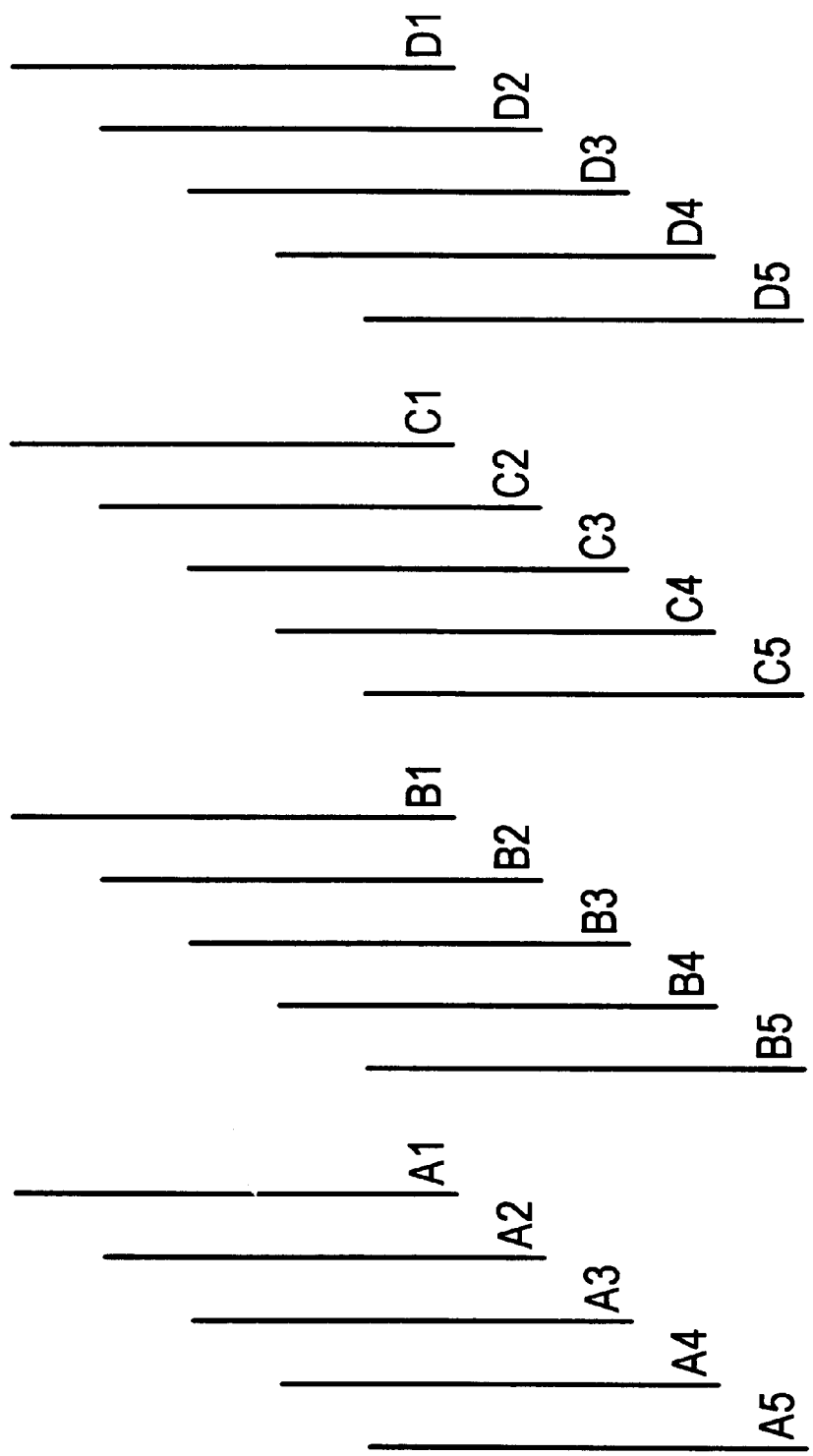
FIG. 7 is a block diagram illustrating a sound sensing device which could be based on physical hair like sensors akin to the ones in the human ear to create standardized pressure based data forms for sound.
Figure 8:
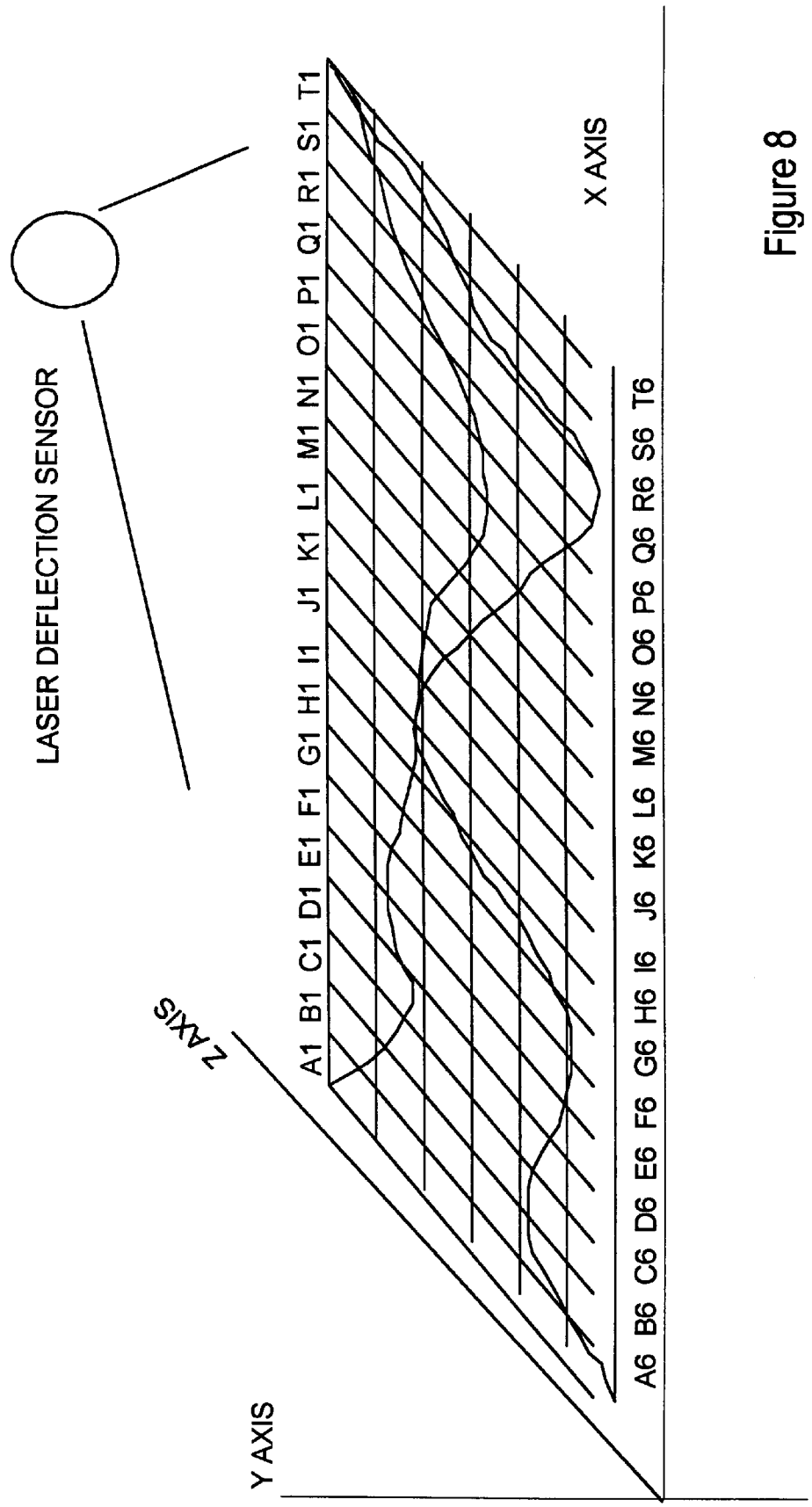
FIG. 8 is a block diagram illustrating sound sampling that relies on a laser to sense the relative deflection in a sound grid membrane in order to create standardized pressure based data forms for sound.

A data type can also be of a sensory nature such as a visual sampling grid or a sound sampling device. Any sensory device that can render digital data forms will suffice if configured as specified. Again time and space factors attach to these sensory data forms as well. See FIG. 7. This figure illustrates a possible sound sampling device which could be based on hair like sound sampling filaments. Each is shown with a coordinate using A1 to D5. This device is three dimensional in form and would emulate the way the human ear itself relies on hair like nerves to sample sound. This specification is not concerned with how these input and sampling devices are individually designed and built. Only the data streams are of concern and they need to adhere to the time, space and form standards specified separately for each data type. See FIG. 8 which shows another sound sampling device that takes a membrane sampling approach. This approach breaks the membrane into distinct cells. The deflection in the membrane relative to the third dimension represents the value of sound sampled. There are many ways the deflection in the membrane could be digitized. Here a laser device is shown that would use the reflected light to measure the sound deflection value. There are many sound sampling devices that can be utilized and configured according to the specifications herein. There is nothing in the present invention that cannot be readily accomplished by those familiar with digitizing equipment and how they can be configured into an overall data processing system. Every data type will have some device that is configured to deliver that data stream to the embodiment in the standardized format needed.

All such data types are rendered as typical binary strings of some length. The more resolved the data sample and the greater the sample range, the larger the binary data strings will need to be to render such forms. Stock market trades may flow in via a ticker tape interface or in any other commonly configured manner by which any kind of data can be input into a computer processing system. For sensory data streams any kind of device can be utilized that samples the data initially and then converts the samples into the same kind of binary data streams.

The present invention requires that time and space factors be retained at every convergent processing step beginning with input and then pertaining at every convergent node a data form later encounters. Designers need to specify the resolution of time, space and form that will apply to each data type they configure for processing. The goal is to consistently sample all data types at some specified sampling rate. These sampling or input rates can be fixed or they can be allowed to vary dynamically utilizing feedback means or allowed to be controlled by the designers through some kind of computer interface in case they need to be able to modify sampling rates. The preferred embodiment is to have each data type standardized as to time resolution, spatial resolution and data value resolution. The need for a fixed or variable sampling rate or outside interfaces is a function of the objectives specified in each embodiment. The processing of the data time frames all use the same method specified herein in any case.

A new kind of logic is employed in the present invention that is only slightly akin to what is commonly known as Nearest Neighbor logic. This logic is herein referred to as Gravity Logic. It is a logic with a very few aspects anyone skilled in data processing logic can understand and apply yet it has profound implications. Essentially, the approach says to emulate the way the force of gravity behaves in nature and apply the logical aspects of gravity to establish certain design features and processing features that adhere to this logic. Then the system will be able to process all data types in the same manner and discern potential objects of like value within the sampled time frames based on this one method automatically much the way intelligence evolves automatically in humans. Of course only the most robust embodiments would approach human potentials.

Gravity Logic has several aspects to it that are all consistent and which apply at different stages in the process. The first aspect is proximity. Things that are closer in time, space and form are more relevant than things that are less so by definition or by default if you will, in the present invention. This is similar to the way real gravity behaves. Things closer to the center of gravity are more attracted than things further away. In the present invention we take this gravitational approach and apply it everywhere in the way we configure a system and in the processes. That is we use this logic to guide the actual way elements in the invention are actually configured. A default is something that triggers like a reflex. The present invention behaves in a reflexive manner initially to lay the foundation for more robust awareness states to then emerge. Each new level of awareness replaces the initial defaults and become the defaults the system relies on as it grows in experience.

Figure 14:
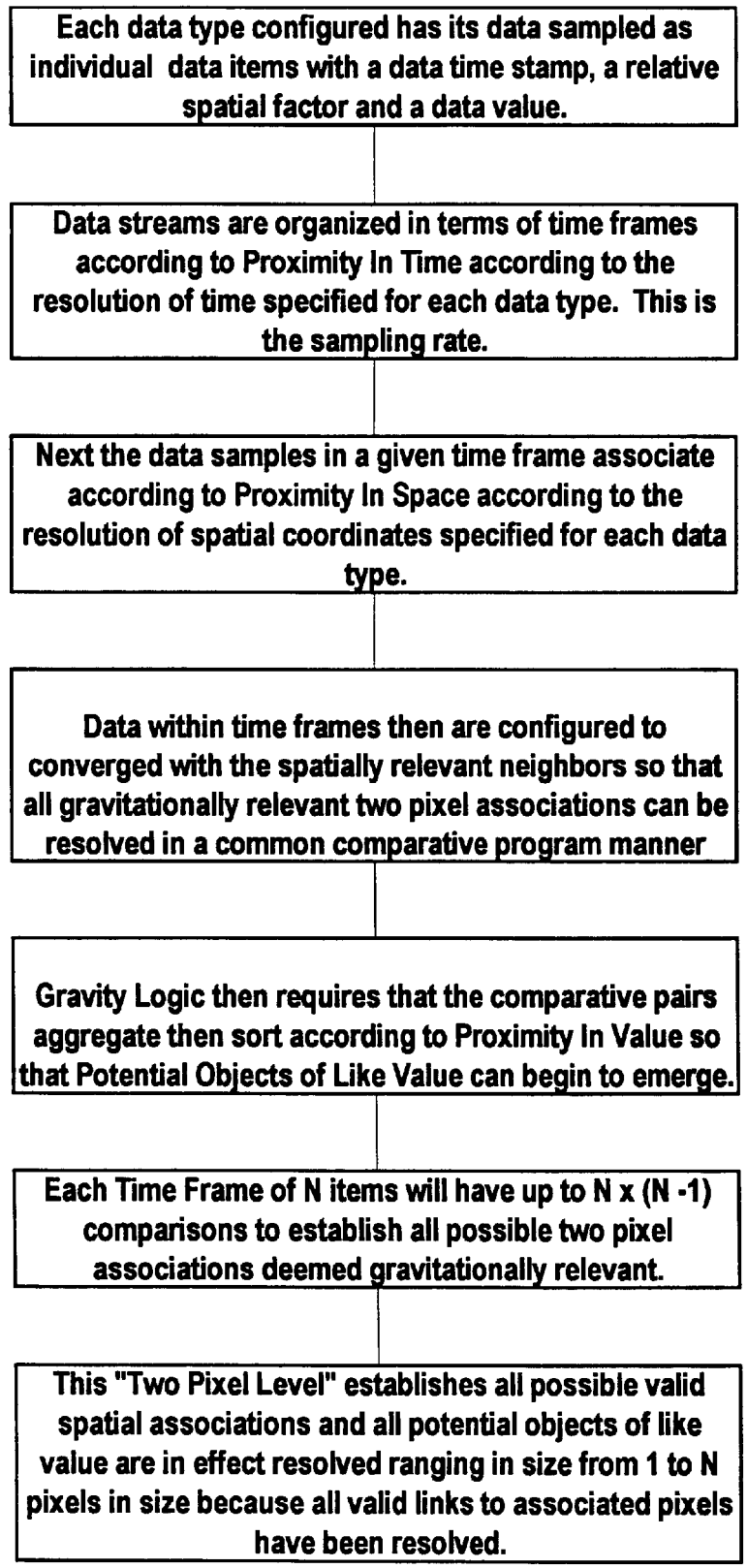
FIG. 14 is a block diagram flowchart that indicates the steps that pertain in the way gravity logic is actually processed illustrating gravity logic process flows in a single time frame applied to a single data type.

We apply Gravity Logic in three steps initially. The first step is proximity in time. The second step is proximity in space. The third step resolves potential objects and pertains to proximity in form or the actual data values involved. Refer to FIG. 14. It shows that each data type is standardized in time, space and form. It then indicates that data streams can now be organized into data time frames which represent, in effect, a sampling rate where from one to N items will be found (although a time frame with no samples is possible and that lack of data can be utilized as indicative of change but that case will not be detailed. It would apply the same methodology.). Then it shows that data then processes in a manner that leverages the spatial resolution factors that are standardized. This allows for a relative association in relative space within the sampled time frame among the data samples. Next it shows that the data values relate to each other in terms of form proximity. The word proximity is meant to signify the logic of gravity where proximity to a center of focus, the center of gravity, pertains. This is a logical focal point around which all the data forms can relate. It then indicates that the two items that converge at this level, herein referred to as the two pixel level of awareness, then are collected and sorted in order of proximity of value. This step pertains independent of what any specific data time frame may contain in values. The values associate in terms of common values if they happen to be proximate in the space within the time frame. Anyone skilled in the art can implement these steps. The next step indicates that any time frame of N pixel samples can potentially have as many as $N \times (N-1)$ neighbors that may be gravitationally worth considering. This is the exhaustive two pixel potential inherent in any time frame. However when spatial coordinates resolve actual physical proximities, then only those data forms that are gravitationally equivalent neighbors are allowed by the system to associate at the two pixel level. The others would only associate when larger data associations within the time frame evolve. This shows how gravity logic is made part of the configuration itself. Only certain data items flow in certain ways that are established as gravitationally relevant. The next step indicates that for any time frame, all potential objects in that time frame are actually resolved when the two pixel level is complete. This is due to the gravitational nature of the approach. All valid associations are either gravitationally relevant and survive or fail to be gravitationally relevant enough and die. Once the possible link between any two spatially proximate pixels is severed then one needs to only follow the established links between neighbors whose links survived to isolate the various sized objects of like valued pixels.

Proximity in time is established separately for each data type by designers as the time resolution specification. If we choose to process visible light at a fixed 24 frames per second then time is resolved to $\frac{1}{24}$th of a second. This applies even if the actual time stamping potential of a computer is actually in the nanoseconds. That means if we have visual grid of 361 pixels in 10 layers as illustrated shortly, each pixel sampled may actually not all bear the exact time stamp, but the system will force all pixel samples into the specified sampling rate of $\frac{1}{24}$th of a second. If one were seeking visual awareness capabilities able to discern patterns in chemical reactions, then nanosecond speeds are too slow and a different time frame rate in the femtosecond range might be involved. The choice is based on the reaction times needed to deal with change as measurable by any data type as determined by the designers.

If we use stock market trades as our data variable data type example again we could specify that all Common Stock Trades of certain companies will resolve every ten minutes. This would mean any trades in between time frames would still end up associated with the closest time frame. One can look at this time frame logic as queuing up the data until the time frame cutoff is reached. All the data that has now grouped into a single time frame of data is now ready to be processed.

Each data type will have its own time resolution rate specified. This is commonly referred to as a sampling rate. If we have vision samples streaming in at 24 frames per second and sound samples organized into 48,000 time frames per second, that means we will have sound frames resolving 2,000 times faster than vision. This will influence the resources designers need to configure for each data type. It will of course affect the resolution of patterns individually in terms of sound and vision and collectively if sound and visual patterns are configured to converge as detailed later in the multivariate awareness object.

For all data types, our goal is to first discern in each separate data type the like valued objects where the samples (herein characterized as pixel elements) involved are all spatially near each other meaning gravitationally relevant by default. This brings us to the second step in Gravity Logic processing, proximity in space. We need to discuss proximity in space as it pertains to sensory data types first then explain how non sensory data streams implement this step. Sensory data types tend to have actual spatial coordinates while other data types tend not to. Both actually have spatial aspects but they represent different resolutions of space that slightly affect the processing of these data types. The method is conceptually the same and based on the same gravity logic, the actual implementations that one can employ can be modified to reflect the lack of resolution as I will now explain.

Space is ideally resolved in terms of relative spatial coordinates. Such coordinates can extend into virtual spaces involving any number of mathematical dimensions, but the discussion will focus on normal space. The number of mathematical dimensions would be processed in the same manner in any case. Anyone skilled in the art could readily configure the methodology presented in readily available hardware and software. One can see this in the notion of time frames already presented. Space proximity is also something everyone can understand.

Each sensory data type will typically involve a physical sensing device of one to N sampling sensors, herein referred to as pixel sensors. Each is essentially a point like sensor. The more such sensory points the more resolved the sensory time frame. A digitizing camera is such a device. The pixels are all fixed in relation to each other. Any picture taken is rendered the same way. Sound and visual sensors are typically two dimensional and rely on parallax effects to process three dimensional data encounters while physical touch sensors like an electronic skin around an electronic hand would start with a three dimensional form.

In the present invention, the goal is to take such a sensory device and assign each pixel in the device a relative spatial address of some kind that will maintain this information as each pixel sampled flows into the system for processing. Even if the sensory device moves in real space to some other sampling site, the individual pixels retain their relative spatial proximities. Space resolution is thus a function of the space pertaining to the sampling device.

As stated, the preferred embodiment will apply spatial addresses that resolve spatial proximities to the highest degree possible. In practice, each sensory device's addressing approach will reflect the resolution of space deemed necessary by designers. Again the choice will reflect the ability to discern relevant change in that data type.

Gravity Logic is applied to the configuration itself. This means that a device behaves in a gravitationally relevant manner the moment it is turned on. In particular, this means the center of any sensory grid is by default always the most relevant site to start. Only higher awareness states will be shown to override these initial defaults. In a three dimensional grid such as an artificial skin around an artificial hand the sense of touch would require a three dimensional addressing approach to capture the center of gravity in such a device. Once specified, the same sensory sites will always relate to each other in a consistent manner. Unlike other Nearest Neighbor inventions, this one specifies that one location is always the most relevant. The relevance of all other sensory sites is a function of proximity to the specified center. In this way, anything sampled by such a device will automatically know which pixels are gravitationally relevant. Like other Nearest Neighbor inventions, each cell looks around its physical space to discern which cells are most relevant to it, but this invention goes beyond that in assigning a center of gravity to the whole scheme. As higher awareness states evolve that involve patterns that may or may not be in the center of the time frames, each such object retains the spatial information to determine that object's relative center of gravity in relation to the time frame's center of gravity as well as the relation to the centers of gravity in any other objects in the same time frame.

Figure 9:
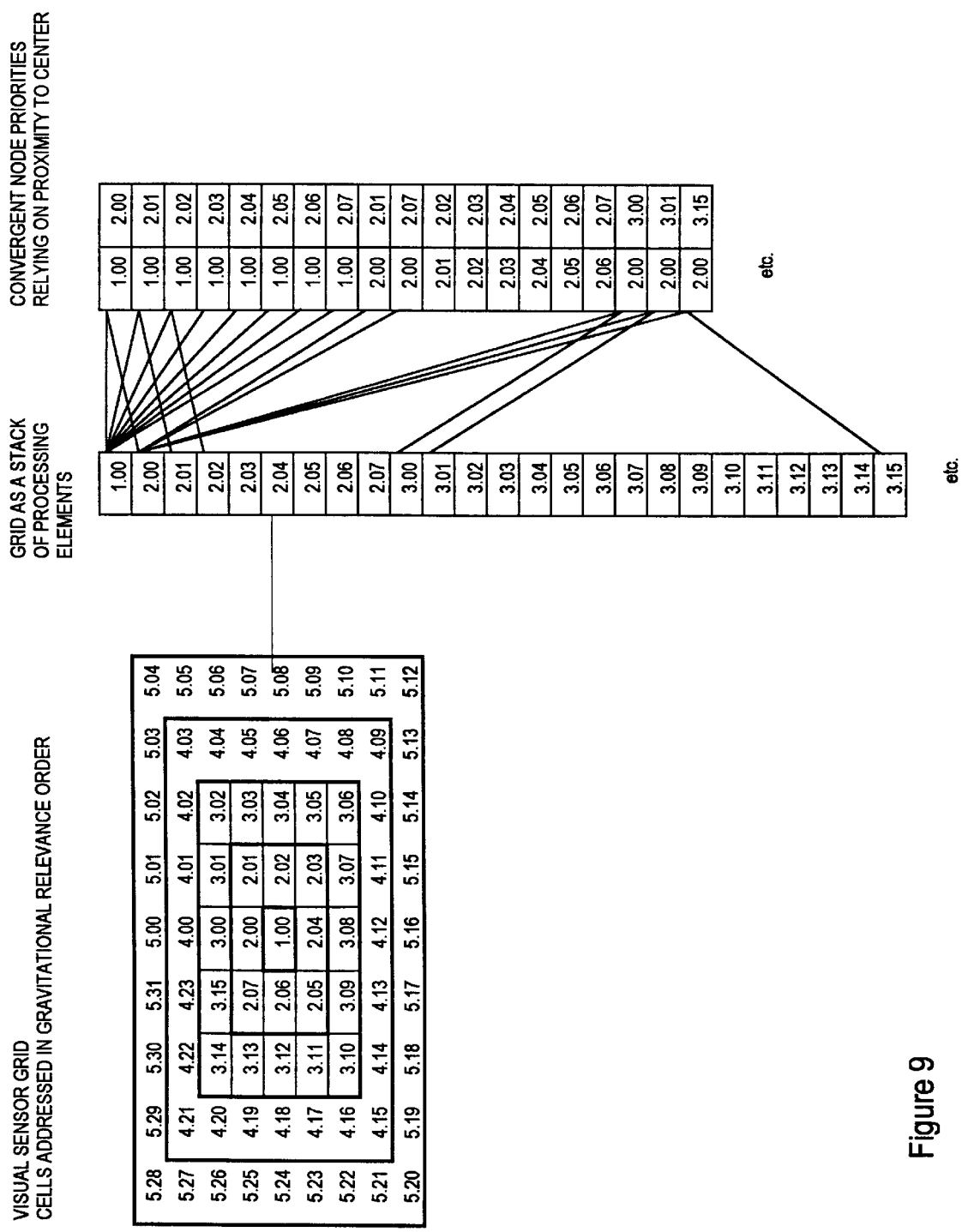
FIG. 9 is a block diagram illustrating a visual grid adhering to gravity logic with the center of the visual field addressed as the highest gravitational level with each layer of visual pixels addressed accordingly spiraling outward with gravity resolved to horizontal, vertical, and diagonal neighbor levels.
Figure 10:
FIG. 10 is a block diagram that illustrates parallel parallax processing in a visual situation.

Refer to FIG. 9. This figure shows a five layer visual grid. The cells are gravitationally addressed starting with the central cell which is numbered 1.00. This grid then numbers the other layers accordingly in relation to the center and that establishes their spatial proximity and resolution of space. The grid is then shown as a stack of data elements when routed into a computer system. Then it shows how eight copies of cell 1.00 are configured to converge with that cell's eight gravitationally relevant neighbors. This figure applies resolution at the horizontal, vertical and diagonal neighbor level which means each cell has eight equivalent gravitational neighbors (except for perimeter cells, of course). This is a small visual grid with limited resolution. A larger grid with smaller pixels would make for a more resolved image opportunity.

Refer to FIG. 20 which illustrates the same approach applied to a larger visual grid. The point to note is how consistent the methodology plays out as one scales up or scales down the embodiment's elements and resolutions. FIG. 20 shows a 361 pixel visual grid generated in accordance with Gravity Logic. Gravity Logic directs that the cell in the center is again most relevant. To capture this we need to number that pixel in a way that will allow a computer system to discern that fact numerically. There is no real gravitational force involved of course. We emulate the presence of such a force by insuring our configuration makes it possible to relate to the center of the data time frames involved. The way we set up the processing steps applied to our data inputs insures that the data all flows and interacts as if a gravitational force were directing them whenever we compare them. The concise program logic applying comparisons such as standard deviation measures establishes the proximity in time, space and form at the convergent site, or node. The numerical result is the relative rating of the gravitational proximity. In this way all the numerical values can be related to a common center of focus and the numbers can than force the various data factors to sort in relation to the common center of focus. Every processing step has this one objective regardless of how complex the number of data items may become. One basic approach generates all possible data awareness states.

In FIG. 20, we could have assigned true space like coordinates so that each cell's physical distance from the center could be discerned. I chose instead to illustrate a less resolved approach to highlight the fact that resolution of time, space or form is a design decision that will affect the ultimate resolution attainable in the patterns discerned. So in this example, we specify that all horizontal, vertical and diagonal neighbors around any cell are gravitationally the most relevant, just as one might find in other Nearest Neighbor inventions. However, if we number the cells in the grid by spiraling outward from the center cell 1.000, and if we arbitrarily choose to spiral from the top first and proceed clockwise, we will generate an addressing scheme that captures the resolution of space needed to at least prioritize pixels in gravitational relevance order for any image actually sampled.

It is then a direct matter to generate a visual grid of any size that adheres to gravity logic and to address each cell in a manner that resolves gravity anywhere from its highest resolution down to one like we have illustrated. The reader will note that the numerical method used biases the relevance of cells in each layer. That is, cell 2.000 is numerically and thus gravitationally more relevant than the cell next to it, 2.001. Physically, those cells on the diagonal are slightly further than any horizontal or vertical cell as well. Only in the most extreme and rigorous systems will this level of bias and resolution error affect awareness states or patterns discerned by the embodiment. In this example we can readily see that any image processed will be sampled in a gravitationally prioritized manner before we even begin to try and discern object patterns within the time frame.

Figure 1:
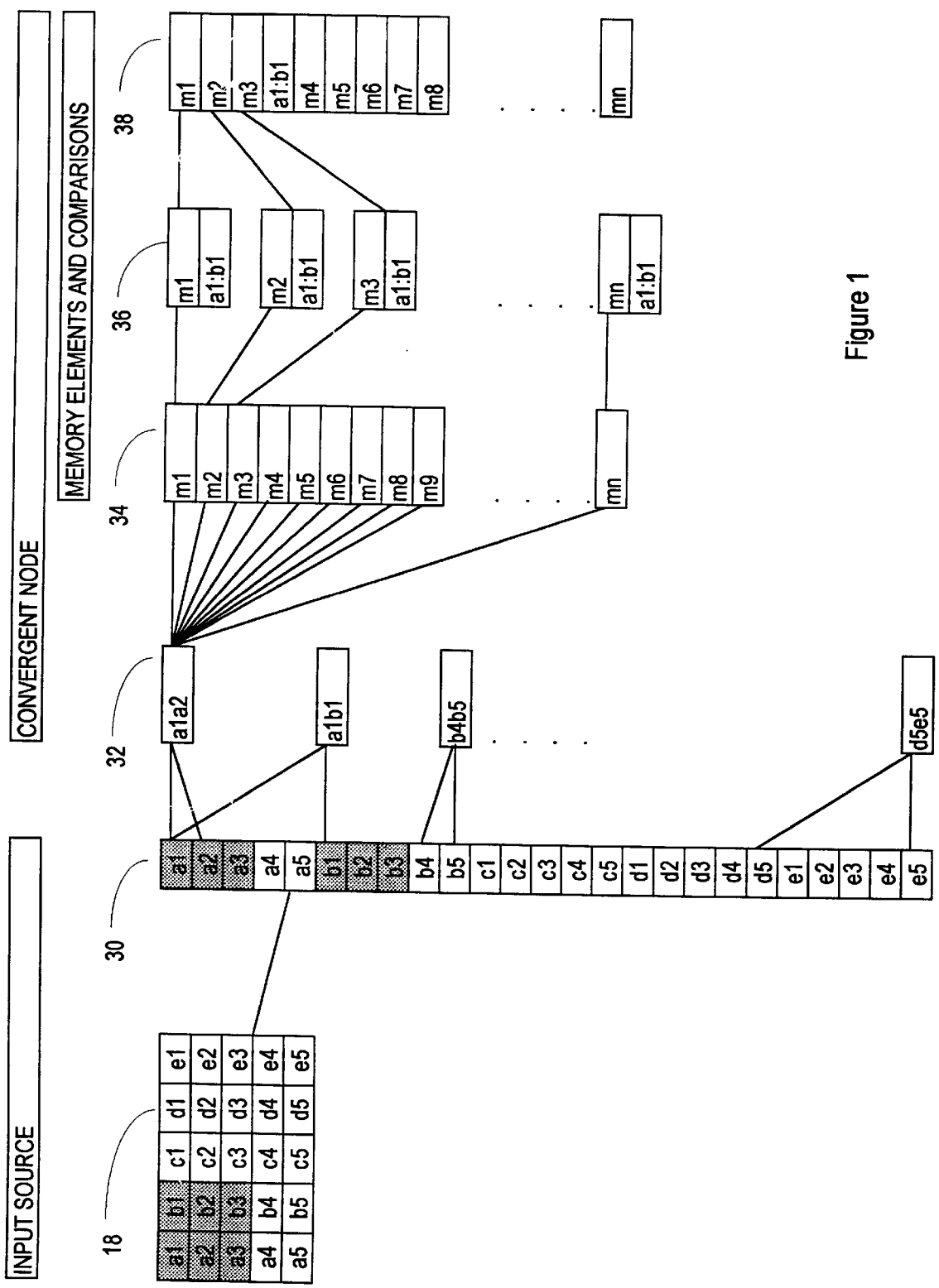
FIG. 1 is a block diagram illustrating a 25 cell sensor grid with replication and routing in a parallel manner with resident memory.

The present invention offers many alternatives. The manner in which time, space and form are resolved is a design decision. Different approaches are more refined or resolved than others. Another way to address a grid in gravitational relevance order is shown in FIG. 1. Item 18 is a small visual input grid device (indicative of Item 18 in FIG. 22). The addressing approach is biased to the upper left much like a spreadsheet program's approach to identifying the cells in the spreadsheet. The gravitational ranking makes the upper left corner the center of gravity in this case. The relative ranking of the other cells is self evident based on the alphanumeric address of the cell. Item 18 is labeled as an input source and acts like a reflexive grid reacting to light consistently. While we illustrate these grids as two dimensional forms, internal to a computer system this layout needs to breakdown into processing elements. The cells in any grid essentially are like a stack of data elements. The addresses retain the original way the cells organize. The logic of Gravity Logic is illustrated with items 30 and 32. Item 30 shows how cell a1 links to two other convergent nodes in item 32. These are labeled nodes a1a2 and a1b1. These illustrate a spatial resolution limited to horizontal and vertical neighbors because cell b2 on the diagonal is not included. Only a few examples of the convergent nodes that would apply to this type of grid are indicated. It should note that items 34, 36 and 38 indicate the later object where memory resources which these items represent are configured in relation to specific convergent nodes. There are n memory items, m1 to mn, indicated at item 34. The lines emanating from convergent node a1a2 at item 32 linking to each memory item illustrates the logic that multiple copies of node a1a2 can be compared concurrently. This is discussed in object two where parallel processing is the object. Item 36 is indicative of convergent node resources dedicated to memory comparison. Item 38 is indicative of memories organizing themselves within the limited resources in gravitational relevance order.

Figure 3:
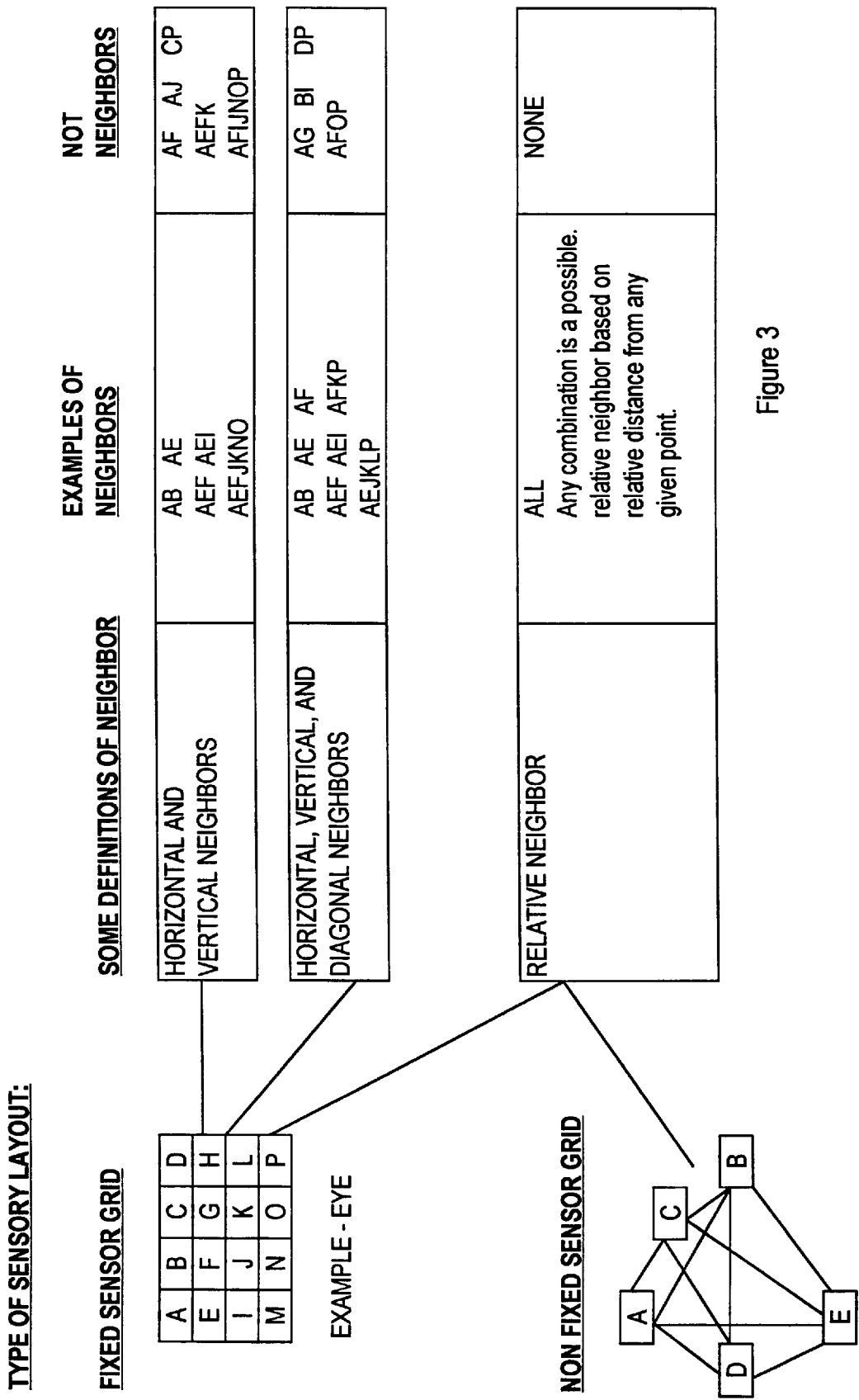
FIG. 3 is a block diagram illustrating the meaning and application of gravity resolution.

Referring to FIG. 3, one first sees a fixed sensor grid with cells addressed A through P. It points to horizontal and vertical resolution levels and shows examples of which cell associations would qualify as gravitational neighbors and some which would not. Then the fixed grid points to horizontal, vertical, and diagonal resolutions and shows examples that qualify and some that do not. Below the fixed grid is an unorganized sensory array with cells A though E. The unorganized grid points to some relative neighbors that may now qualify as neighbors. Gravity can always be resolved in terms of physical distance from a central focal point (center of gravity). One can specify to what relative resolution gravity will be applied. If a grainy enough resolution is specified than all the cells in the fixed sensor grid might be within that resolution and be considered gravitationally equivalent neighbors even though they are not gravitationally equivalent in a physical sense.

The implications of this approach now begin to emerge. Before we apply the third step, proximity in form value to actually begin to discern like valued potential objects in any time frame sample, we need to discuss the configuration implications in our addressing scheme.

Each time frame sampled will have from one to N samples (although time frames of no samples are possible, these will not be explored in the discussion but would still be processed in the same manner). This means there can be from one to N objects in such a time frame ranging in size from all pixels associated as one big object down to N objects of but one pixel each, or any number in between. It should be appreciated that there are N factorial ways by which to associate the individual samples in any time frame. This potentially vast number is even larger when the range in data values are factored in. A visual gird could have millions of pixels per time frame and millions of factorial patterns. No system before this one has ever found a way around this dilemma. Gravity Logic accomplishes this quickly and directly as follows.

Gravity Logic forces everything to associate in relation to the center. Each cell views the situation as if it were the center of gravity. However, there is always a preexisting center of gravity which ultimately forces all the cells to associate in relation to both the ultimate center and their own center. This is accomplished in the way data samples are allowed to associate with each other.

In order to discern potential objects, we need to begin to associate the individual pixels in some way so that they can ultimately aggregate into whatever like valued object exists in a given time frame. The reader must note, we are not looking for anything of specific shape or value. The process is looking for any pixel to pixel relations that happen to be of like value that also happen to be gravitational neighbors. Thus, each cell will be forced to associate only with its gravitational neighbors first. In our example, this would mean each cell associates with the horizontal, vertical and diagonal neighbors around it. If we resolved space without diagonals in our specification to perhaps save on convergent processing resources, accepting the slight compromise in spatial resolution that triggers, then each cell would not associate with diagonal neighbors. Again that illustrates how a gravitational design decision affects the configuration even before any data is processed. Data will not flow if it is not in a gravitationally relevant order.

If we refer to FIG. 50, we have 361 pixels (19×19 pixels organized into ten layers around the center). Each pixel has eight gravitationally relevant neighbors always before we start processing, except for the perimeter cells of course which have fewer neighbors. We could render the relevant gravitational associations in a table format to appreciate the gravitational aspects more clearly. We can then use that table to guide us in the way we would actually configure a system to process the data in any time frame sampled for that data type. Each data type would have its own such table of relations.

Recall, we adhere to Gravity Logic at every step. Thus, the table of associations is rendered in gravitational relevance order as well. This is directly generated as well. Refer to FIG. 21 a Table of Convergence and FIG. 20. One needs to begin at the center of logical gravity in FIG. 20 which is cell 1.000. Spiral around that cell according to the resolution of space where all horizontal, vertical and diagonal neighbors are relevant to each cell.

Cell 1.000 can then be listed in row one, column one in our table. All the neighbors encountered can then be listed in the columns next to the focus cell. Row one then looks like row one in FIG. 21. Now we go to the next most relevant gravitational cell and spiral around it in the same manner. The focus cell is thus cell 2.000 and its neighbors are listed in the columns next to it. We do this for each cell spiraling outward from the center. The table generated is organized in gravitational relevance order. Every relevant pixel to pixel association is captured in gravitational relevance order as well. We can explode this table into the convergent nodes that one needs to configure to actually process these associations. This is a configuration design step. We are building Gravity Logic into the way we will allow data samples to converge at convergent node sites. We are not specifying which ones will converge for any given image. The actual samples in an image will dictate how these potential associations actually play out. The data streams are self organizing once Gravity Logic is configured as shall be shown below.

The table says to relate cell 1.000 with eight other cells. This means we can sequentially do this if we chose. I will illustrate the sequential approach in Object One and then come back and show how this is actually an inherently parallel processing opportunity of unprecedented capabilities.

Sequentially we take the sample in cell 1.000 and send it to a convergent node where it will encounter the neighboring cell specified, cell 2.000. Cell 1.000 samples will always meet cell 2.000 samples for any image. Gravity Logic now assures that. Likewise, a copy of what cell 1.000 sampled will converge with a copy of what was sampled by cell 2.001 because 2.001 is a gravitationally relevant neighbor as well. Thus each cell essentially repeats this convergent step eight times, except for perimeter cells of course which have fewer neighbors. This is a processing methodology anyone skilled in the art could readily implement in myriad ways.

Every image processes in this same manner initially. Once patterns are discerned, the focus of Gravity Logic shifts from establishing proximity in value to the counter of that, establishing differences, but that will be discussed in Object Three. Now we can discuss the third step in Gravity Logic processing, proximity in form (the data value itself now comes into play). Once again Gravity Logic comes into play before any programs at any convergent node are actually executed. Gravity Logic is now used to guide the program logic used at each node. Of great significance is the fact that every convergent node uses the same program (or copies thereof in the parallel embodiments). Indeed the size of this program is so small that everything presented can readily be rendered onto microprocessors because the logic itself is fixed even though the actual data processed varies.

The essence of Gravity Logic is this notion of proximity especially to a common center of focus. Now we need to ascertain how close in value any of the gravitationally qualified pixel to pixel convergences are. We can do this using comparative programs written in any software language or rendered onto any kind of circuit, such as one where the Standard Deviation of the population are established. The population is comprised of the values that are converging at a given node. Here we are discussing the two item convergence, but any number of items can converge at a node at the same time. The population would be the number at each node, not all the other pixels in the time frame that are converging elsewhere.

The Standard Deviation is itself a kind of gravitational logic as it establishes dispersion around the mean or center of gravity, which is why I chose it. By having each convergent node calculate the standard deviation we again capture a numerical value that represents the force of gravity in a logical sense. We can now collect all the convergent node results and allow this simulated force of gravity result to rank the associations. This is a sorting program element. A routing element would route the convergent node results to a common processing area and sort them in standard deviation order. The list is now in gravitational relevance order according to proximity in value.

Figure 13:
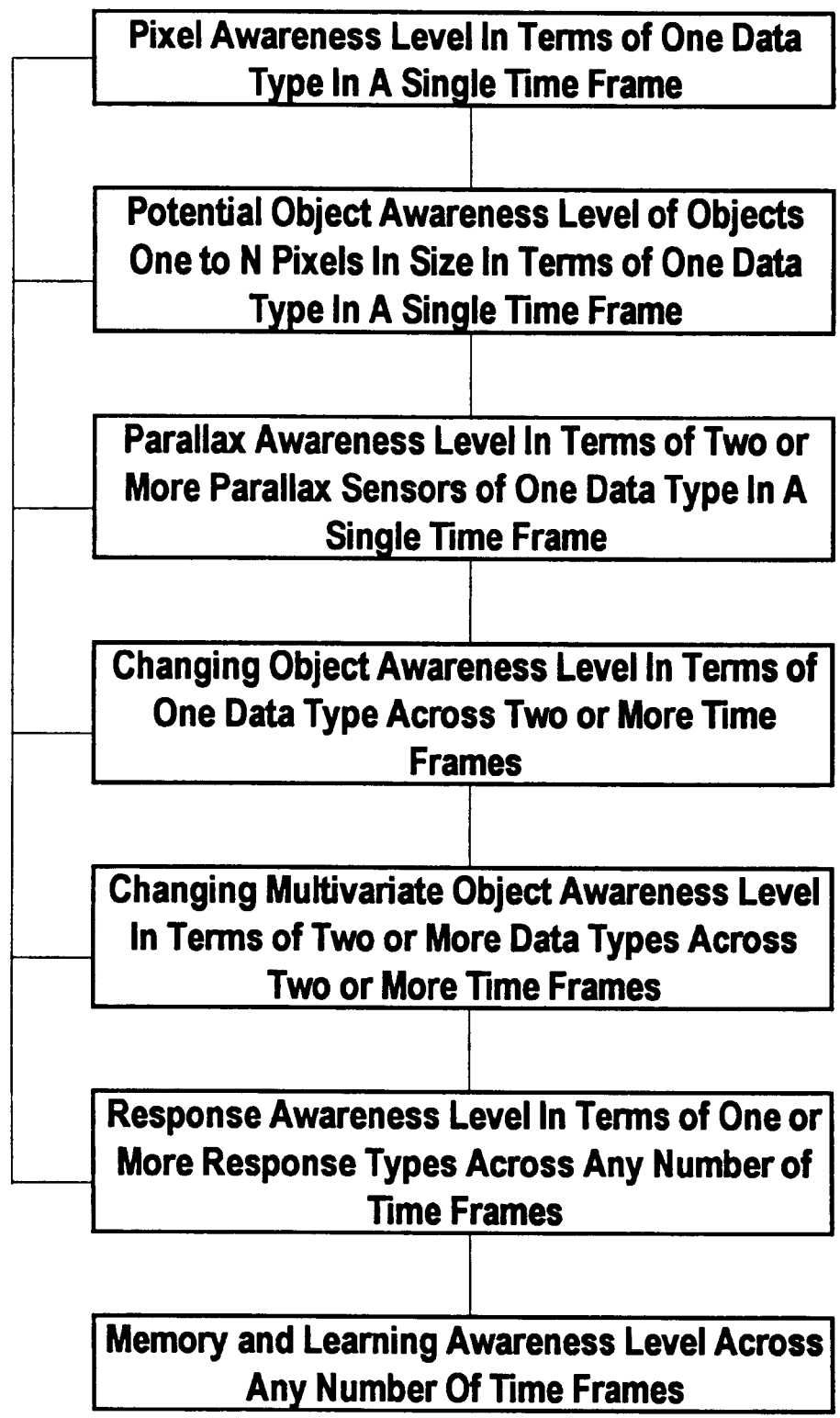
FIG. 13 is a block diagram flowchart identifying the distinct levels of awareness or pattern recognition that pertain referred to as the Hierarchy of Awareness.

We have just taken the first step up what is herein referred to as the Hierarchy of Awareness. Refer to FIG. 13. The block diagram is a logical flow chart that concisely outlines the distinct levels of awareness. It indicates that the pixels are the lowest level of awareness. Then it indicates that potential objects range in size from one to N pixels per given time frame sampled. Next it shows that parallax awareness, if configured, is the next level of awareness and pertains when two or more sensory grids are configured to focus on the same center of gravity or focal point. Not every level of awareness needs to be configured, but every level configured employs the same methodology. The next level of awareness pertains to change awareness across two or more time frames for each data type. The next level of awareness involves two or more data types overlaid in time and space. The Response level is shown as the next level of awareness and the various lines flowing into to it from each of the lower levels indicate that the response level can be configured to interface with any of the other levels of awareness. The last level involves memory and learning elements.

Conceptually, patterns evolve along what is herein called a Hierarchy of Awareness. This begins at the one pixel level. Each convergent step is another step up the hierarchy. Regardless of how relevant in practical terms certain associations may be at any level, the more convergent steps taken to evolve a given association of data samples, the higher the relative awareness, by definition. In any time frame of N samples, there are N levels of awareness (a function of the resolution). The lowest level would be one pixel sized associations. The highest would be one object where all pixels associated, as in a solid blue object filling the entire visual grid. Associations in between represent the resolution range specified. One could use the word step instead of level when discussing the time frame awareness "level". By default, the bigger the association of pixels in a given time frame the more relevant in gravitational terms. One could characterize this default as a form of Logical Mass. Mass and gravity are related and the logic does follow here as well. This bigger is more relevant default is only a foundational default that begins to establish relative pattern awareness and to assign a relevance to any such association. In later Objects we will see how smaller, but changing objects, especially ones involving the system itself emerge as more relevant at times than larger static patterns.

Our pattern recognition objective is unlike any other invention's objective. We seek to discern objects of like value that are proximate (gravitationally relevant) in the same time frame. This makes for a very fast, concise and efficient processing methodology. The approach is applied to all data types making for enormously redundant processing steps involving different data streams. The only time we deviate slightly will be discussed shortly when we explain how non sensory data streams, like Stock Market Trades for instance are processed. Such data streams lack the spatial resolution inherent in sensory streams. How we deal with that is straight forward but changes the second step in dealing with spatial proximity.

Before we discuss how all potential objects are actually resolved once the two pixel level is complete, the reader should appreciate the logical steps that pertain to the patterns this invention can discern. Patterns evolve in principle one pixel at a time. Objects of two pixels are first discerned. Then objects of three pixels because you cannot know about the two pixel alternatives until you encounter them in some manner. The one pixel step at a time basis for pattern recognition is illustrated in three figures. Refer to FIG. 4, FIG. 5 and FIG. 6. These show pattern awareness evolving at a two pixel, then three pixel then four pixel level respectively along with factors that point out why we do not need to do it that way after the two pixel level is resolved. Gravity Logic provides a fantastically telescoped way to converge on any sized object directly after the two pixel level. When one factors in the later object of inherent parallel processing, then millions of convergent steps across any number of variables can resolve concurrently in a very few concurrent steps. This represents a profound breakthrough in pattern recognition technology.

In FIG. 4 space is resolved only to the horizontal and vertical neighbors. This resolution choice defines 24 possible unique convergence pairs that are gravitationally relevant in a visual grid that is not as gravitationally configured as gravity logic suggests because the upper left corner is addressed in a manner that makes it the center of gravity. But in a single time frame embodiment with modest pattern objectives, the issue is not as significant as it might be in more robust embodiments.

The same 24 pixel combinations pertain to all possible visual data encounters. Pixel 1.1 will not meet pixel 3.1 unless the gravitationally relevant neighbors in between happen to be proximate in data value. All 16 pixel samples will always replicate and route initially to the same convergent nodes defined by gravity logic. Then emergent gravitational relevance will dictate which paths will be followed next. Self awareness then dictates. The comparisons illustrated here are the comparisons that represent what happens everywhere in an embodiment. The basic processing logic thus revolves around common comparison applied at convergent nodes whose results then sort and establish the most relevant patterns in a relative sense. Clearly, even if a single common logic pertains, specifying the resources and the physical challenge of configuring them can be a challenge. I am not discussing the background operating system issues that may pertain in any embodiment either as these are really factors that pertain to any computerized system.

We can see in FIG. 4 all non redundant combinations in the table labeled Adjacent Horizontal and Vertical Neighbor Evolution. Instead of $N \times (N-1)$ or $16 \times 15 = 240$ possible pairs to consider, gravity logic reduces the potential to just 24. A ten fold reduction before any comparisons have been made. This table shows in column 1 the alternatives numbered 1 to 24. Columns 2 and 3 show the cell addresses involved in the convergence. Columns 4 and 5 show the color values from the sampled image. Column 6 shows what the average color value would be for the pixel pairs and represents the center of gravity for the values encountered. Column 7 shows the standard deviation of the population calculation that resolves proximity in form. Recall that standard deviation is a gravitational statistic that pertains independent of specific meaning. It involves dispersion around a mean. There are many kinds of gravitational types of statistics one could employ. This is but one illustration and in no way limits the invention to this approach. Also note that one cannot know the standard deviation until one evolves awareness of the average. In that regard, standard deviation is a higher awareness state than the average.

The table next to it labeled Sorted by Std Dev Evolved Pairs according to Color Fit is the same table sorted in gravitational relevance order using standard deviation. This Figure then teaches how to implement any gravitational convergence at any resolution as follows. First, a resolution is specified for the particular data type, the spatial resolution and the time resolution. Gravity resolution is linked to available spatial resolution. The form resolution is limited to 256 colors here. Spatial resolution is limited to horizontal and vertical neighbors. Time resolution is not relevant because only 1 time frame is involved so no time stamps are shown. As such, all samples are by default of the same relative time implicitly. Gravity resolution is then limited to the address method chosen.

Given a 16 pixel visual grid, reality is further limited to being resolved into 16 visual pieces or pixels. Since we only have one time frame, the notion of a sampling rate is not relevant to this level of awareness. Given these resolution specifications, we can then evolve the gravitational convergence hierarchy for this embodiment. Convergence occurs in gravitational relevance order. The table of data actually represents the convergence schema for all possible images. Columns 1, 2, and 3 alone are templates for how all samples will flow. The table shows how to replicate each sample and how to route each sample. It shows by default the address of the convergent node as being a concatenated version of the addresses of the individual samples. That is, cell 1.1 and 1.2 converge at node (1.1:1.2). All nodes will be uniquely addressed in this manner by default or some similarly consistent manner to uniquely identify the spatial address of the convergent node. Another copy of cell 1.1 flows to converge with a copy of 2.1 at node (1.1:2.1) which is on line 2 of the table.

So far we have seen replication and routing logic specifications. Anyone skilled in data processing systems could implement what this table shows either in software or hardware or a combination approach. The next step in the process occurs at the individual convergent nodes (rendered like a common spreadsheet in this case). An embodiment that took full advantage of the inherent parallel processing opportunity would use 24 processors that all concurrently resolved the average and standard deviation values of the encounters at their sites. Each node is independent of the others. Thus, if 24 processors were used, then all 24 standard deviation calculations would resolve in the time it takes for one to resolve. This is 24 times faster than using a spreadsheet program to calculate each row sequentially, all things being equal. We see quite clearly that an inherently parallel processing opportunity can be implemented in a parallel or a sequential mode, and the level of parallel implementation can range from a one to one processor to node approach (the fastest), down until we have just one sequential processor. See object two.

The convergent nodes can be physical or logical sites because the system is electronic. You could have dedicated circuitry to physically represent such nodes, or use software and dynamic memory such as random access memory, RAM, to establish the nodes there. Clearly operating system and other hardware and software factors come into play that would be affected by such decisions, but those factors are ancillary and outside the scope of discussion. Whatever way is chosen, the aspects of Gravity Logic processing stated herein pertain in some way designers will relate to their choice of hardware and software.

Thus once the nodes have evolved their standard deviation values, those results are then routed to some processing area where sorting program elements sort the set of convergent nodes in standard deviation order. The results would then be the same as the sorted table shows in FIG. 4.

If one is employing a pure gravitational default then only those pixel pairs that have exact 0.0 standard deviations (no distance between the values and thus right on the center of gravity) would qualify for further evolution resources. That is, in this image only the first four rows in the table would qualify to evolve to the next level involving three or more pixels. The others would then stop evolving and all the individual pixels involved would represent separate like colored object forms.

These illustrated patterns truly offer very limited utility. But awareness starts from pixels to basic self justifying patterns to more complex ones. This illustration shows how a very grainy, poorly resolved image of potential objects of like value emerges. The intent is to show the base case defaults of Gravity Logic and what they accomplish. Then we indicate how more resolved configurations can employ the same methodology and evolve more resolved awareness states of more utility. Furthermore, it cannot be emphasized enough that this is just the foundational awareness level from which higher level awareness states across time frames and data types can then emerge. Just as you cannot know the millionth place in the number pi without encountering the first 999,999 places nor can babies speak until they encounter other humans for a few years, you cannot become aware of more complex awareness states or patterns without encountering the earlier ones that the complex ones are really based upon. This is a bottom up emergent processing approach.

So far we have only progressed to the two pixel awareness level. In a 0.0 standard deviation resolution, only four pixel pairs would qualify for further convergence in this data sample. What we have here is this self awareness that emerges in terms of surviving pixel pairs. These survivors dictate what further convergence will occur. This is a competitive, emergent awareness process. Each picture processed this way will determine on its own which convergent nodes to allocate for further processing. Gravity logic independently dictates how further convergence potentials are actually resolved. Any pixels that survive contain within them the spatial information as to what neighboring cells are gravitationally relevant One need only use program logic that identifies the set of horizontal and vertical neighbors that now pertain to each surviving pixel pair.

Referring to FIG. 5, this illustration extends FIG. 4 to the three pixel level. Here all 50 different three pixel combinations that are gravitationally still relevant spatially are shown, ignoring any cutoff that may pertain from FIG. 4 results. If one were applying the 0.0 cutoff then only the four qualifying pixel pairs would be involved instead of all 50. The others are shown to highlight the fact that they are clearly not proximate in data value. Specifically, node (1.1:2.1) had a 0.0 standard deviation. Its gravitational neighbors are 1.3, 2.1, and 2.2. The other three perfect nodes were (2.1:2.2), (4.1:4.2) and (3.1:3.2). The intent here is to list the entire exhaustive three pixel gravitational alternatives to contrast an exhaustive gravitational convergence set with a non gravitational one. That is, a 16 pixel grid has 16×15×14 three pixel combinations=3,360 possible alternative associations while the gravitational version has just 50. The actual focus has been reduced to just those three pixel alternatives that pertain to the surviving pixel pairs.

Thus, the figure teaches how to implement a gravitationally driven convergence hierarchy that self allocates convergent resources based on gravitational survivors. One needs to identify the qualifying gravitational neighbors that pertain to the survivors, and only those secure processing resources. Thus, three pixel nodes such as (1.1:2.1:2.2) would emerge out of this visual time frame's gravitational potential.

Evolution proceeds conceptually one pixel at a time until currently evolving forms meet all the gravitational cutoff points. Here, the cutoff is a 0.0 standard deviation. If the cutoff had been higher, i.e., grainier, then additional combinations would survive to evolve further. Ultimately, one can see how gravitational logic eventually will encounter all gravitational neighbors, and all potential like colored objects within the cutoff resolution specified will emerge, automatically, consistently, independently, and in an inherently parallel manner.

Each level of convergence is inherently parallel because all qualifying three pixel, then four pixel and so on sized forms secure their own processing resources independently.

All three pixel sized forms emerge concurrently. All fours emerge concurrently, and so on. It is a direct matter to determine which cells are neighbors as associations grow because the spatial factors are always present.

If no convergence outcomes meet the cutoff survival criteria, then the time frame is resolved and all potential objects of like colored values have been discerned. Each such object is just an array of the original samples associated by gravitational relevance. Each cell in these arrays still retains the address and time of the original samples' birth encounter or pointers back to that level of detail. All the samples that constitute a potential object array are time stamped as of the time frame itself and are thus synchronized as of that time frame. Further, all potential objects are located in a relative spatial sense with every other object in the time frame because the addresses are associated with the forms. Thus, a relative gravitational relation between potential objects is present.

Refer to FIG. 6. Here the process and calculations shown for FIGS. 4 and 5 are continued to the 4 pixel level showing how the same methodology pertains as we progress up the hierarchy of awareness. The reader will note that FIG. 5 and then FIG. 6 actually repeat steps that have already been resolved at the two pixel level in FIG. 4. We already know for instance that cell 1.2 does not rate high enough to converge with cell 1.1. Therefore it is redundant to consider if cell 1.2 then fits with the two pixel sized objects containing cell 1.1. The same wasted effort pertains in considering if the object found at the three pixel level involving cells 1.1, 2.1, and 2.2 relates to any of its neighbors since we already discovered at the two pixel level that there are none. I will now discuss how a rapid convergence onto all the various sized potential objects takes place once the two pixel level is resolved.

Anyone skilled in even basic computer programming skills can see how the above logic could even be rendered in something like a spreadsheet program. We basically follow the Table of Convergence of any image sampled. We execute all the convergent nodes and then sort the comparative results. We have resolved what is herein referred to as the two pixel level of awareness. All we did was generate all gravitationally relevant two pixel pair associations and then we sorted them. Something profound and quite unobvious has been established. We actually have encountered all possible potential objects of any size from one to N pixels after this one step.

The Table of Convergence actually renders the relevant time and space into a gravitational grid. At first it represents all possible ways pixels can associate. It holds all N factorial combinations. When the two pixel comparative step is complete, that step establishes which of the N factorial alternatives survive. We can look at the table as if it had lines linking each focus cell to its neighbor. The comparative step then breaks those links that fail to attain high enough comparative outcome. The default outcome is to allow only exact matches survive. If we are dealing with visual pixels, then only convergent nodes where exact colors converged would survive (or colors within some less restrictive cutoff which designers could impose if they wanted to). Only pure reds, pure oranges or whatever perfect matches were present The Table of Convergence can then be used as a gravitational template to directly discern where the potential objects are. The nodes that are not perfect matches would be deleted from a copy of the Convergence Table. We could take a copy of the template and use it for guiding the processing steps for any image encountered.

The colors actually encountered could be filled into the template copy. This is the same as filling some memory element that cell represents. Then the comparisons could be executed at convergent node elements. Here we could run a spreadsheet program to compare the pixel to pixel associations represented by the table. The results need not be routed to a common sorting area since a gravitational cutoff is present that immediately establishes the node's relevance. The results either meet or exceed the cutoff and survive or fail to reach the cutoff and essentially die. If they die, the original neighbor can be deleted from the table to signify this new fact. In this way the table is our processing template and it reorganizes itself so that each row only contains cells that now match in value within the cutoff that pertains to proximity in value. The reader should note that designers could easily override the absolute default and impose a less perfect match approach that would then allow combinations that were close but not perfectly matched in value to survive. That would evolve patterns that were less perfect in value, which could be a very useful outcome in some embodiments where absolute color or value match is not what the designer seeks, but instead a general tendency of colors or values of some other data type of essentially a certain value are sought. The cutoff is a configuration decision. It does not specifically pertain to any particular image per se but to all possible images. As such, it is an independent factor in its own right.

In any case, the methods are the same and only the qualifying survivors would differ leading to different object patterns. Instead of more items, this fuzzy criteria would lead to fewer, bigger items perceived.

Here is how all potential objects now resolve directly. We do this in Gravitational Relevance order as well. Begin with row one in FIG 21. All survivors in that row are by default associated with the focus cell 1.000. If no neighbors survived, then cell 1.000 represents a single pixel sized object in the center of the visual grid. If neighbors remain then they point to all other neighbors that we now know must be associated as well. That is, each cell that is a neighbor to one or more focus cells is itself a focus cell as well. Thus we see how each cell's center of focus points the way down the table. If cell 2.000 survives in row 1.000 then we would go to the row where cell 2.000 is the focus. Any neighbors that survive in that row are by default part of the association that started with cell 1.000. It's similar to the math rule if A=B and B=C then A=C. When things are fuzzier the equals sign is replaced with a symbol that would signify "similar enough to" so that we get if A is similar enough to B and B is similar enough to C the A is similar enough to C. These are vectors linking all gravitationally related pixels.

We follow each survivor to their already established endpoints. Once object starting with cell 1.000 is complete we then go back to the top of the gravitational relevance table once again and begin discerning object two. Object two's most relevant cell is the first focus cell not already associated with the first object. One way to do this would be to delete the cells that go into the first object once we know that. This way the first cell at the top is by default the cell we start with because it did not go into the earlier object pattern (did not become one of the pixels in the array that represents that object's pixel elements).

We do the same thing until we encounter the least gravitationally relevant pixels associated with that object. We proceed down the table and thus evolve in gravitational relevance order all the potential objects in this data time frame sample. Any image encountered will automatically resolve all potential objects of any size after the same first convergence step resolves all qualifying pixel to pixel survivors. This does not just pertain to visual data as used for illustration purposes only. It pertains to all data types. We have a universal engine by which to evolve gravitationally relevant data patterns.

The reader should readily appreciate how this can be implemented once the foregoing is understood. The logic illustrated in table or spreadsheet format can be rendered in any kind of software or hardware manner. One skilled in the design of microprocessors can render the entire process in that format. The following discusses the subtle differences that pertain to how a traditional data stream that is non sensory can apply the above methodology to evolve potential objects in the same manner. The issue is spatial resolution in this case.

Everything is the same except for the resolution quality of space. Assume for discussion purposes the data type is some company's common Stock Trades, e.g., 500 shares at $110.75, another of 10,000 shares at $110.50 where N such trades happen to be associated as of a certain time frame resolution rate. Assume the time frame sampling rate resolves time so that every minute a data time frame is established.

The first thing to note for such a data stream is the fact that the number of samples per time frame, the data pixels, can vary whereas in a sensory time frame they tend to be fixed in number (although one could readily have a sensor that did not register a sample because the sample was not intense enough to trigger the pixel sensor. These null samples are valid values processed like any other). The second thing to note is that spatial addresses that make immediate and obvious sense in a visual grid for instance are less obvious for stock trades or any other such data.

Step one, proximity in time establishes the data time frame as before. Step two, spatial resolution pertains to specified resolution of space, such as physical distance via spatial coordinates or something less resolved such as horizontal and vertical neighbors as before. When these coordinates are lacking we face a gravitational default that limits how much space we can resolve. You can only process up to the resolution of time, space and form provided. When spatial coordinates of some kind are lacking then the resolution of space is limited to the data name itself. All names are relative spatial coordinates. That means, all specified Stock Trades are resolved in name only. We are lacking resolution that would immediately tell us where the center of space is in the time frame. The center is not resolved by the name alone.

The entire time frame is thus, at first apparently nothing but one big potential object involving all the stock trades that were sampled in that time frame. However, Gravity Logic provides a default that actually allows us to directly resolve potential objects as before and in fact converge on the center of logical gravity in the time frame anyway. Recall that Gravity Logic defaults so that the largest association of objects in a given time frame are by default most relevant. This can be considered a form of Logical Mass if you will because in real physics mass and gravity are related. Given nothing else to go on, the default assumption that bigger is more gravitationally relevant pertains. This same notion pertains when space coordinates are lacking.

Since space resolution is lacking, we are actually done with step two regarding spatial resolution. We are actually at step three form resolution due to proximity in form. Now we look to the data values we would normally consider in step three when proximity in form was processed at qualifying convergent nodes. Now, because we lack coordinates to guide us in what is most relevant by default, the data values themselves qualify as proxies for mass. The bigger the values the more gravitationally relevant. In these kinds of variables where space is resolved in terms of nothing better than a common variable name, designers have to specify what is considered large and what is considered small. With data types, designers have to specify the direction of gravitational relevance that pertains to a given data type. This will establish the default logic that will then pertain thereafter. The system cannot know what humans consider more relevant when it comes to these kinds of data types. As such, the designer has to establish the gravitational orientation. There are actually three ways one could orient any such data type. Bigger values are best. Smallest values are best. Any specific value is always best (always the center of gravity). That specification will establish the default orientation that pertains. It establishes the survival criteria that will pertain thereafter for any time frame encountered. In that regard, this is another configuration factor that goes into the design before any data is processed. This decision is similar to the notion of countervailing data types that normally exist by which a balance between them emerges. Costs offset revenues for instance. A cost points one way—smaller is better. Revenues point the other—larger is better. The financial officers want to hit certain data targets so specific values are best for either. In nature, real survival pressures shape awareness as it pertains to sensory data types. With human data forms these naturally apparent directions are lacking. Indeed, designers have to specify the orientation of all data types to establish the direction of gravitational orientation. What this fact does is most apparent in higher levels of awareness where multivariate awareness states are evolved and where the change perceived in such countervailing data types compete and balance the response potentials.

To conclude the discussion on how to process data types with name resolution spatial factors, the present invention treats each data type as a separately resolvable cross section of time and space. We are in effect organizing the data into proximate time frames and proximate data types. We need to sort the samples in the time frame to establish the same kind of Table of Convergence that we utilized before. Instead of some fixed number of gravitationally relevant neighbors, such data streams can have from one to N neighbors that now match in value. That is, if a stream of N items of like value are encountered, the table sorting step actually accomplishes nothing special because the sort order is superfluous. However the embodiment cannot know this ahead of time. The sorted list represents a single object of all N pixel samples in this case. In the other extreme, a time frame of P items where all the items were of differing values would represent a time frame of P potential objects. For cases in between where some items happen to be of the same size, this fact stands out after the list is sorted. We walk down the sorted table as before except now we have nothing but focus cells. The cells above and below are the gravitational neighbors. If the cell below matches, it is part of the same potential object. If it does not match it represents the start of the next most gravitationally relevant object.

When we are done, the potential objects themselves convey two senses of gravitational relevance once again. The pixel's position in the table establish its initial center of gravity position within the time frame even though no specific spatial coordinate is present The second gravitational aspect is the size of the aggregate pixels that are now associated due to common values as pixels. In this case, the overall size of the association establishes its relevance as an aggregate. That means, all the potential objects discerned in this manner can now sort in terms of the aggregate value the object represents to establish the overall relevance of each object. Note that the original gravitational relevance is still retained because the original pixel values, their time and names in this case, are retained. Thus any association of data items contains the details of the components that formed the association. This fact pertains as we progress into the other Objects of the invention that follow. The higher the awareness the larger the aggregation of data associations. Although that fact can be modified later in more robust embodiments where bits and pieces of highly evolved awareness states are associated into concise new awareness patterns. In such cases, the level at which these small but relevant associations emerge determine their rank in the Hierarchy of Awareness. Size in terms of pixel samples and values alone pertains more within a given level. These nuances of how one ranks a given data association relative to another is not to be taken for anything more than a relative guide. The highest convergent levels are by default the most relevant according to Gravity Logic. This will be shown in later Objects.

Figure 16:
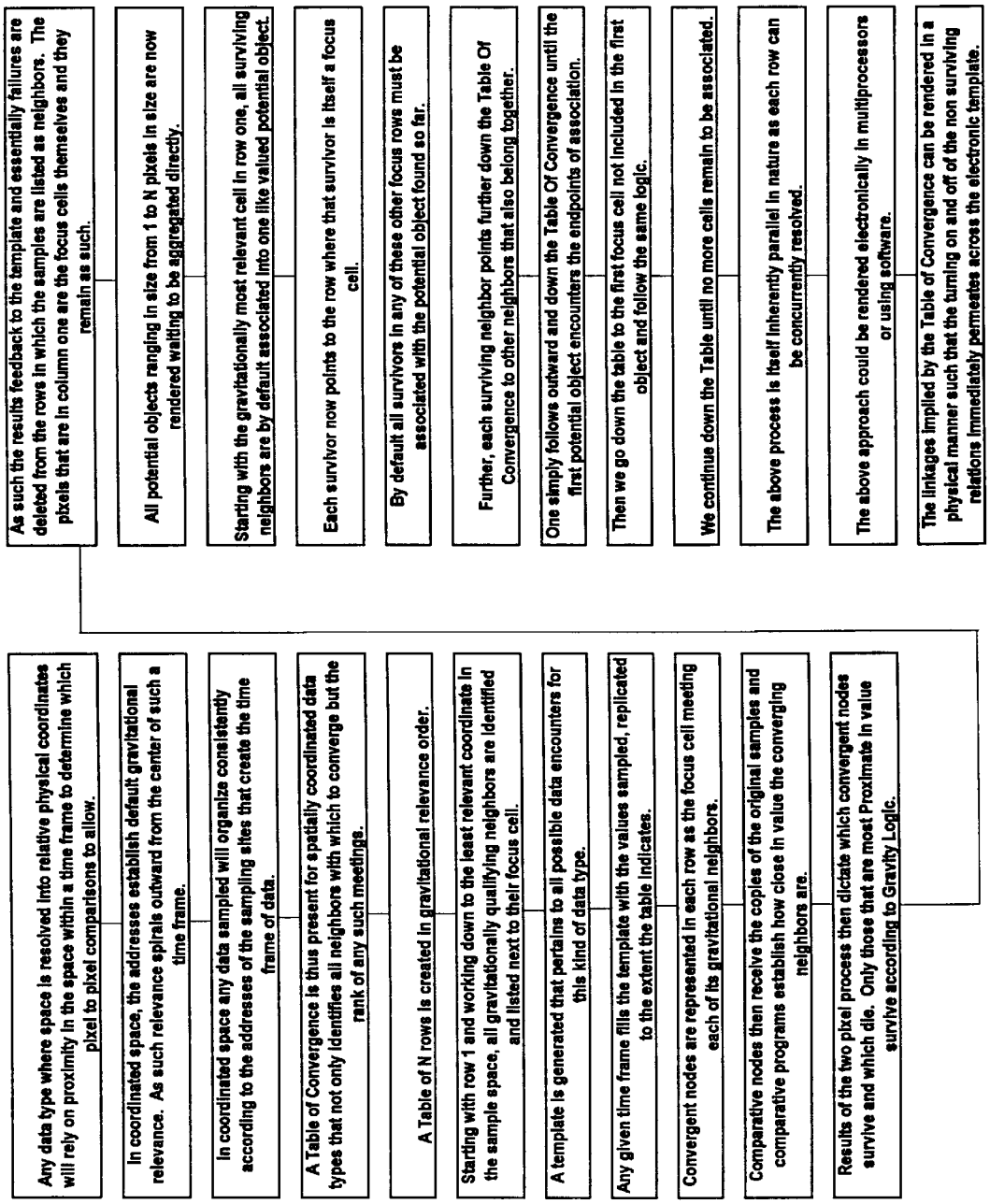
FIG. 16 is a block diagram that indicates the processing steps that pertain to establishing the relevant two pixel associations in any time frame and how that establishes all potential objects of anywhere from one to N pixels in size therein as data patterns herein referred to as relative awareness states in time, space and form.

Refer to FIG. 16. This flow chart identifies how potential objects are resolved after the two pixel step. The chart presents what was just narrated.

The second object of the invention is related directly to the first. This object is to establish an inherently parallel processing way in which to resolve all potential objects of like value in any possible data time frame using what is herein called Gravity Logic. Each data type would evolve potential object patterns concurrently with all other data types configured because each would be an independent processing opportunity.

Figure 15:
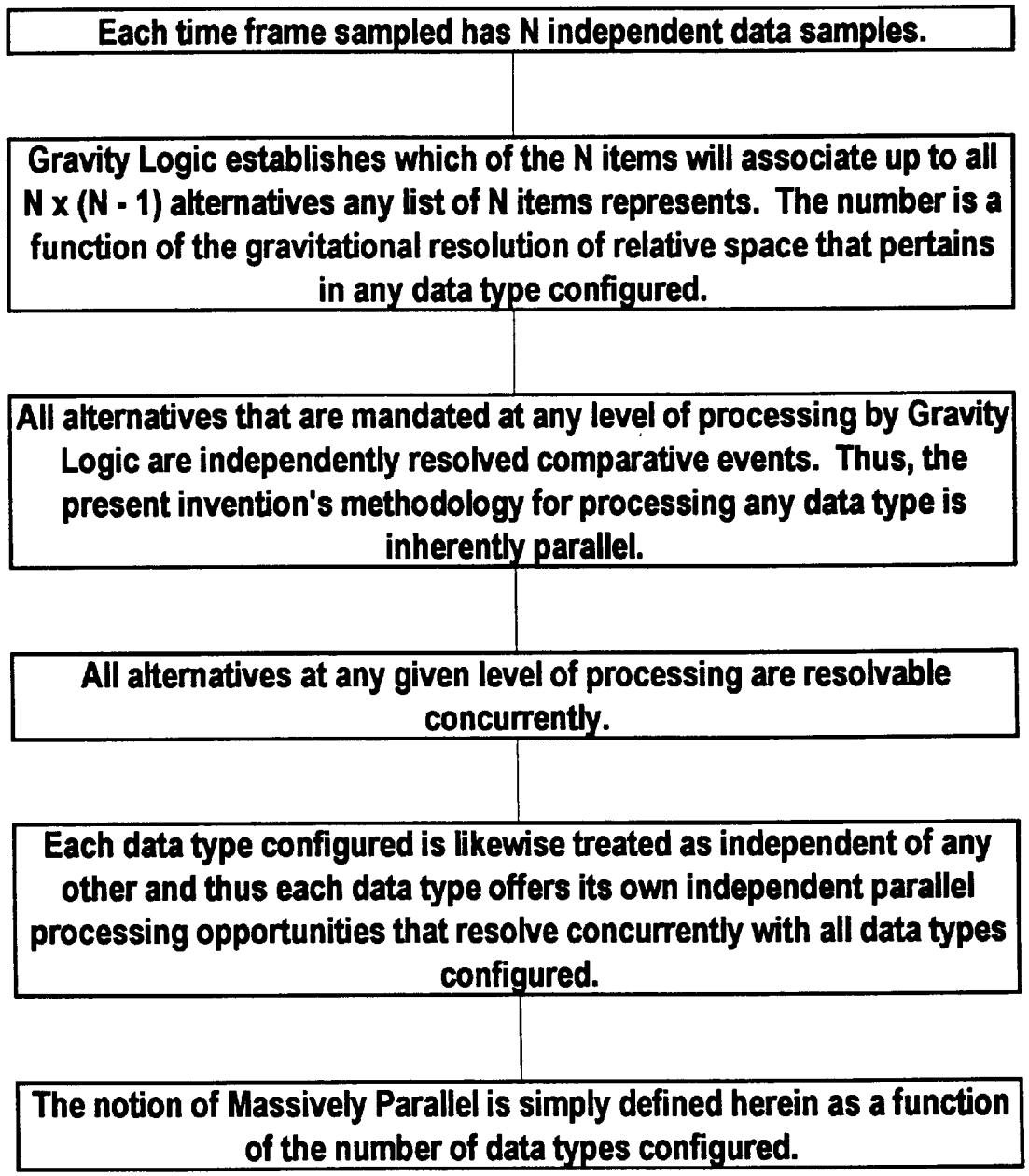
FIG. 15 is a block diagram flowchart that identifies the processing factors that establish the parallel processing opportunity illustrating inherently parallel processing of samples in any given data time frame.

Refer to FIG. 15. It first shows that a given time frame can have N independent data samples. When N=0 or 1 the parallel opportunity is not meaningful. Parallel is relevant when we can compare more than one item concurrently. It next shows that Gravity Logic defines which of the initial N×(N-1) two pixel alternatives actually get processed. The number is a function of proximity in space. Then it shows that all qualifying pixel to pixel comparisons can occur concurrently if concurrent resources are configured. All the pixel to pixel associations are independent events for any data type. The method specified in this invention is thus inherently parallel by nature. Then it indicates that each data type's processing is independent of every other and that each is a standalone parallel processing opportunity. The notion of massively parallel is herein meant to indicate that for N data types configured we have an N level massively parallel processing opportunity. The parallel mass is a function of how many data types are configured.

This is an object anyone skilled in the art can appreciate and render. We could take the one pixel at a time approach and concurrently process all three, all four and so on sized potential objects. Each qualifying object at each level makes it apparent which possible pixels to associate with and convergent resources could be allocated to do just that until no more qualifying objects evolve. As we have shown, we already know of all possible objects at the two pixel level. There are other inherently parallel processing steps one can take once that level alone is resolved concurrently.

First take the Table of Convergence and concurrently resolve all two pixel associations indicated. All of the comparisons specified are independent calculations initially. Then, the results can concurrently feedback to the template to delete the results that do not meet the necessary level of gravitational relevance pertaining to proximity in value.

Then, the step of resolving all the potential objects itself lends itself to parallel processing in a number of ways. Each row in the Table of Convergence can be concurrently resolved. If there are 361 pixels we have 361 rows and 361 concurrent processing steps.

Since linkages pointing between neighbors and the rows in which they are themselves focus cells are logically maintained or severed (as already discussed in object one) it is possible for the entire Table to take each focus cell that lacks a linkage to a row above it and assume that this focus cell must be by default the start of a potential object. As such, all such rows can then secure concurrent processing resources to concurrently follow the paths that flow down the Table of Convergence. This way all of the 361 concurrent row results resolve in terms of N concurrent objects. This is an emergent parallel processing opportunity. The image that evolves directs how the table with N factorial possible combinations ends up converging upon the potential objects that are there in terms of Gravity Logic.

For non sensory data like the stock market table, the sorting process itself establishes where the data demarcations are in the list. In that regard, the notion of resolving potential objects in a parallel mode is present because in one concurrent step that sorts the data, the objects all emerge as well. The reader should appreciate how fast potential objects emerge in any time frame in the present invention. When speed is an issue as it would be in a visual grid with millions of pixels per time frame, the present invention's solution is to configure the concurrent convergent processing resources needed to apply gravity logic so that even that kind of time frame resolves rapidly.

The above discussion illustrated a new method of processing by which patterns that are herein characterized as gravitationally relevant data associations in common cross sections of time and space (a time frame data sample) could be evolved for any data type sequentially or preferably in a parallel manner. No extraneous efforts are needed to render this invention parallel. It is parallel by its very nature and unlike any other invention in that regard. It is universally applicable to any data type.

Again, the reader may well question of what benefit are these kinds of patterns and data associations? That will be answered in a moment. One key point is no other invention approaches data processing in this manner. No invention can discern patterns in any data type using the same default logic that this invention can. This approach is universally applicable to any data at any resolution of time, space and form.

As far as utility, there are many applications that could utilize the kind of patterns this level of the invention can discern. These patterns are characterized herein as relative awareness states or levels. But they are nothing but arrays of the original data inputs organized in a gravitational relevance order within the array and within the time frames from which they evolved. They contain data values just like any other data values in any other computer system. As such, these kinds of potential objects as of a single data type pertaining to a single time frame of N samples can be used wherever perception of certain data values are important.

One use is in a monitoring system where perhaps a sound of a certain value and intensity that had a certain spatial relevance to the center of the sound time frame were indicative of something the designers wanted to discern. Designers would take the data patterns that the present invention evolved, and like any other kind of data type, the awareness states in the present invention are associations of the original details sampled. As such, the time, space and form factors are all there and can be interfaced anyway a designer chose. The patterns do offer awareness of gravitational relevance pertaining to the center of gravity in any data frame. That fact may or may not be an added factor in how such patterns are ultimately used.

With stock market data, or indeed any other symbolic data form, it will be up to the designers who embody such data streams into this methodology to determine how they will utilize the patterns discerned. The invention will perceive them and then it is up to the designers to decide how to use them and how to access them. For stock trades, a monitoring system could look for certain patterns in any stock time frame (each stock would be treated as a separate data type). Any time the system converged on a certain pattern we again have a directly useable data form whose value can be made to interface with anything desired. It is not within the scope to specify every possible configuration or nuance of utility. This invention lays claim to these kinds of gravitationally relevant awareness states and how they are evolved. The actual configurations will all vary but they will all utilize the same gravity logic to some resolution of time, space and form.

The above patterns are best characterized as foundational default awareness states. They emerge directly and automatically and in parallel for any data type configured in this manner. The Hierarchy of Awareness is not limited to the single time frame for single data types. The above methodology is enormously robust. The very same Gravity Logic is utilized to leverage the potential object level to evolve far more robust awareness states. These will be discussed in the next object of this invention. We will organize the discussion in terms of the Hierarchy of Awareness and each object of the invention (not to be confused with objects of awareness that the invention evolves) will represent a distinct level that leverages the awareness levels attained in the objects of the invention that came before.

One preferred embodiment leverages the current methodology to the highest levels of awareness possible for the data types and response states configured. Awareness and responses driven by those awareness states (which again are nothing more than pixel arrays organized in gravitational relevance order), is ultimately a function of the resources and configured. The current invention is scaleable to any level. Every data type configured is processed in the same manner. The third object of this invention takes us to what is herein called the Parallax Awareness Level. One last point to note regarding parallel processing in the present invention. Each data type is inherently parallel. The time frames sampled in any data type configured resolve concurrently and independently. If we have two data types, then we have two distinct parallel processing opportunities. If we have N data types, we have N separately parallel processing opportunities. This is characterized herein as a massively parallel processing opportunity where this notion of mass is a function of the number of data types. This definition is itself in line with the edicts of Gravity Logic. The more items, the more massive by default.

Figure 18:
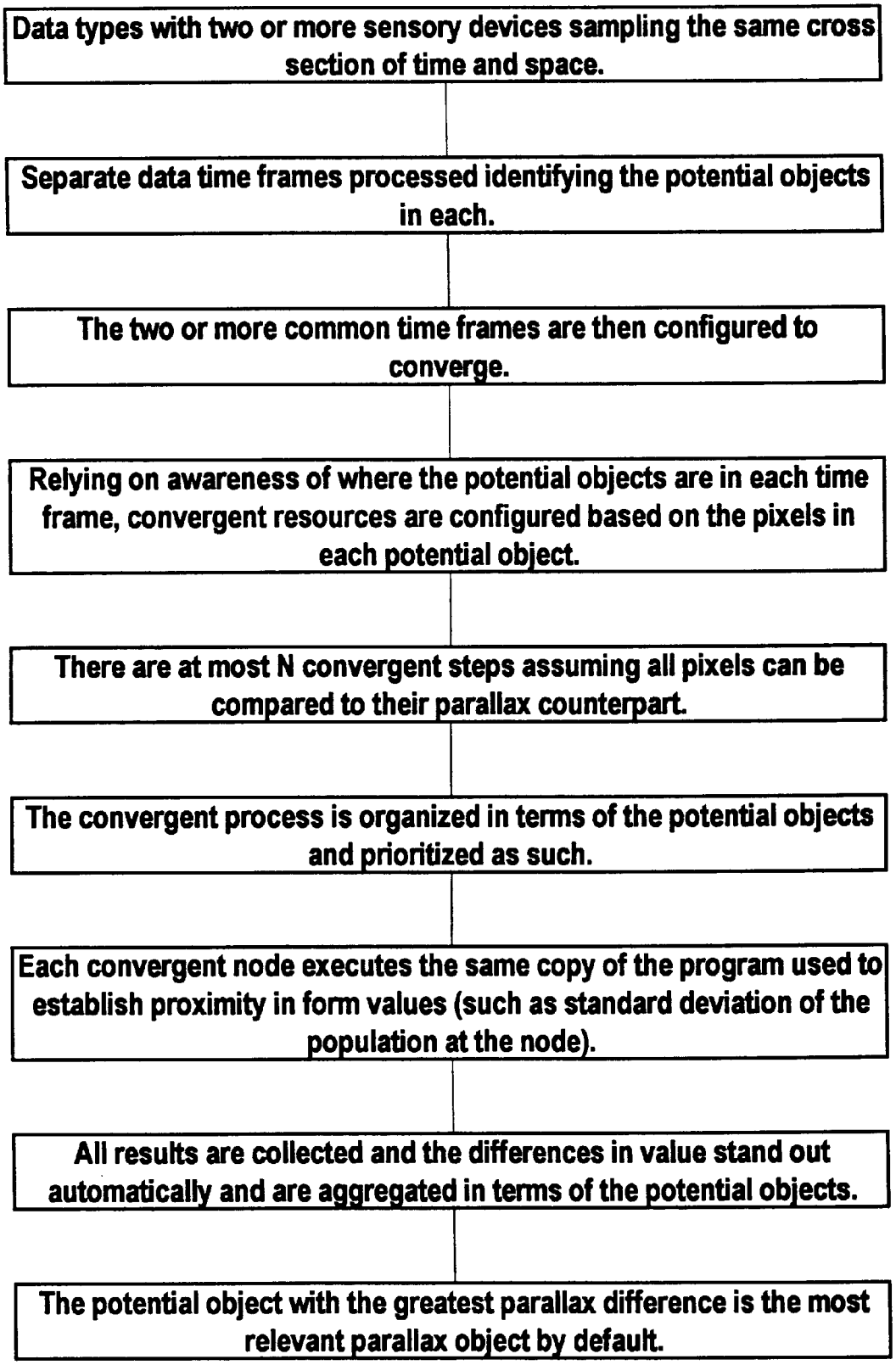
FIG. 18 is a block diagram that identifies the processing steps that lead to relative awareness of parallax objects in gravitational relevance order.

The third object of this invention is to rely on the potential objects discerned in the first object, to use essentially the same methodology that established the inherently parallel processing methodology in the second object to then discern what are herein referred to as parallax awareness objects. Such objects emerge whenever parallax sensory or input devices are configured in an embodiment. Typically one finds parallax patterns when two visual sensors or sonic sensors are configured to focus on the same cross section of time and space albeit from somewhat separated perspectives. Any number of separate sensor grids can pertain as in a fly's visual configuration, for example. FIG. 18 indicates the processing steps that apply.

The methodology one applies is straight forward. Gravity Logic now reveals a few more default aspects that are built into the process. Recall the notion of Logical Mass. The bigger the object or the bigger the aggregate value of all the data pixels, the bigger the logical mass present. It is a direct processing matter to sort or prioritize these data forms in terms of logical mass in relation to the center of gravity. This is now extended to the notion of how evolved an awareness state is in relation to other such states. The higher the level, the more relevant the data form by gravitational default. This is so because typically the higher one goes in awareness the larger the data form because more and more convergent steps are encountered. Actually, it is the number of convergent steps that it took to evolve to a particular data association that can discriminate how evolved it is and where it ranks in terms of relative awareness. In any case, the default that applies now is to rely on what is now known. At every level, as new patterns emerge, such as potential objects at the end of the first time frame, rely on that awareness to guide how the next time frame encountered is organized for processing. This is like the statistical technique used in some forecasting models. Conceptually, each time frame could follow the default logic and converge on potential objects the same way for every time frame. The methodology pertains and potential objects would be discerned. However, just as the two pixel level revealed all potential objects at that early level, the potential object level now is the basis for processing parallax data types. The present invention converges on patterns enormously fast and efficiently.

Assume two visual sensors. Parallax awareness is typically something that would pertain to sensory data types. Usually only two such sensory grids would be used, but like the eye of a mosquito, any number of such grids could be configured. Each time frame would have the same number of data samplers organized in the same spatial resolution manner so that the two are the same albeit configured apart. Note, if you configured two or more sensory grids and had them configured to focus on different focal points then you have multiple data types not a parallax data type. Each would evolve its own separate potential object awareness in that case.

Each sensory stream initially evolves potential objects in its time frame separately. The process acts as if two separate data types are configured. This processing is again inherently parallel and both lists of potential objects will emerge as before. The next step applies what was just stated about Gravity Logic. Rely on what is now known. Potential objects in each time frame are resolved and known. We can now overlay the two awareness states in time and space. Indeed all higher awareness steps involve overlaying what is known in terms of time, space and form. Anyone skilled in the art of data processing could implement this. We take the already ranked data patterns and allocate convergent resources to match the pixels from one sensor with its counterpart.

Cell 1.000 in eye one would meet its counterpart cell 1.000 in the other eye for instance. Whatever pixels pertain to the first object are kept in that order. If the object has one hundred pixels in it then one hundred convergent nodes are allocated. Note, the pixels now redefine their processing priority in terms of which object they are in, not where they are in the visual grid. If an outer pixel is part of the association involving an inner pixel like 1.000, then that outer pixel has a momentary higher priority but it is still ranked in relation to the cells in the object array so gravity relevance of every pixel in every object is always present at every awareness level. All the potential objects can allocate convergent resources in this manner to compare their constituent pixels. All the convergent nodes apply the same proximity of form logic as before. That means we determine the standard deviation between the counterparts. Here's where another aspect of Gravity Logic reveals itself.

Gravity Logic is actually related to Newton's Laws of Motion in a logical manner. It actually extends the logic of those laws. Essentially, things at rest are assumed to be still at rest. Things in motion are assumed to be still in motion (the second aspect pertains when we discuss change awareness levels). This translates easily and directly into more gravitational based default logic. Once potential objects are discerned the default is to assume that those objects will be encountered in the next time frame or the parallax time frame in the same place. Anything different is by default indicative of a change in state. As such, this awareness of a change in state is a direct outcome of applying gravity logic within a higher awareness level. As such, this awareness of a change in state is by default a higher awareness than existed immediately before that awareness was discerned. As such, awareness of a change in state of any kind, is by default more relevant in a gravitational default sense than no change in state. This immediately causes the entire methodology to have a processing focus geared towards changes in apparent state because these levels of awareness are higher levels of awareness and higher levels are more gravitationally relevant than lower levels. Gravitational logic is consistent. This has profound processing implications and leads to the opportunity to evolve incredibly robust awareness states.

Another factor that should be noted at the time it emerges is this. Gravity Logic still defaults everything else in terms of proximity in time, space and form. By default the most relevant or most central point is the center of gravity within the system itself. That is, proximity to self and self involvement in any pattern will be, by default the most relevant awareness. Indeed, all awareness states from the start emerge in relation to this fact because of the way the configuration was designed. As such, all awareness evolves in terms of proximity to self. This leads to the emergent phenomenon defined herein as relative self awareness. At this parallax awareness stage the amount of relative self awareness may not be immediately apparent to the reader. But by keeping in mind the way Gravity Logic ends up ranking and prioritizing the awareness states as they emerge, the reader will begin to realize that the gravitational rank of all such states emanates outward from the center of focus which emanates from the gravitational center of the system itself.

That digression was necessary to inject each aspect of Gravity Logic when it first presents itself. These are far from obvious but they are consistent.

To complete the object regarding parallax awareness then. All potential objects assume their counterparts overlap exactly so that each pixel to pixel comparison is expected to be identical. Note the word expected. Current awareness represents an expectation of future outcomes. This is critical when we discuss the memory and learning object of the invention but it begins down at these levels.

With parallax sensors, things sampled that are closer will convey a relative dimensional effect that we now perceive as a parallax object in a relative sense. That is, all the pixels in a given object collect to a common processing area to retain their sense of association as an object The amount of difference between each pixel to pixel comparison is readily calculated using any such mathematical comparison step, like standard deviation of the population (where population is again just the two pixels not all the pixels in the entire object). This step emulates what the real force of gravity would reveal automatically. Here we always have to inject program steps that leverage the Gravity Logic factors present to give life to the imbedded logic. We have individual pixel to pixel parallax values and we then have the collected overall parallax values of the entire object.

The greater the parallax effects discerned for each object in total and by pixel, the more relevant the potential object is and all this is relative again to the center of gravity as well. By default, a parallax object is assumed to be closer than an object that revealed a less dimensional effect. Flatter, more distant objects will convey a smaller parallax awareness. For now, this is another example of a foundational awareness. It reveals nothing specific about the actual object although we have the actual data values and time and spatial factors if one wanted to analyze the pattern externally. The awareness state just reveals that such a parallax object has been encountered and that it gains in gravitational relevance by that fact alone.

These parallax awareness states are themselves new data associations that now span two time frames of information. As with all convergent steps, every time a new convergent step occurs, a new data form is momentarily evolved. All such data items in the present invention gain a new time stamp and a new location stamp that indicate where and when within the system the object emerged. This way the new collection has an identity but all the component awareness levels within retain their identities as well pointing back to where and when they formed. As a data form, the pattern is readily useable as such in any data processing manner typically available.

Again the example of a monitoring system where a designer wanted to trigger something whenever parallax forms of certain characteristics were encountered could use this. One could imagine situations where anything that might be assumed to be close to such a monitor could be important for any number of reasons in any particular application. A security system might not want anyone nearby. Parallax awareness involving one common time frame does not convey motion awareness so this is not like a motion detector in that sense. The reader should note that the awareness pattern is emergent. The pattern the designer wants to match it against is now a conditional interface. The invention pertains to the generation of the awareness pattern, not to the myriad ways one might then utilize any such data array.

Refer to 10. This FIG. shows two visual sensors labeled Left Eye and Right Eye. The potential objects in each time frame are indicated by the shading. Each time frame converges on these patterns as before. There are 56 levels in a grid of 56 pixel sites. That is, actual data patterns can range in size from one to fifty six pixels in size. The illustration shows that at the time frame level all the potential objects are resolved. Instead of distinct pixels, the focus now reverts to these potential objects. It then indicates that each pixel in the original samples are associated at the parallax awareness level. The comparisons are organized in terms of the potential objects. This means that individual pixel priorities that pertain by default at the original sampling levels are overridden once the potential object level is resolved. Now the potential objects determine processing priorities. The most gravitationally significant potential objects are now most relevant and the pixels therein are likewise that much more relevant. The figure shows how the two frames overlap highlighting the differences that will stand out at the parallax convergent level when those pixel to pixel associations are evaluated. Anyone skilled in data processing could readily match the process flow to specific computer elements needed to implement this methodology.

The preferred way to use parallax awareness is again to leverage it as a foundational awareness level so that more robust awareness states or patterns could be discerned. As stated several times, you cannot know something until you encounter it. The extension to that is you cannot know something truly robust until the foundational awareness states are perceived and in place. As we continue up the Hierarchy of Awareness, the system will continually rely on the highest awareness states to determine what to do next and to establish what awareness is rated the highest. Indeed, once robust awareness states are discerned these will dominate processing priorities. Only a select few awareness states will emerge as the ones with most gravitational relevance. These define the context of all processing focus. Context, like relevance is herein an emergent property the dominant patterns establish automatically on their own. Even these most rudimentary awareness states demonstrate all these properties. The reader should appreciate that the invention establishes for itself what is relevant and what to focus on. Everything is a function of gravitational relevance. No other invention has ever approached the issue of relevance or context in this manner. The approach is consistent.

All the comparative steps pertaining to parallax processing are inherently parallel as before and can be configured to process concurrently. Of course, any parallel process can be implemented in a sequential manner but that would compromise the speed with which patterns are resolved. If there are for instance, N pixels organized by gravity logic into X potential objects, then there would be at most N parallel or concurrent comparison nodes and those would be organized according to the X number of objects.

Figure 19:
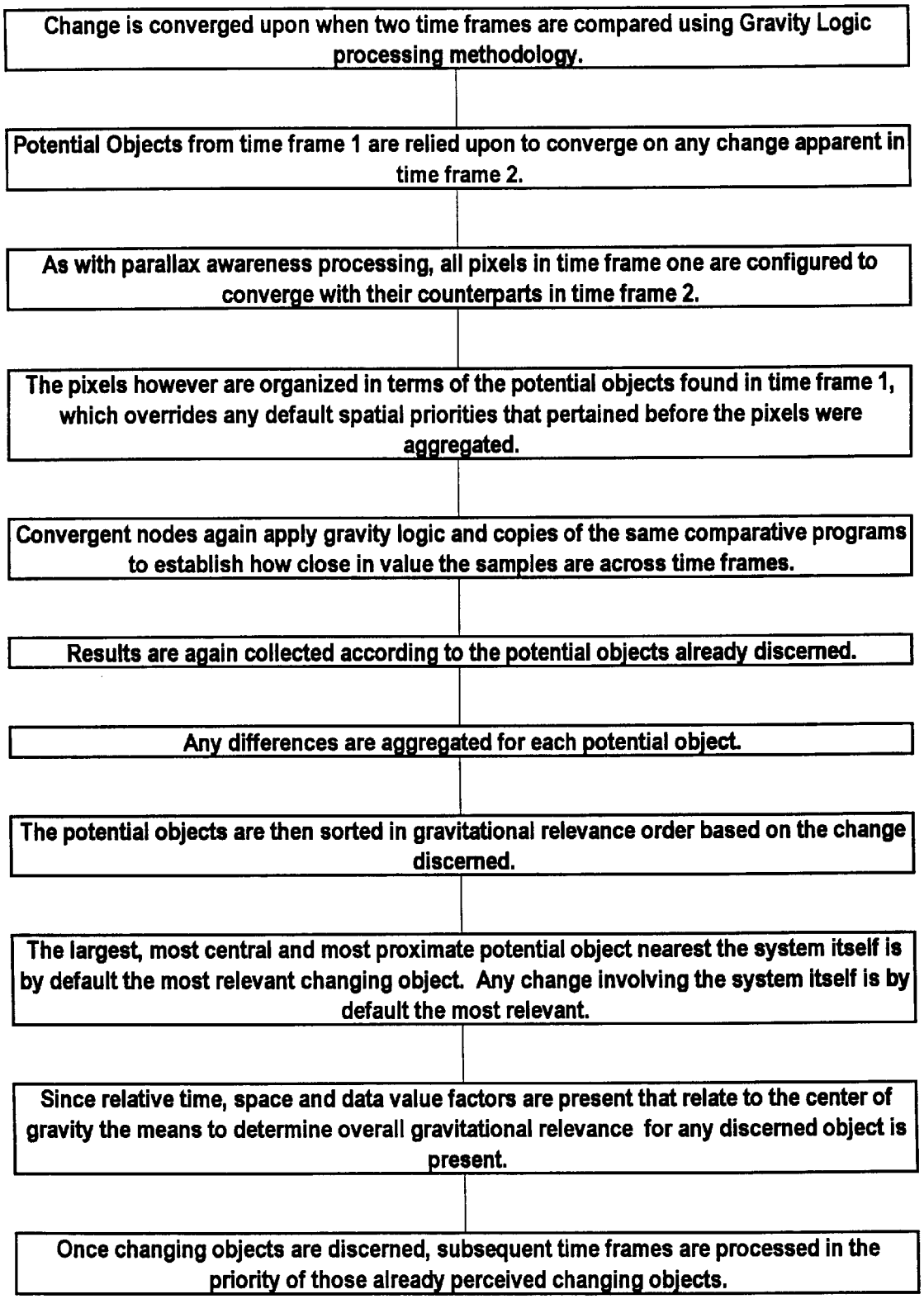
FIG. 19 is a Block diagram that identifies the processing steps that lead to relative awareness of apparently changing objects as of a single data type across two time frames.

The fourth object pertains to change awareness in any possible data type once potential objects are discerned in accordance with object one or parallax objects are discerned in accordance with object three. Refer to FIG. 19 which illustrates the processing steps in a block flowchart.

Again the object here is to leverage the methodology that established the inherently parallel processing opportunity in object two using Gravity Logic to now discern what are herein referred to as potential changing objects. Such awareness spans two or more time frames of each data type configured. Again, each data type would have the ability to concurrently resolve its own potential changing object awareness. This notion of multiple inherently parallel processing opportunities is another example of massively parallel processing. Massively parallel refers to the notion of more than one parallel processing opportunity. The more data types configured in the manner specified, the more massively and inherently massively parallel the embodiment. This means as well that the already specified parallel processing situations are still going on concurrently while these higher level parallel processing opportunities are going on concurrently. In that manner an embodiment continues sampling and processing new data into new patterns as it is resolving just sampled ones into their highest levels of awareness.

Change awareness is a function of the sampling rate. One can only discern change up to the sampling rate just like any resolution limit dictates. As mentioned, awareness of change means change in state. Initially, when but two time frames in two sequential time steps are involved you cannot discern the change in state that pertains to going from a state of motion to a state of rest. That means the first awareness of change is change that apparently pertains to a change from a state of expected rest to one where some difference is again discerned using Gravity Logic yet again.

As illustrated in parallax processing, change awareness is discerned in almost the same way. Instead of a common time frame separated in space, now we are dealing with two sequential time frames. The methodology is the same however. We rely on the potential objects discerned in time frame one because they again represent higher awareness states. As before, we assume they will be in exactly the same state in the next time frame. We allocate convergent resources in accordance with the way the pixels have aggregated into potential objects. This way, the convergent results can then be gathered so that the results pertain to each potential object.

The same parallel processing opportunities prevail because all the required node to node comparisons are again independent steps. The results provide a gravitational proxy once again and the overall amount of change is now apparent. Further, the relative location of the change in relation to the center of gravity is apparent as well. Indeed the more resolved the spatial coordinates the more refined the change awareness in the time frame space.

As stated, any change perceived at any pixel to pixel comparison site is by default more relevant than no change. As such, the potential objects now re-prioritize themselves yet again using nothing but the results of gravity logic processing. Now small changing objects gain a processing priority over larger static objects. In this manner context is immediately established around apparent change. Context is a function of gravitationally discerned change. It is quite direct and automatic. It applies to any kind of data. It is incredibly robust in what it can offer.

A number of new awareness factors begin to emerge at the change awareness level. The apparent direction of change is partially discerned because the relative location of each pixel is there as a guide. If change is apparent on a certain side or if the object perimeter appears to be getting bigger or smaller, then certain kinds of apparent directional motion is implied. If a single object seems to be changing values while those immediately around it are not, then no motion is indicated but the potential object is demonstrating the ability to change its apparent data value, like a light that may be able to cycle between a red color and a green one. The various possible ways an object can change state are discerned to a relative degree. Again this is a foundational level of awareness. It does establish an enormously important fact and that pertains to context. Change commands attention and it does so in gravitational relevance order. As we move up the Hierarchy of Awareness the ability to establish exactly which aspect of apparent gravitational ranking dominates is less absolute. Indeed several such factors may make it impossible to determine which potential object is definitely number one gravitationally. This kind of situation illustrates how the present invention operates in a manner one might characterize as a relatively fuzzy awareness state.

Unlike the technology known as Fuzzy Logic, this is not at all the same thing. The reader should appreciate that gravity logic can lead to somewhat indefinite awareness states at any given moment because the resolution of time, space and form leads to relative equals. Such states mean more than one awareness state is laying claim to being the most relevant at that moment, but the resolution limits of the system make it impossible to immediately resolve which one is really most important. Any number of ways can be configured to break such ties. In truly robust embodiments where these states momentarily emerge, they will tend to resolve over time quickly as more time and samples are encountered. Gravity logic is self regulating up to the limits of resolution. Uncertainty is definitely present in the present invention in the form of resolution uncertainties.

Fuzzy awareness aside, the object here is to take potential objects and discern apparent change to whatever degree the embodiment can. This method leverages the exact same approach as before. The convergent nodes are inherently parallel and resolve concurrently. Indeed, every data type configured is able to resolve change concurrently independent of the others at the sampling rate specified for each. Thus different rates of change that pertain to different data types can be discerned. Vision can process at 24 frames per second while sound processes at 48,000 frames or 2,000 frames for every vision frame. The sampling rates can vary. All that does is modify the resolution of time and change.

Figure 11:
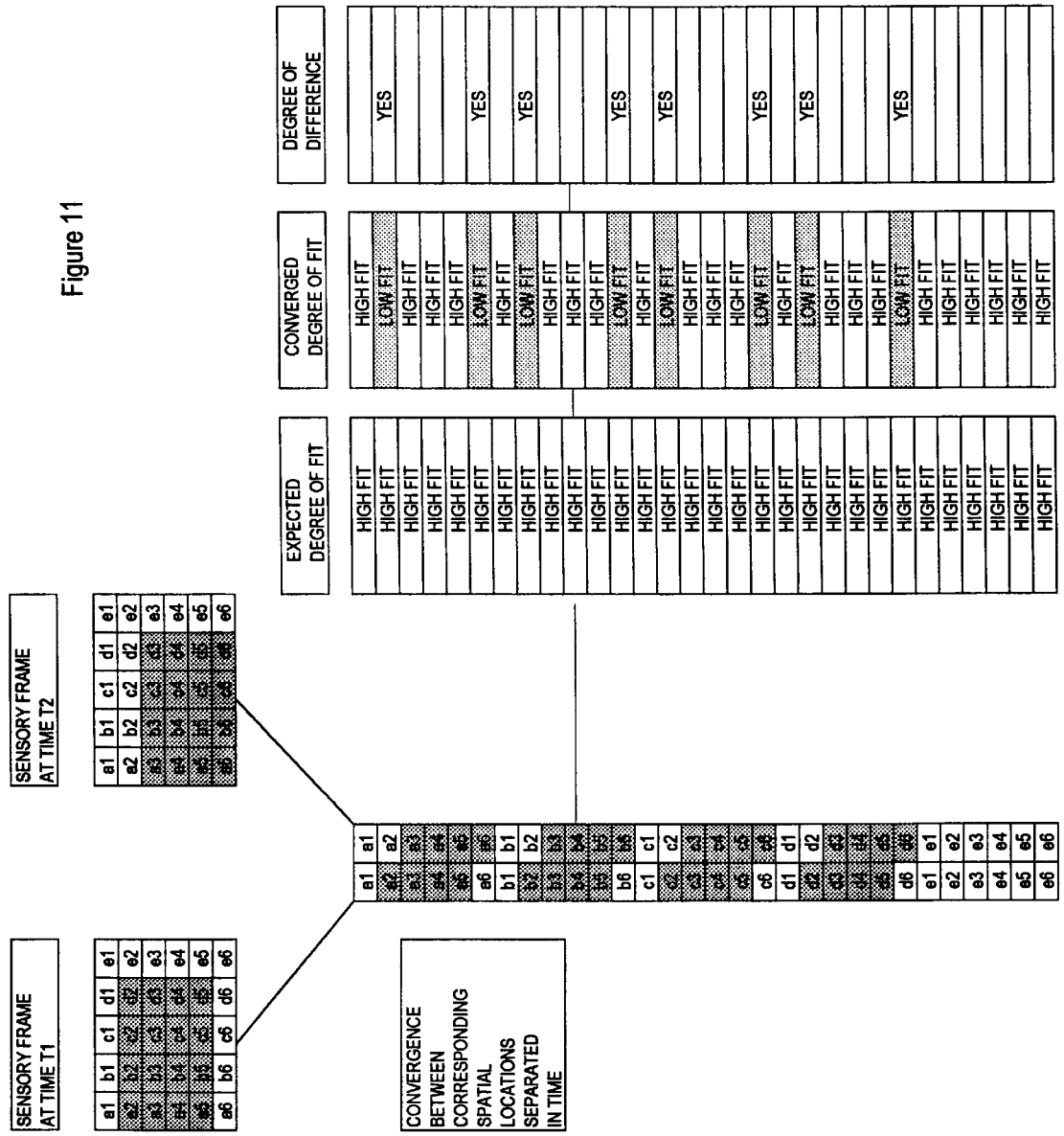
FIG. 11 is a block diagram illustrating how change is discerned in parallel by the present invention.

Refer to FIG. 11. This figure shows how the awareness in time frame one is configured to converge with time frame two. It shows how the corresponding pixels are configured to converge with each other. The convergence is now managed by the potential objects. That is, the system relies on the previous patterns to dictate how to allocate convergent resources so the pixel to pixel results can then recombine in association once again. This is roughly illustrated by the shadings that were used. The original stack of pixels are shown paired to the same stack from time frame two. The goal in the convergence step is to discern apparent change. This is shown at the column with Expected Degree of Fit indicated. The terms high fit are indicated as the default assumption in each case. The actual results are in the column Converged Degree of Fit where the converged results are shown collected in terms of HIGH FIT and LOW FIT. Any differences clearly stand out. With real data values numerical values by which to calculate more specific degrees of difference would exist instead of the less definite high fit and low fit verbiage in the illustration. The degree of difference in the last column labeled Degree of Difference points out how the actual sites stand out. The word YES is shown but again the relative rankings would be more numerically, and thereby gravitationally, resolved in an actual implementation.

The utility of such awareness extends to devices and systems where apparent change of one or more data types is separately desirable. This is a design issue. Whatever any given data type signifies in the real world to some designer will dictate how that awareness is utilized. Since all awareness states are aggregates of data samples that have been self organized into gravitational relevance order, the information is readily useful as any other data type is to any data processing system. Again, the invention lays claim to being able to evolve such data patterns. How they are then used is beyond the scope of the specification unless one employs them in ways that continue to leverage gravity logic. This will be seen when we discuss the response object and the memory and learning object later.

The fifth object is to leverage yet again the previous objects to now discern potential changing data forms that incorporate patterns of two or more data types. This object intends to utilize the same parallel Gravity Logic approach in object two to now allow convergence processing that pertains throughout the invention to converge disparate data types so that their separate cross sectional awareness in time, space and data form can overlay. This object leverages the fact that the data forms in the present invention carry a time stamp, a spatial factor and a data form component as part of the way all data is initially standardized in the present invention. At each convergent step the object is to affix a new time and space component to the data forms that associate at convergent nodes. In this way it is possible for converging data forms to establish how close in time, space, and form the various forms converging happen to be.

Once change is discerned in the various data types, the object is to leverage that awareness across data types. The concept here is each data type offers its own cross sectional view of reality in terms of that data type as of that cross section of time and space. Reality is something that can be treated as made up of different perspectives in data type that happen to overlap in time and space. Recall, new time stamps and the location where new data associations emerge are established. This way each new awareness that proves gravitationally relevant will exist as a distinct data form that retains the entire legacy of its evolution up the Hierarchy of Awareness. We do not lose any of the earlier awareness levels unless resources force the system to forget what is gravitationally least relevant. In that sense current awareness and later memories survive that are gravitationally the most relevant. This is resolved by the system because each element carries its gravitational relevance that can be measured against any other element in terms of time, space and form factors.

The earlier component Potential objects are still defined as distinct arrays within more complex awareness state arrays involving many such objects and pixel associations gravitationally linked across many time frames. No other invention has such kinds of data types which represent relative awareness states.

The multivariate level of awareness adheres to Gravity Logic yet again. Now disparate data types are configured by designers so that they can converge as well. Now we confront another dilemma that has stymied the prior art. This dilemma is how to relate disparate data types and what could possibly be the basis for relevance or context. As already demonstrated, Gravity Logic automatically establishes relevance and context or processing attention. Since this is the only invention that applies Gravity Logic it is the first to overcome this dilemma.

Refer to FIG. 12. Here the notion of overlapping different data types is shown. Comparisons occur in terms of cross sections of time and space. The visual pixels in relation to their center of gravity relate to the sound pixels relative to their center of gravity. This illustration shows pixels of equal size but either sense could have more or less pixels per time frame. In all cases the pixels that are involved can still be associated with their corresponding cross sections in the other data type. A visual time frame is shown with one resolved object in the center shown. A sound time frame with a sound object in the center of it is shown to the right. The illustration could just as easily be meant to indicate some common cross section of a much larger vision and sound grid where gravitationally relevant patterns will be found to overlap in time and space. The overlap is shown in center. Here we see the various pixels merged into a new combined data form. This might be misleading. The actual distinct time frames from vision and sound are retained. They are assigned a new time and spatial factor that represents the convergent node where this association occurred. Thus the cells VS1 to VS8 are meant to be addresses of the convergent nodes that compared the individual pixels' spatial values. The memory of this pattern between sound and vision thus pertains at the sound and vision convergence level. The individual sound and visual awareness patterns still relate to the levels and nodes where they evolved. The bottom table of information shows the gravitational default logic that determines the relative fit in time, space and form but that form comparisons are not meaningful when disparate convergence levels are involved. That is, the time, space and form factors that are involved in every data form are utilized by the system where those factors are the relevant factors. These aspects are set up during the design and configuration step. Form comparisons are not relevant in this level. Form factors would be relevant if we were discussing comparison of these data patterns with memories at this level as in the next object of the invention. A time, space or form factor is relevant to the convergence process when it leads to awareness of change. But disparate data types do not compare directly. Change is a function of each data type. Then overall change is a collective time and spatial awareness.

Figure 2:
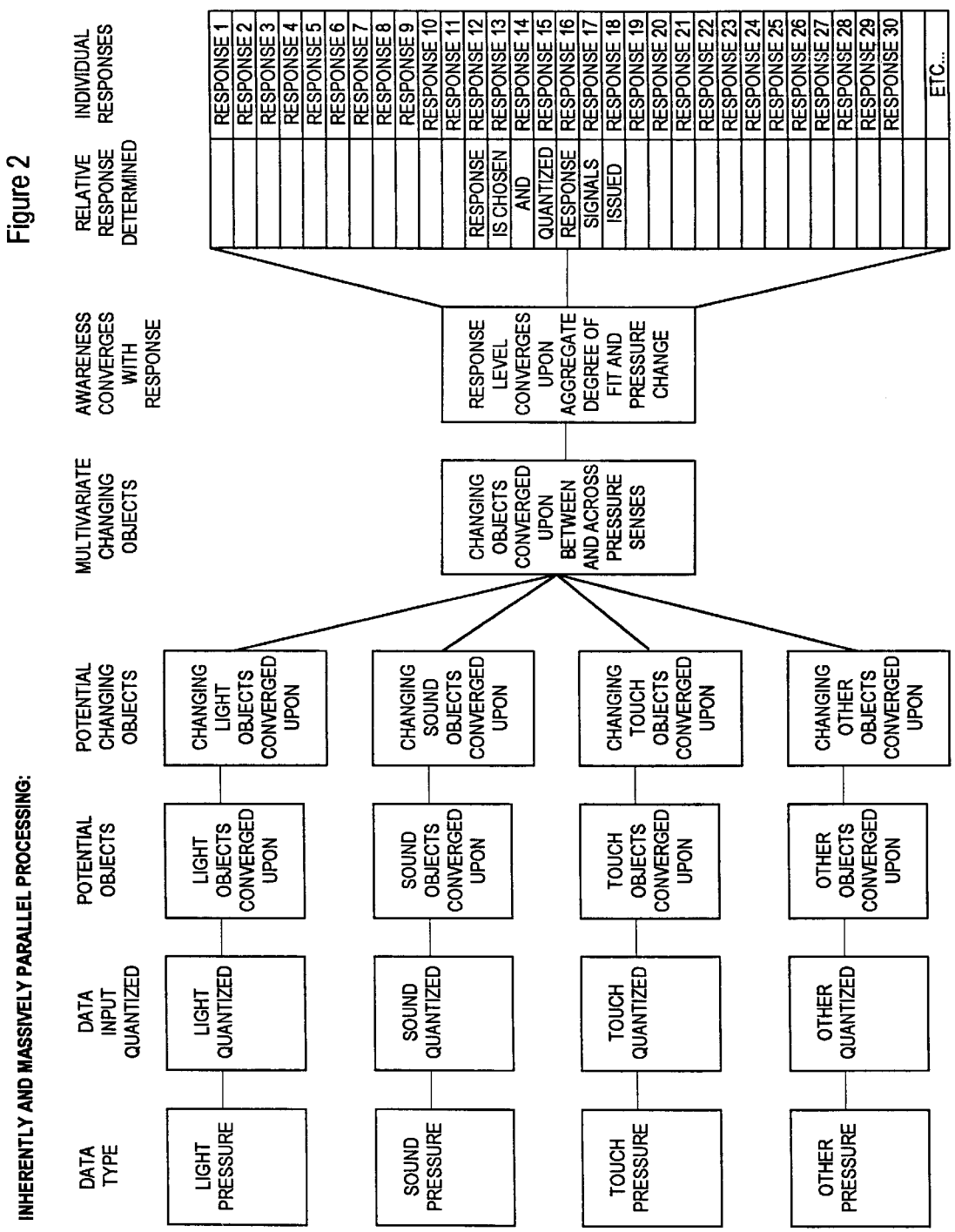
FIG. 2 is a flow chart illustrating the hierarchy of awareness process logic.

The notion of multivariate processing is illustrated in FIG. 2. The process flow is inherently and massively parallel. Four different data types: Light Pressure, Sound Pressure, Touch Pressure and Other Pressure are indicated. Any number of other pressures could be configured. Any data type can be considered a form of pressure. The fact that each processes independent of each other is indicated by the way each data type flows from the pixel sample state, where data inputs are quantized (i.e., digitally pixelated in time, space and form), sound is quantized, touch is quantized and the other data type is quantized. The next column is where the potential objects are converged upon separately and concurrently in each data type. The next step shows that change is converged upon for each separately as well. Then cross variable convergence is shown where all the data types are shown converging into a multivariate awareness. Once a multivariate awareness is evolved that data pattern is shown converging upon a response level which we discuss more in the next object. The resolution of the response is based on the number of discrete response triggers driving a given response device. The last column shows there are over 30 response sites in this response. To keep the illustration uncluttered no memory resources were shown. If configured they would interrelate immediately before the next awareness levels were processed. Memory associates with the nodes where the memories first form.

As stated, disparate data types do not relate in terms of data values. These are separate awareness factors that stand on their own. Each data type provides its own particular perspective on reality. What is important is that disparate data types either associate in time and space in a gravitational sense or they do not. That is, there must be an existing gravitational basis for disparate data types to associate. Only those that possess such a basis rise to the level of a multivariate awareness. This is how such awareness emerges.

Designers specify if different variables that are sampled at different rates are to converge. As before, if we have vision processing at 24 frames per second and sound frames at 48,000, they overlay every 2,000 sound frames. As such, two vision frames will establish visual change and 4,000 sound frames will have established 4,000 sound frames worth of change pertaining to sound. Each contributes its perspective. The issue is, thus, does the apparent change in sound relate to the apparent change in vision? Each data type has already organized itself in gravitational relevance order regarding where apparent change was discerned as per the above objects. Now when we consider parallel convergence across such data types, we are again relying on what is already known. The changing objects dictate how convergent resources will be allocated. Each data type will have different resolutions of space and different pixel associations. There may be 361 visual pixels in the visual grid but maybe 10,000 in the sound frame. As such, there is a different resolution in space as well. The only way this is resolved is via gravity logic. The center of gravity is still commonly found regardless of the resolution in each data type. The change in one can readily relate to the other because the location of change relative to the center of focus is also readily calculated. The more detailed the spatial coordinates, the more resolved the apparent association in time and space. Designers seeking embodiments that can attain this level of awareness will need to estimate to what degree the spatial commonalties will resolve. If they do not provide the resolution needed, they will not be able to resolve such associations to the level they do resolve. This will establish another relatively fuzzy awareness that says, yes sound is apparently changing near the center of the sound frame and change is also near the center of the visual frame, or it may be more spatially accurate.

Further, it will need to be determined if parallax awareness will pertain for such sensory data types. Parallax awareness offers a direct way to triangulate such resources and better resolve such cross sectional overlaps. One way to use parallax awareness is as a way to focus the visual sensors themselves. Configuring the sensory devices so they all orient towards the same focal points as say the human head orients all senses configured would seem to be a likely approach. The preferred embodiment would adhere to Gravity Logic to the resolutions specified.

Anyone skilled in computer processing could configure a system to process data time frames where potential changing objects are discerned to now compare such time frames in the manner described. The convergent nodes are now concerned with the spatial aspects of each changing object at this junction. The time proximity is established at the design stage as before. The related time frames converge on their own once configured. Likewise, the change discerned for each data type is already established. There is no need to compare the change values in sounds to the vision values. They do not directly relate in this manner. Thus, the convergent nodes and comparative processing objective is to establish the relative amounts of spatial overlap where apparent change was found. Since each pixel retains the legacy of where it is in the time frame it is a direct matter for comparative programs to match the relative spatial cross sections. There are many ways to implement this comparative process.

One way is to rely on the coordinates and actually employ different kinds of programs that can immediately correlate where the apparent change seems to be coming from. This applies mathematical calculations that establish the distance in relation to the center of gravity. This is established at design time like the Table of Convergence. Every pixel with a spatial coordinate begins with a spatial relation to others in other data types. The other way to do this is to rely on the least resolved data type to dictate which coordinates to associate with each other. In the design phase, the designers would rely on gravity logic to dictate how any pixel in the visual frame will relate to any one pixel or aggregate of pixels in a sound frame.

That is, if a visual frame has 361 pixels across 10 layers as illustrated earlier but the sound process has 64 layers across 16,000 or so pixels it is a direct matter to determine which and how many sound pixels in the more resolved sound frame relate to each visual pixel. Everything overlaps from the center outward. In this way, the association between any sound frame with any vision frame is established. There would be over 40 sound pixels resolved within each visual pixel. Thus when a sound frame overlays a vision frame into a new convergent cycle, the pixels will associate in this predefined manner. Thus the ability for space to overlap and establish where common change occurs is as direct as before although now we do not have a given pixel relating to its one counterpart. Instead, we have one pixel in the least resolved sense relating to 48 of the more resolved sense.

Figure 17:
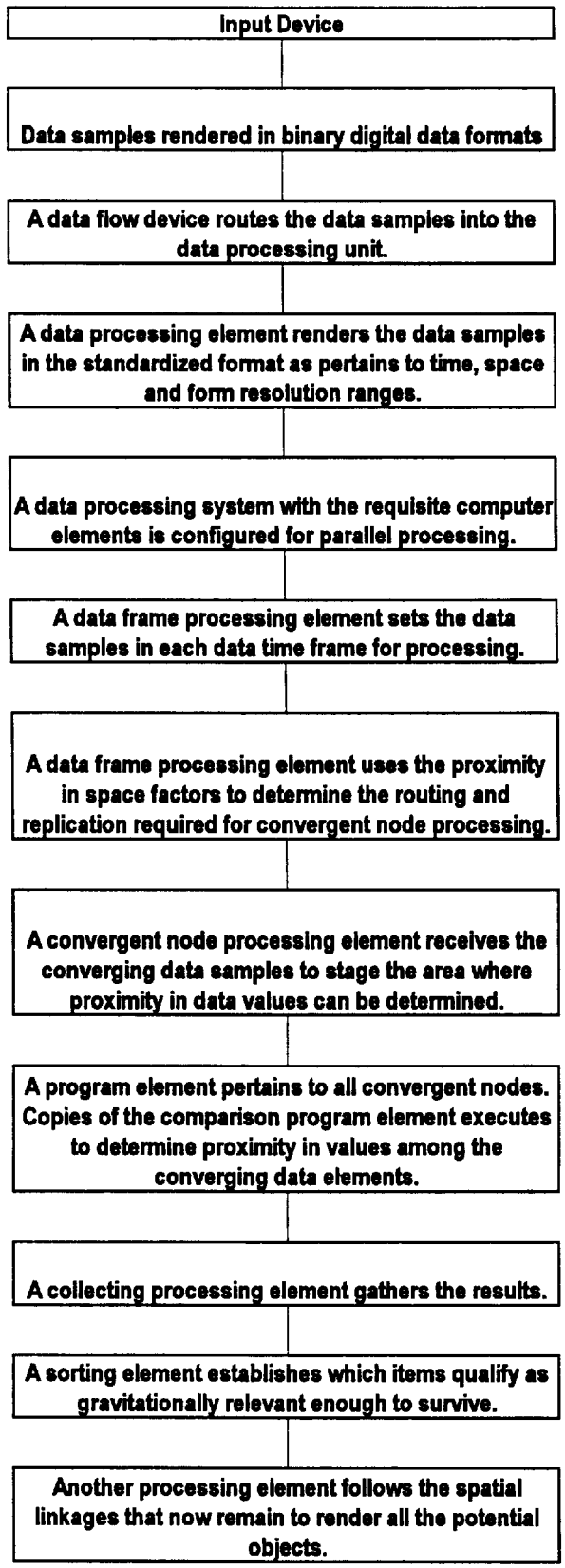
FIG. 17 is a block diagram that indicates the devices and computer processing elements in a high level manner.

Thus we could have 48 concurrent comparisons between each visual pixel with each sound pixel. Again, this is an elaboration on previously presented gravity logic and methodology. There are numerous ways to leverage the time, space and form factors at any level. I have presented one such method. In previously submitted applications these methods were presented in a way that assumed the reader could immediately identify one or more ways to actually implement gravity logic in a computer system with the processing elements such a system typically requires. Refer to FIG. 17 where some of these elements are indicated in case the elements of a computer system are not clear at this point. Everything about this process is readily understandable to one skilled in data processing systems. It is quite directly transferred to a computer system with elements commonly associated with such systems.

To clarify what was assumed, I have provided an elaboration that clearly demonstrates how directly space and time can be related and how everything already presented regarding Gravity Logic processing follows. The invention is oriented towards the center of data time frames. The higher the resolution the more directly one can apply gravity logic to relate across time, space and form at the levels indicated. At any step, designers can choose the actual method and elements they wish and can implement the logic of Gravity logic in any manner they choose to the resolution they choose.

Any number of disparate data types can be processed in this manner. Every data type provides its own cross sectional view of apparent change. Each will have more or less resolution of the space in the time frames that pertain. The resolution of space establishes how anyone skilled in the art can establish the degree to which apparent change in one data type overlaps apparent change in another data type.

Any number of such disparate data types can be configured to overlay or converge in the manner prescribed. Two at a time can be configured or several can be configured to overlay in this manner. Ultimately, the overall level of awareness is a function of how many cross sections of time and space involving the most data types are involved. Every variable added represents a step up the Hierarchy of Awareness. The gravitational default is to assign the highest processing priority to those forms that capture the greatest cross section of apparent common change involving the most data types. An example of such an awareness state would be an embodiment that was configured with human sensory devices. Then awareness of another person talking to such an embodiment would discern multiple levels of change involving multiple aspects of the complex image in front; sounds, motions, even the sense of touch and smell might pertain if configured. Such an encounter would command a very high processing priority for gravitational reasons. The change is all proximate to the embodiment and involves multiple data types. Anyone skilled in the art of data processing can implement the above methodology. What is required is for the disparate time frames and the data associations evolved to interact via gravitational based convergence methodology according to the resolution of time and space contained in those data forms. The goal in this step should now be clear. Any overlapping apparent change as discerned according to Gravity Logic processing stands out and gains in relevance to less dynamic change. Relevance is based on the highest apparent change awareness and this is a relative state.

The sixth object is to take the patterns discerned in the previous objects and again leverage the parallel processing object in object two, to again utilize Gravity Logic to now allow these data patterns to converge with configured response triggering sites so that an association between a converging pattern and a response sequence can then be associated. This object treats any response state as another kind of data type and applies the same logic that allows disparate data types to converge and relate as in object five. Here the difference is now some kind of response state is triggered. A response state can have from one to X number of triggering factors that can control that device. Further each of the triggers could have a range of responses ranging from one to Y. The more triggers and the more response grades per trigger the more robust the potential response. In this object, all of these possible triggering values, when they actually trigger, are rendered like any other independent data type. The entire response is broken into time frames containing anywhere from one to X "response pixels", if you will. In this regard, response states will be processed in the same way as specified in Object two.

Again, anyone skilled in the art of data processing could implement this step. The response state is a design decision just as any other element. The resolution range is specified. A relative awareness state in the present invention, as we have seen several times now, is just a collection of the original data samples that have now organized themselves into potential objects, then potential changing objects then multivariate changing objects. At any of these levels one could configure any kind of response device they wish. The response devices' triggering options are treated like any other data time frame. The triggering sites all have spatial resolution aspects related to each other that may be two dimensional or three dimensional in nature. There will be a center of gravity associated with any response potential to serve as the default center of attention. That way each triggering site's relative gravitational ranking again stands out in any situation. When a new awareness state evolves ready to encounter the response state that has been configured to interface with that level of awareness, the system treats the event the same way it does an encounter between any disparate data types.

This object pertains for embodiments where no memories are present to guide the response potential. That is, this object discusses what happens the very first time an awareness state evolves all the way to the response state configured and discusses what Gravity Logic requires happens by default. This object illustrates again how foundational awareness states and response states now converge initially.

The preferred embodiment is one that pertains to the highest resolutions of time, space and form. Any design specifications that are less resolved will be reflected in the way awareness states and response states interact. With initial responses this is not much of an issue because Gravity Logic defaults will come into play to trigger a gravitationally appropriate response. In the next objects where memory resources are specified we will see how this object's defaults serve as the foundation upon which truly robust awareness and response states can emerge.

The response defaults are all at the center of the response state specified. This means that the responses will trigger in relation to where the center of awareness is in the visual space. That is, the center of gravity in any awareness pattern is self evident. The cross section of time, space and form in any awareness pattern is self organized in a gravitational sense already. Thus if a visual awareness pattern indicates that change is going on in a certain cross section of the time frames involved then that same cross section of the response state will be attracted to that area as well. The response states are poised to trigger at the midpoint or center of gravity at each response trigger. Given nothing to go on that would be the default response state the very first time. However, any awareness that reaches this level will already have a gravitational preference established by where the objects and especially where the changing objects are. As such, the response triggered will begin to immediately relate to where the change in relative space was. The response would not be all that relevant this very first time. But it would be immediately balanced in overlapping space.

Thus, the response state would trigger in proportion to the awareness state's relative gravitational rating. That means, if a certain aggregate amount of relative change is perceived this information is present in the values of the data originally sampled. These are numbers. The values are de facto indications of degree relative to the absolute range. This information is readily calculated. The response states do two things. They associate in the same way that the changing objects themselves associate. This way a response trigger that is gravitationally less relevant by default because it may be the furthest from the center of the response grid could be relevant if the change in space involves that portion of relative space. This is nothing more complex than that already presented. The higher awareness state has a higher processing priority. The higher awareness overrides the basic defaults. In this way an embodiment ends up focused by its highest awareness states but it can rely on the defaults to maintain the behind the scenes foundational awareness.

Figure 23:
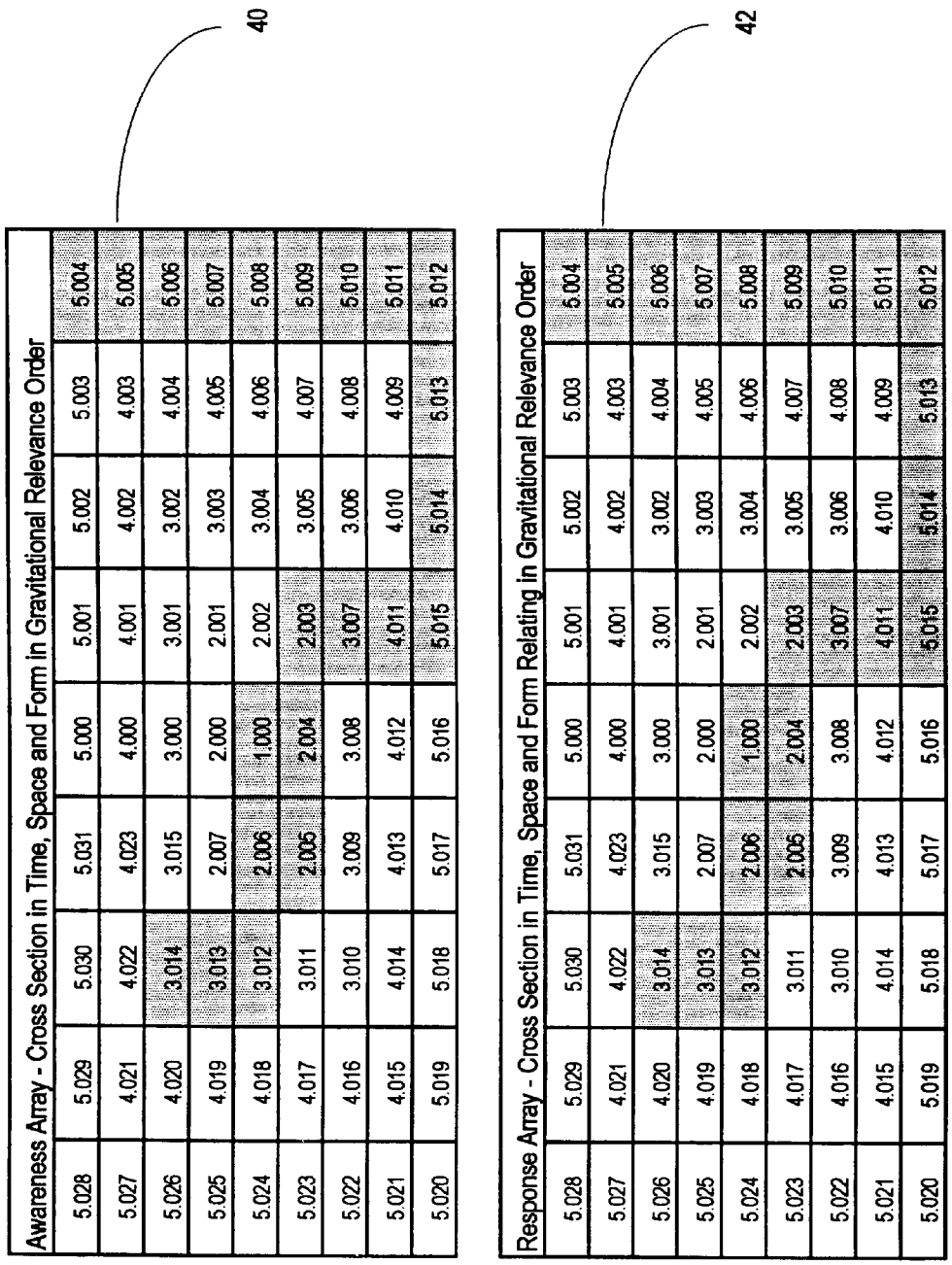
FIG. 23 is a block diagram with an awareness pattern converging upon a response grid which physically and conceptually illustrates how the time, space and form factors that associate in the awareness pattern, shown shaded, would overlap the cross section of time, space and form inherent in the response grid so that the relative gravitational status now captured in the awareness pattern, the shaded portion can directly influence the values triggered in the response grid, also shown shaded to indicate the relationship that pertains in how response states are triggered.

Assume we have a 361 pixel response grid with ten layers like our earlier visual sensory grid corresponding to some response device for illustrations. Each trigger has one hundred possible triggering states. This is analogous to a visual sensor with a range of one hundred colors. The point to note is that a response grid is just like a sensory grid in all respects. Assume the awareness pattern that first comes along is something irregular that starts at the center of the response grid and emanates across the response grid as indicated in FIG. 23. The response grid is prioritized by the awareness pattern. The convergent node process again is inherently parallel. Each pixel in response space is associated with some number of pixels in the awareness space. Indeed each variable's pixel space is associated by the designers. When designers choose to configure an embodiment so that certain data types converge with others and then converge with certain response states, the designers have to factor in the resolution of space they have for each of these elements. The system is not a biological form that can evolve these factors on its own (although one could use the methodology in so called artificial life embodiments, but that is a specific application and beyond the scope of discussion). As such, the designers have to react in the gravitationally relevant ways and they have to determine which pixels overlap which at the resolutions involved. This information can all be generated by programs that match the centers of gravity in each element. Then tables of associations can readily be generated for all combinations or the relations could be calculated as needed because the information is always present to do that. As with the sound and vision illustration earlier where 48 sound pixels associated with each visual pixel, various combinations will pertain at the response level as well.

If we have 361 response pixels we have 361 concurrent response pixel comparisons in space. This number is affected by how many pixels pertain in the various data types in the awareness pattern. Each could have less, more or even the same number of pixels as the response state. The number of concurrent nodes is a function of which element has the highest resolution.

The key with response states is they associate with each cross section of awareness. In this way complex change patterns are dealt with specifically and collectively. This means the response level converges with the separate awareness elements. A collective response is then triggered that reflects each component of awareness. This approach will make it possible for an embodiment to modify later responses where memory resources are configured in proportion to what each data type is conveying in gravitational priorities. This way, if a sound and visual pattern happens to trigger a response state now, and later a similar awareness again comes along but the sound portion is somewhat different, that aspect is always separately discernible because as we have seen all the earlier awareness states are retained. Even though a collective association is now the overall data form driving the response state, that collective's individual data types' awareness states are self evident therein. Convergence occurs in terms of overlapping time frames. This means, the relative pixels in space separately convey gravitational information. Every response triggered is thereby driven by the gravitational relevance of each pixel in the awareness state that has already established its gravitational relevance in evolving whatever data patterns happen to have evolved to this point.

In this way every pixel in an awareness state contributes to the overall response triggered in a given pixel portion of the response grid. This makes it possible for enormously complex awareness patterns to trigger gravitationally balanced responses. The goal is to somehow get the initial response states triggered to actually relate to the awareness states so that perfected response potentials emerge. This will be discussed next in the memory and learning object.

To recap, anyone skilled in the art of data processing can readily see how any number of time frames could be overlaid. You have data awareness time frames for each data type. You have response time frames for each response state. Each has a center of gravity and the spatial relations among all the pixels in each time frame are always gravitationally prioritized in relation to the center. The higher the resolution of this space the more specific the information that is present for relating each of these time frames. That is, each data type and response state breaks the time frame space into pixel points. These represent the resolution specified for that element. These limit the way different elements can overlap. The overlap is a function of where the pixels are in this relative space. Again it is a straight forward process for one skilled in data processing to establish which pixels in these spaces will converge with each other. Convergent resources converge because of design decisions guided by this Gravity Logic.

In robust embodiments with more than one response state, designers then extend what has already been presented for one response state. They also need to determine if two or more response states will ever be related to each other. In people, speaking and moving the mouth and tongue and breathing are all separate response states that have to learn to work together to speak effectively. If a design entails these kind of dynamic interrelationships then the designers have to configure more resources in the same manner. All we have are more response states overlapping in the same manner. Each is keeping its cross section of the overall response separate even though new complex composite multiple response patterns are ultimately generated. The reader needs to treat each response state as a separate data type. The ability for such convergence to take place is a design decision. The human body is configured in ways that make convergent sense. The heart does not converge directly with the mouth. They have separate response objectives even if they ultimately share the same support structure. Arguably the heart and mouth compete when say a marathon runner has no strength to even speak. Such extremes are present in the biological configuration but may not be present in an electronic one unless designers make such overlaps possible.

So far, all we have are foundational response states that triggered in relation to the gravitational priorities cumulatively represented in the separate time frames involved. We will now discuss the next object that pertains to memory resources configured according to Gravity Logic. This next object will illustrate how a learning dynamic will be able to emerge that will force the various awareness states and response states to iterate towards their most refined levels automatically. Awareness is relative. Response potentials are relative. The reader should appreciate that the awareness and response states are not things of absolute relevance. At any instant they represent a relative awareness and a relative response that happens to be gravitationally relevant at that moment. Learning involves the ability to focus on where a given response fails to converge with a given awareness as memory anticipated.

The seventh object is to apply a memory potential so that it is possible to configure a memory resource ranging from one to any number of memory slots. Further, the object is configure these memory resources at anywhere from none (no memory potential) to any number up to all convergent nodes configured in any given embodiment. The object is to have all memories that evolve along the same convergent pathways to encounter memories that evolved before them and were associated and retained in relation to that particular node. The actual resource could be physically anywhere so long as the resource retains the link back to the node it formed. This object then makes it possible to again apply Object two and gravity logic in another inherently and massively parallel manner to concurrently recall the most relevant memories that exist at any particular node immediately after any new data association emerges at any such configured node. Again, like any kind of resolution, the more memory slots configured the deeper and more resolvable new patterns will be in relation to previous patterns. The parallel processing opportunity is present because each new data pattern that evolves at a memory node site will confront N memory items. By replicating the current pattern N times an embodiment can then concurrently compare at still other convergent node resources dedicated to memory processing so that all N comparisons resolve at the same time. Again, gravity logic will be utilized and all the results will organize in what is herein called gravitational relevance order. This pertains in all the objects above. There is an emergent learning dynamic that now pertains once memory resources are configured. Data forms that evolve at convergent nodes are data associations in time, space and form. They compete for processing resources when the methodology is applied. Only the most gravitationally relevant associations survive.

There are a number of logical factors that pertain to gravity logic which are universally applicable to any data type that make the above objects possible.

The reader should appreciate that awareness states evolve when they prove to be the most gravitationally relevant associations in relation to the other alternatives present at that point in time, space and form. This invention is thus a naturally competitive environment. Only survivors end up as gravitationally relevant data forms. Since change awareness is by default the most relevant kind of awareness the ultimate relevance pertains to surviving data forms. Only survivors are relevant. Thus, memories when configured provide the means to retain previously relevant data patterns. When limited memory resources exist the patterns compete for those slots. The patterns that end up in memory will be the most gravitationally relevant patterns yet again. This object is implemented in the same manner as before except now we have memory elements which will trigger right after a new pattern emerges. This represents a revolutionary memory methodology. It means as new patterns emerge there is relevant recall of the most gravitationally relevant memories.

Memory resources are configured by designers at the convergent steps they decide are worthy of such resources. In theory, every convergent node can have memory resources configured to associate with that specific node. That is, Gravity Logic provides the guidance that says data patterns that emerge at specific convergent nodes should always be associated with the time and place of their emergence. This way any new data forms that end up at that convergent node can then relate directly with previous patterns that reached that same site albeit as of a different time involving perhaps different data values. The space is still the same and is the gravitational point memories have in common with new forms when memory is configured this way. When memory resources are not configured for a node, the resolution of experience is lessened. In practice, designers will probably configure memories at significant levels only and bypass interim levels.

The more memory slots per node, the greater the resolution of memory or experience. This is the same as with any data element or response element. Resolution is a function of alternatives at that site. Memories are like experience pixels. All the memories at a given node are like a memory time frame that is not limited to one moment in time but spans whatever time is captured in the memories themselves. The following is how memory resources are implemented.

Patterns evolve as before. At any site where a particular pattern resolves the designers can configure memory resources to pertain to that site. They need not be physically at the same node, but that approach would maximize the speed and minimize the distance to relevant memories. If we have a brand new system which has not yet experienced anything, then any new data patterns that initially emerge will not have any memories to interact with. These earliest of memories will face no direct competition for survival in memory either because there is unused space. After a very short time, all new data patterns will fill up the available memory slots. Once that occurs direct competition for long term survival will begin to take place. However, even before all the memory slots are filled up, as soon as the first pattern secures the first spot in memory the memory processing dynamic begins to get involved.

Essentially we have an inherently parallel processing opportunity once again. For any number of memories the potential exists to compare all N memories concurrently with copies of the current data pattern that has just emerged. The objective is to compare time, and form values to see how proximate they are. The primary focus is data values with time proximity a secondary factor that establishes how old a pattern is in relation to another. By default, newer memories are more proximate to the present. The present is the center of gravity when we discuss time. The past and the future are gravitationally related to the present. Since each memory is organized according to the potential objects that were involved, this memory comparison step relies on the way the data is organized. The assumption is the current data form is most relevant. The memory that overlaps the most in the most gravitationally relevant portions of that memory emerges as the most relevant memory.

Gravity Logic automatically isolates the most relevant memories. The memories essentially sort out in gravitational relevance order. The process isolates not only which memory is most relevant but which of the component patterns in that memory were most related. Every aspect is in gravitational relevance order. This means that this process could find one memory that matches extremely well in part with a current pattern while another memory matches extremely well in another aspect. Any setting has the potential for previous patterns to occur with regularity while other previous patterns may sometimes emerge as well. Reality is always confronting us with things we have encountered before in new situations. The ability to isolate portions of memories that happen to overlap well makes it possible to actually isolate those portions of a given memory rather than attempt to continue to process an entire data pattern. After all, the system is only focusing on what is gravitationally most relevant. Most of what is encountered will only incidentally contribute to the final awareness and response. This makes sense. You walk into a known setting you realize that but then you encounter something new or some new activity and you focus on that taking the rest of the setting for granted. The same notion pertains here. Since the awareness states herein retain their component associations, it is a direct matter for a computer process to isolate that part of the overall data form. That part will have a complete time, space and form aspect to it.

The point to note is this. The entire memory that best fits in total is initially the most gravitationally relevant. The specific aspects of that memory that made that memory most relevant are now known. These aspects are distinct component object patterns. Each memory is ranked in this manner by the Gravity Logic applied. The system can now rely on whatever number of these ranked memories it has the resources to keep active in processing until a response state is triggered. The goal is to rely on the most relevant memories at the highest levels of awareness. This means that any memories triggered in lower awareness levels are less relevant than those triggered at the higher levels by default. They would only be configured if designers wanted to provide the means for a system to consider as many memory factors as possible. This becomes more important when one realizes that learning is an iterative process that entails first recognizing something to some extent and responding initially to that awareness. Then, the affect of ones response is now part and parcel of the next data streams that flow into the system. Memories are treated as default expectations according to Gravity Logic. The default is to assume what we once encountered is now still relevant. Since it is unlikely for any memory to exactly match any new data pattern the convergent comparison process will almost always find some difference in form relative to the center of gravity. Indeed, every data form and thus every awareness state in the present invention is unique when time, space and form are evaluated. No two data forms can have the same time, space and form values. In a computer system we could of course make artificial data forms and assign them the same values. But in normal processing on its own, the forms that evolve will evolve as of a unique time, space and form.

When a memory is compared to a new pattern the two overlap in terms of time frames again in relation to the center of gravity. The pixels will match in this case because the way the process is configured is to force memories to converge at the same node in space at different times involving different data values. The memories will be physically the same sized binary data forms. The information in time overlaps directly pixel for pixel much the way two visual time frames will be of the same structure. The concurrent processing is thus not limited to N memories resolving concurrently. Each of the pixel to pixel comparisons that establish where the gravitationally relevant factors actually are also occur concurrently. If we have 1,000 pixels per memory and for the new data form, and we happen to have 500 such memories, we have 500 concurrent memories matching up with 500 copies of the new pattern. Then all 500 of these initial settings command 1,000 concurrent nodes so that all the individual pixel comparisons can resolve concurrently. Clearly this is a huge amount of parallel processing resources. However, if one notes how small the size of the requirements a given convergent comparison requires, it is readily apparent that even rather large memory resources can be dealt with. Anyone skilled in the art of data processing or multiprocessor design of a parallel nature could implement the above. Essentially the above example has 500×1,000 nodes. 500,000 nodes are not that many electronic elements. Each node has a computer program with a tiny logical footprint directly incorporated into the node design or accessible as software code. The code needed to establish the standard deviation between two data forms is tiny. 500,000 of these are not trivial but the footprint of these nodes is quite small. And, they are all the same so everything is enormously redundant. This redundancy actually makes it possible for designers to use the same elements for processing rather than specifically dedicated ones so long as they also provide the logic to keep track of which element is associating with which node and when. If the processing rate is fast enough this approach could suffice in many embodiments.

The preferred embodiment is to assign dedicated resources to each node that can resolve everything to the highest levels possible. The model by which to view this is the human brain. The nerves in the brain are all spatially fixed in relation to the others. The way data flows into the brain forces the information to follow the architecture of the brain. The same channels pertain regardless of what is experienced. The memories and experiences filter through the brain and emerge as gravitationally relevant outcomes.

Learning proceeds as follows. An awareness pattern triggers a certain memory to emerge as most gravitationally relevant per the above. The system relies on this memory to guide its response. The convergent process not only isolated which portion of the current awareness matched the memory, it established to what degree the memory matched in form and time. The differences stand out as the most gravitationally relevant factors now. The system will rely on the memory but it will know what portions of the memory did not match and to what degree. The difference is again organized in a gravitationally relevant manner related to the center of the time frames. As such, the pixels that differ and the degree they differ is known. Since response states overlap as already stated according to time frames and centers of gravity as well, the response sites that happen to be related to these apparent differences are also now known. This means the system knows that if it responds exactly as it did in the past that the response will likely be in error due to these sites where differences pertained. Something in these response pixels may not pertain, or they may well pertain better. The system cannot know this but it can know where to focus attention once it responds. However, before it responds it can use what it now perceives to modify those particular response sites. The degree of difference and the direction of difference stands out The system can now split the difference between the memory and the response range. That is, if we have 100 grades for one response trigger like this and if the memory called for grade number 78 to trigger. However we now have discerned that this point in the grid is where the memory does not match and we know it is off by 10 percent based on the pixel value and the range the pixels can ultimately take. The system can then modify its previous value of 78 and tweak it by 5 percent which is half the perceived difference. The point here is a weighted change is called for and gravity logic provides various indications as to how much to tweak the response grid in relation to any memory. In this way an embodiment will learn to modify its responses in relation to what it perceives.

Now, any response issued is automatically a form of feedback for the system. Whatever the system does is by default the most relevant change because it pertains to self and self is the center of gravity overall. Anything that the system does is a candidate for observation. However, as always, the highest awareness states drive the process. Now instead of being concerned with pixel to pixel evolution from scratch into potential objects, then potential changing objects etc., the focus is on the expectations that any memory represents. A memory is a template for what will next occur. The system expects the response to play out exactly the way it resolved in the first place. Since robust memories are time series events a given response is like a motion picture with sequences of change that should occur. Thus, an embodiment takes all the data that is now coming in and matches it to the memory and the response as modified. The issue with learning is to converge on response states that straddle the level of resolution. The goal is to respond as well as perceivable. When the change discerned is gravitationally not relevant enough to command a processing priority, the response process iterates towards the new processing priority. In this way the focus of activity remains until a more gravitationally relevant change is perceived. Gravity Logic is a self regulating process. The fact that it is inherently parallel on many levels means resources can keep track of many different change factors at one time. Only a few factors can be specifically dealt with directly at any moment. The alternative awarenesses compete for attention all the time. As each awareness and response state resolve and play out, the ones that are still going on begin to move into the status of gravitational relevance. Then the embodiment shifts processing resources so that it can react to these other factors.

Learning and self awareness are an emergent phenomenon due to gravity processing. Everything is organized in gravitational relevance order in relation to the system itself. All activity will iterate in relation to self. All awareness pertaining to change and processes will evolve in relation to self. The more data elements, response elements, memory elements, convergent node elements and other resources and the higher the resolution of time, space and form, the more robust the potential awareness and response states. The notion of intelligence and self awareness is a function of these resources. At some point, an embodiment will demonstrate awareness and response states that people will begin to perceive as indicative of a relatively self aware electronic system. It is all a function of gravity logic methodology and processing resources.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A computer implemented method in a system for data processing that includes a computer having a memory and at least one processor connected for accessing the memory, the method comprising the steps of:

measuring sensory signals and converting the sensory signals to electronic signals representing data elements in the form of binary signals through an input device, said electronic signals being provided at a predetermined data resolution rate;

conveying the electronic signals from the input device to the computer;

creating pressure based data forms from data elements received from the input device, each pressure based data form having a time stamp element, a spatial address element, and data form element;

iteratively evolving relative awareness by converging two or more pressure based data forms by applying gravitational logic to form new pressure based data forms, each of the pressure based data forms representing specific relative awareness states; and means for storing said pressure based data forms in said memory.

2. The computer implemented method of claim 1, wherein each pressure based data form retains a legacy of evolution.

3. The computer implemented method of claim 2, wherein the step of applying gravitational logic includes the steps of comparing time stamp, spatial address, and data form elements separately between converging pressure based data form elements to obtain relative closeness in time, space, and form gravitational ratings, each of these ratings being provided for determining surviving pressure based data forms by comparative evaluation between pressure based data forms having greatest gravitational relevance.

4. The computer implemented method of claim 1, wherein the step of evolving relative awareness includes each specific relative awareness state forming an array representing same, storing said array in memory to retain the location of a node from which the array was formed, and comparing the arrays stored in memory in parallel at the node from which the array was formed to determine the most relevant arrays, said most relevant arrays triggering responses.

5. An inherently, and massively parallel data processing method capable of concurrently evolving relative awareness states, the method comprising the steps of:

measuring sensory signals and converting the sensory signals to electronic signals representing data elements in the form of binary signals through a sensory input device;

conveying the electronic signals from the sensory input device to a computer;

creating pressure based data forms from data elements received from the sensory input device, each pressure based data form having a time stamp element, a spatial address element, and data form element; and evolving relative awareness by converging two or more pressure based data forms by applying gravitational logic to form new pressure based data forms, each of the pressure based data forms representing specific relative awareness states, the step of applying gravitational logic including the steps of comparing time stamp, spatial address, and data form elements separately between converging pressure based data form elements to obtain relative closeness in time, space, and form gravitational ratings, each of these ratings being provided for determining surviving pressure based data forms by comparative evaluation between pressure based data forms having greatest gravitational relevance, wherein the step of evolving relative awareness includes the step of storing the new pressure based data forms in memory and repeating the step of evolving relative awareness upon the stored new pressure based data forms.

6. The method of claim 5, wherein the step of evolving relative awareness includes each specific relative awareness state forming an array representing same, storing said array in memory to retain the location of a node from which the array was formed, and comparing the arrays stored in memory in parallel at the node from which the array was formed to determine the most relevant arrays, said most relevant arrays triggering response signals.

7. A computer for providing parallel data processing comprising:

input means for conveying electronic signals representing data elements in the form of binary signals from an input device to a computer and providing said data elements at a standardized data resolution rate, said input device comprising a sensory measuring device selected from the group consisting of: a visual digitizing camera, a digitizing pressure sensor, and a digitizing sound sensor;

means responsive to said input means for creating pressure based data forms from data elements received from the input device, each pressure base data form having a time stamp element, a spatial address element, and data form element;

means for evolving relative awareness by iteratively converging two or more pressure based data forms at convergent nodes to form pressure based data forms, each of the pressure based data forms representing specific relative awareness states, each of said convergent nodes having memory means connected with said computer for storing and accessing the pressure based data forms; and means for applying gravitational logic at each convergent node where the gravitational logic includes comparison means for sorting time stamp, spatial address, and data form elements separately between converging pressure based data form elements to obtain relative closeness in time, space, and form gravitational ratings, each of these ratings being provided for automatically determining surviving pressure based data forms by comparative evaluation between pressure based data forms having greatest gravitational relevance.

8. The computer of claim 7, wherein each pressure based data form retains a legacy of evolution and further comprises response nodes, each response node being connected with a convergent node and has output means for providing and triggering response signals.

9. The computer of claim 7, wherein said input means includes at least two sensory elements for providing data elements for forming pressure based data forms having a common time stamping and data form element and spaced apart spatial address elements, said means for applying gravitational logic includes means for determining potential objects, and wherein potential objects determined from said at least two sensory elements are converged by parallax means associated with said means for applying gravitational logic for determining and evolving parallax awareness.

* * * * *